(12) United States Patent
Dugat

(10) Patent No.: US 12,116,207 B2
(45) Date of Patent: Oct. 15, 2024

(54) TOTE HANDLING SYSTEM WITH TOTE HANDLER AND METHOD OF USING SAME

(71) Applicant: Robotica, Inc., Cypress, TX (US)

(72) Inventor: Jay Mark Dugat, Cypress, TX (US)

(73) Assignee: Robotica, Inc., Cypress, TX (US)

( * ) Notice: Subject to any disclaimer, the term of this patent is extended or adjusted under 35 U.S.C. 154(b) by 932 days.

(21) Appl. No.: 17/151,633

(22) Filed: Jan. 18, 2021

(65) Prior Publication Data

US 2021/0380341 A1 Dec. 9, 2021

Related U.S. Application Data

(60) Provisional application No. 63/034,105, filed on Jun. 3, 2020.

(51) Int. Cl.
| | |
|---|---|
| *B65G 1/137* | (2006.01) |
| *B25J 9/00* | (2006.01) |
| *B25J 15/00* | (2006.01) |
| *B25J 15/08* | (2006.01) |
| *B65G 1/10* | (2006.01) |
| *B65G 47/90* | (2006.01) |

(52) U.S. Cl.
CPC .............. *B65G 1/10* (2013.01); *B25J 9/0093* (2013.01); *B25J 15/0033* (2013.01); *B25J 15/08* (2013.01); *B65G 1/1375* (2013.01); *B65G 47/90* (2013.01); *B65G 2201/0258* (2013.01)

(58) Field of Classification Search
CPC .. B25J 9/0093; B25J 15/0033; B25J 15/0052; B25J 15/0293; B25J 15/08; B25J 15/0047; B65G 47/914; B65G 2201/0258; B65G 1/1375
See application file for complete search history.

(56) References Cited

U.S. PATENT DOCUMENTS

| | | | |
|---|---|---|---|
| 1,603,633 | A | 10/1926 | Nelson |
| 1,737,762 | A | 12/1929 | Howe |
| 2,590,359 | A | 3/1952 | Zopf |
| 2,993,583 | A | 7/1961 | Sykes |

(Continued)

FOREIGN PATENT DOCUMENTS

| | | |
|---|---|---|
| CN | 102079407 B | 2/2014 |
| DE | 20314281 | 12/1971 |

(Continued)

*Primary Examiner* — Dean J Kramer
(74) *Attorney, Agent, or Firm* — Victor H. Segura

(57) ABSTRACT

A system and method for handling includes a tote handler. The tote handler includes an adjustable grip hand or a merger hand. The adjustable grip hand includes finger assemblies movable by actuators between a closed with the fingers urged together and an open position with the fingers urged apart. The fingers are selectively movable by the actuators between a retracted and an extended position. The merger grip hand includes insert fingers and suction fingers. Each of the insert fingers include a polygonal body having a peripheral surface shaped for engaging receipt within an inner surface of a tote. The suction fingers include elongate members with suction cups thereon. The suction fingers are movable between a closed position with the suction fingers urged towards the insert fingers and an open position with the suction fingers urged away from the insert fingers.

10 Claims, 84 Drawing Sheets

(56) References Cited

U.S. PATENT DOCUMENTS

| | | | |
|---|---|---|---|
| 3,104,004 A | 9/1963 | Poel et al. |
| 3,135,049 A | 6/1964 | Daugherty et al. |
| 3,137,068 A | 6/1964 | Quigley |
| 3,232,409 A | 2/1966 | Pierson et al. |
| 3,485,339 A | 12/1969 | Miller et al. |
| 3,606,058 A | 9/1971 | Davis |
| 3,668,821 A | 6/1972 | Benson et al. |
| 3,757,973 A | 9/1973 | Lambert et al. |
| 3,922,778 A | 12/1975 | Aalpoel |
| 3,944,054 A | 3/1976 | Ensinger |
| 4,014,428 A | 3/1977 | Ossbahr |
| 4,187,755 A | 2/1980 | Shirai |
| 4,192,496 A | 3/1980 | Baselice et al. |
| 4,200,178 A | 4/1980 | Gunti |
| 4,256,213 A | 3/1981 | Shaw et al. |
| 4,269,302 A | 5/1981 | Garvey |
| 4,290,617 A | 9/1981 | Yoshida |
| 4,291,518 A | 9/1981 | Johnson |
| 4,514,963 A | 5/1985 | Bruno |
| 4,610,596 A | 9/1986 | Bouldin et al. |
| 4,629,302 A | 12/1986 | Willcox |
| 4,653,961 A | 3/1987 | Hashimoto |
| 4,715,488 A | 12/1987 | Hewitt et al. |
| 4,730,718 A | 3/1988 | Fazio et al. |
| 4,804,081 A | 2/1989 | Lenhardt |
| 4,835,836 A | 6/1989 | Van Uitert |
| 4,962,841 A | 10/1990 | Kloosterhouse |
| 5,011,467 A | 4/1991 | Traegaardh |
| 5,028,181 A | 7/1991 | Jenkins et al. |
| 5,031,498 A | 7/1991 | Koppel |
| 5,033,348 A | 7/1991 | Walsh |
| 5,048,267 A | 9/1991 | Kudo et al. |
| 5,059,082 A | 10/1991 | Tanttu et al. |
| 5,101,703 A | 4/1992 | Tanaka et al. |
| 5,144,789 A | 9/1992 | Focke et al. |
| 5,150,781 A | 9/1992 | Deisenroth et al. |
| 5,165,516 A | 11/1992 | Reed et al. |
| 5,172,804 A | 12/1992 | Chersin |
| 5,217,110 A | 6/1993 | Spangler et al. |
| 5,351,809 A | 10/1994 | Gilmore et al. |
| 5,360,161 A | 11/1994 | Schaller et al. |
| 5,400,895 A | 3/1995 | Hollingsworth et al. |
| 5,454,683 A | 10/1995 | Marom et al. |
| 5,456,348 A | 10/1995 | Whetsel et al. |
| 5,568,857 A | 10/1996 | Chen et al. |
| 5,649,801 A | 7/1997 | White |
| 5,699,892 A | 12/1997 | Shyr et al. |
| 5,718,325 A | 2/1998 | Doster et al. |
| 5,725,349 A | 3/1998 | Garvey et al. |
| 5,758,362 A | 6/1998 | Focke et al. |
| 5,854,460 A | 12/1998 | Graf et al. |
| 5,862,907 A | 1/1999 | Taylor |
| 5,911,300 A | 6/1999 | Mraz |
| 5,931,071 A | 8/1999 | Mori |
| 5,971,132 A | 10/1999 | Bonnet |
| 5,984,078 A | 11/1999 | Bonnet |
| 6,005,211 A | 12/1999 | Huang et al. |
| 6,068,111 A | 5/2000 | Smith et al. |
| 6,073,747 A | 6/2000 | Takino et al. |
| 6,189,298 B1 | 2/2001 | Kuji et al. |
| 6,220,421 B1 | 4/2001 | Hugon et al. |
| 6,227,377 B1 | 5/2001 | Bonnet |
| 6,264,042 B1 | 7/2001 | Cossey, Jr. et al. |
| 6,302,408 B1 | 10/2001 | Zierpka |
| 6,325,393 B1 | 12/2001 | Chen et al. |
| 6,457,916 B2 | 10/2002 | Wienhold |
| 6,471,031 B1 | 10/2002 | Duncalf |
| 6,516,937 B1 | 2/2003 | Deer |
| 6,533,096 B2 | 3/2003 | Gilmore et al. |
| 6,536,580 B1 | 3/2003 | Fritzsche |
| 6,595,349 B2 | 7/2003 | Macswan |
| 6,629,018 B2 | 9/2003 | Mondie et al. |
| 6,629,593 B2 | 10/2003 | Zeitler |
| 6,694,852 B1 | 2/2004 | Ours et al. |
| 6,719,119 B1 | 4/2004 | Hendzel et al. |
| 6,725,631 B2 | 4/2004 | Skrak et al. |
| 6,725,752 B1 | 4/2004 | Torrazza |
| 6,782,993 B2 | 8/2004 | Bernard et al. |
| 6,843,365 B2 | 1/2005 | Baker |
| 6,907,978 B2 | 6/2005 | Evans et al. |
| 6,957,736 B2 | 10/2005 | Bonifer et al. |
| 6,982,731 B2 | 1/2006 | Hall et al. |
| 7,044,706 B2 * | 5/2006 | Jung .................. B65G 47/90 |
| | | 414/737 |
| 7,134,833 B2 * | 11/2006 | de Koning ............ B65G 47/91 |
| | | 414/753.1 |
| 7,147,097 B2 | 12/2006 | Lemm |
| 7,150,383 B2 | 12/2006 | Talken |
| 7,153,085 B2 * | 12/2006 | Clark .................. B25J 15/0616 |
| | | 901/30 |
| 7,174,695 B2 | 2/2007 | Porter et al. |
| 7,182,007 B2 | 2/2007 | Berge et al. |
| 7,261,198 B2 | 8/2007 | Tatar et al. |
| 7,638,729 B2 | 12/2009 | Park et al. |
| 7,641,043 B2 | 1/2010 | Vestergaard et al. |
| 7,690,497 B2 | 4/2010 | Radwallner et al. |
| 7,720,567 B2 | 5/2010 | Doke et al. |
| 7,909,153 B2 | 3/2011 | Pogue |
| 7,963,086 B2 | 6/2011 | Porter et al. |
| 8,161,854 B2 | 4/2012 | Fourney |
| 8,414,042 B2 * | 4/2013 | Landes ................. B65G 47/90 |
| | | 294/67.31 |
| 8,463,428 B2 | 6/2013 | Doke et al. |
| 8,561,790 B2 | 10/2013 | Brayman et al. |
| 8,684,169 B2 | 4/2014 | Itoh et al. |
| 8,827,623 B2 | 9/2014 | Stelter et al. |
| 9,110,773 B2 | 8/2015 | Roush |
| 9,216,862 B2 | 12/2015 | Wallace |
| 9,334,111 B2 | 5/2016 | Hoynash |
| 9,475,653 B2 | 10/2016 | Dugat et al. |
| 9,701,490 B2 * | 7/2017 | Morency ................. B25J 11/00 |
| 9,926,094 B2 | 3/2018 | Dugat et al. |
| 9,981,810 B2 | 5/2018 | Dugat et al. |
| 9,988,218 B2 | 6/2018 | Dugat et al. |
| 10,232,409 B2 | 3/2019 | Dugat et al. |
| 10,835,928 B2 | 11/2020 | Bellar et al. |
| 10,843,876 B2 | 11/2020 | Dugat |
| 11,186,399 B2 | 11/2021 | Dugat et al. |
| 11,836,672 B2 | 12/2023 | Lert, Jr. et al. |
| 11,845,610 B2 | 12/2023 | Lert, Jr. et al. |
| 2001/0003939 A1 | 6/2001 | Liu et al. |
| 2001/0001516 A1 | 8/2001 | Hardgrove et al. |
| 2002/0134209 A1 | 9/2002 | Burman et al. |
| 2002/0162302 A1 | 11/2002 | Thomson et al. |
| 2003/0081228 A1 | 5/2003 | Spaulding et al. |
| 2003/0150695 A1 | 8/2003 | Cotter et al. |
| 2004/0194428 A1 | 10/2004 | Close et al. |
| 2004/0211651 A1 | 10/2004 | Hall |
| 2004/0226803 A1 | 11/2004 | Brixius et al. |
| 2004/0250670 A1 | 12/2004 | Porter et al. |
| 2006/0074525 A1 | 4/2006 | Close et al. |
| 2006/0206233 A1 | 9/2006 | Carpenter et al. |
| 2006/0260451 A1 | 11/2006 | Capodieci |
| 2007/0051585 A1 | 3/2007 | Scott et al. |
| 2007/0025512 A1 | 6/2007 | Gertsenshteyn et al. |
| 2007/0125209 A1 | 6/2007 | Hilgendorf |
| 2007/0125211 A1 | 6/2007 | Hilgendorf |
| 2007/0125212 A1 | 6/2007 | Hilgendorf |
| 2007/0162174 A1 | 7/2007 | Doke et al. |
| 2007/0163099 A1 | 7/2007 | Townsend et al. |
| 2007/0221471 A1 | 10/2007 | Fourney et al. |
| 2008/169171 A1 | 7/2008 | Itoh et al. |
| 2009/0065327 A1 | 3/2009 | Evangelista et al. |
| 2009/0113853 A1 | 5/2009 | Porter et al. |
| 2010/0272961 A1 | 10/2010 | Costin, Jr. |
| 2014/0041989 A1 | 2/2014 | Wallace |
| 2014/0290827 A1 | 10/2014 | Heeman et al. |
| 2014/0346008 A1 | 11/2014 | Hoynash |

(56) References Cited

U.S. PATENT DOCUMENTS

2021/0380338 A1   12/2021   Dugat
2021/0380341 A1   12/2021   Dugat

FOREIGN PATENT DOCUMENTS

| | | | |
|---|---|---|---|
| DE | 2259273 C2 | 8/1984 | |
| DE | 19724040 C2 | 7/1999 | |
| DE | 102017114728 B3 * | 10/2018 | ............ B21D 28/06 |
| EP | 1329388 B1 | 6/2006 | |
| JP | 2000343486 A | 12/2000 | |
| JP | 2002002636 A | 1/2002 | |
| JP | 2003081228 A | 3/2003 | |
| WO | 2006025868 A1 | 3/2006 | |

* cited by examiner

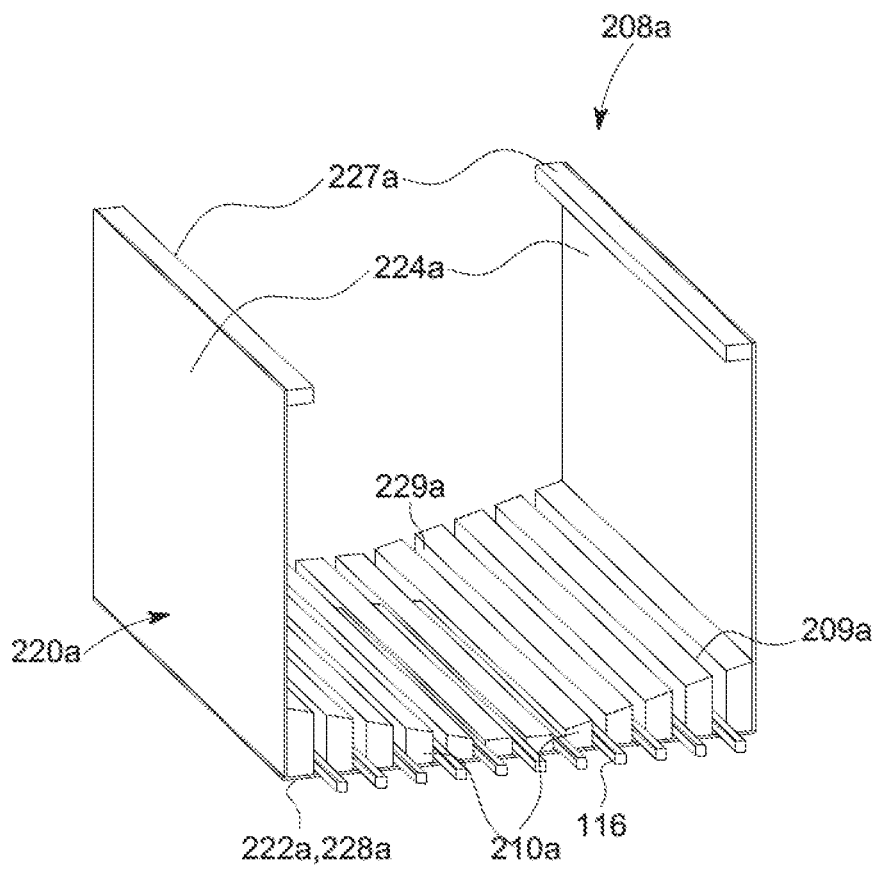
FIG. 2A
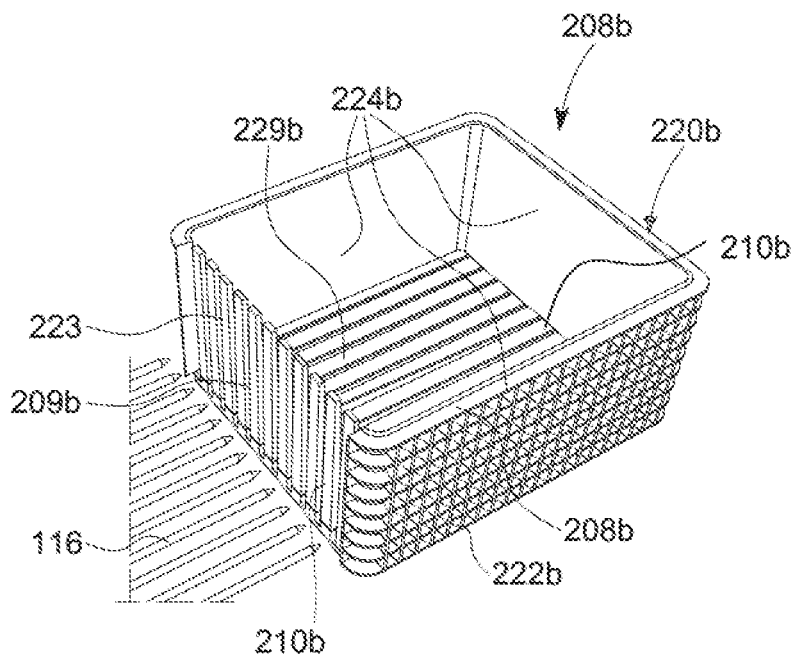
FIG. 2B1

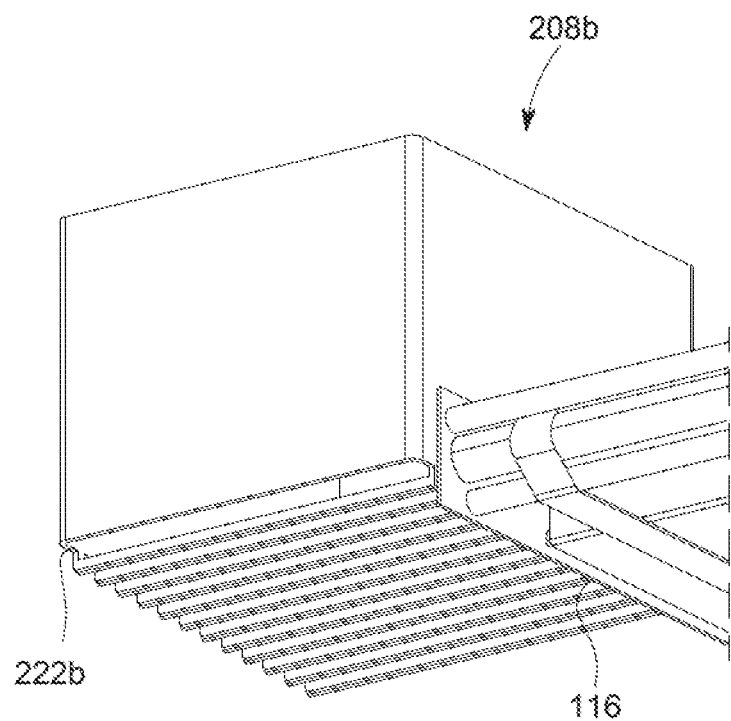
FIG. 2B2
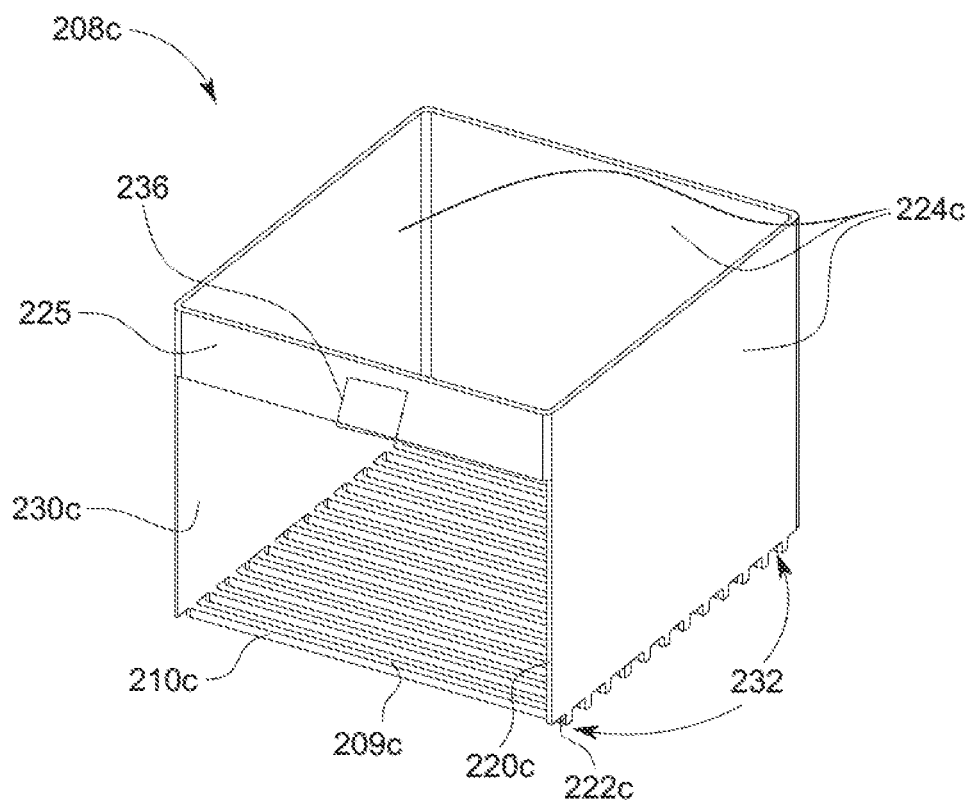
FIG. 2C

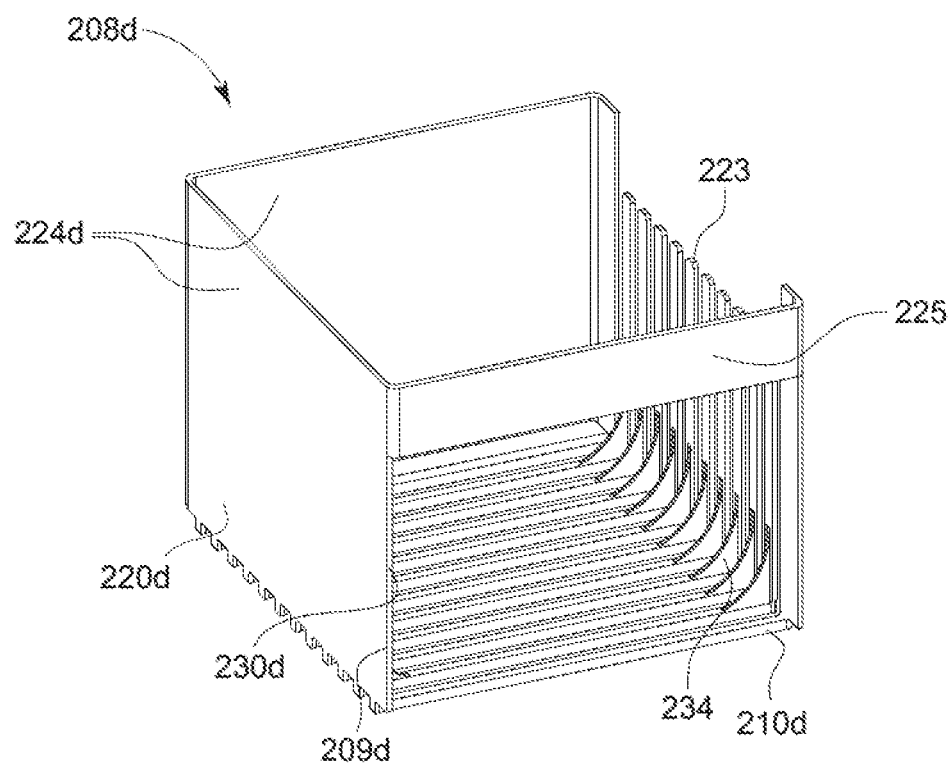
FIG. 2D1
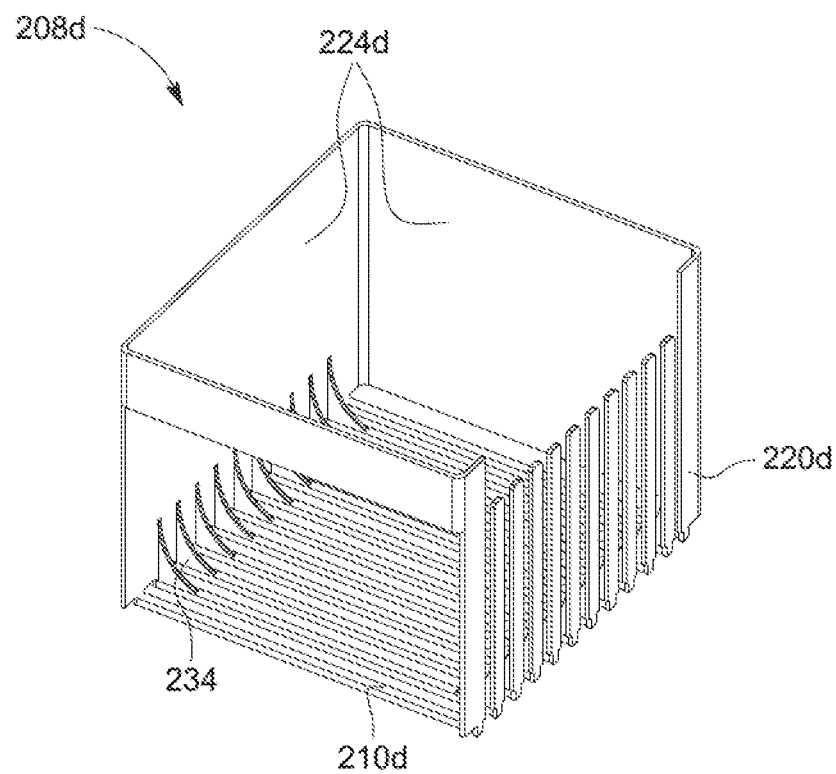
FIG. 2D2

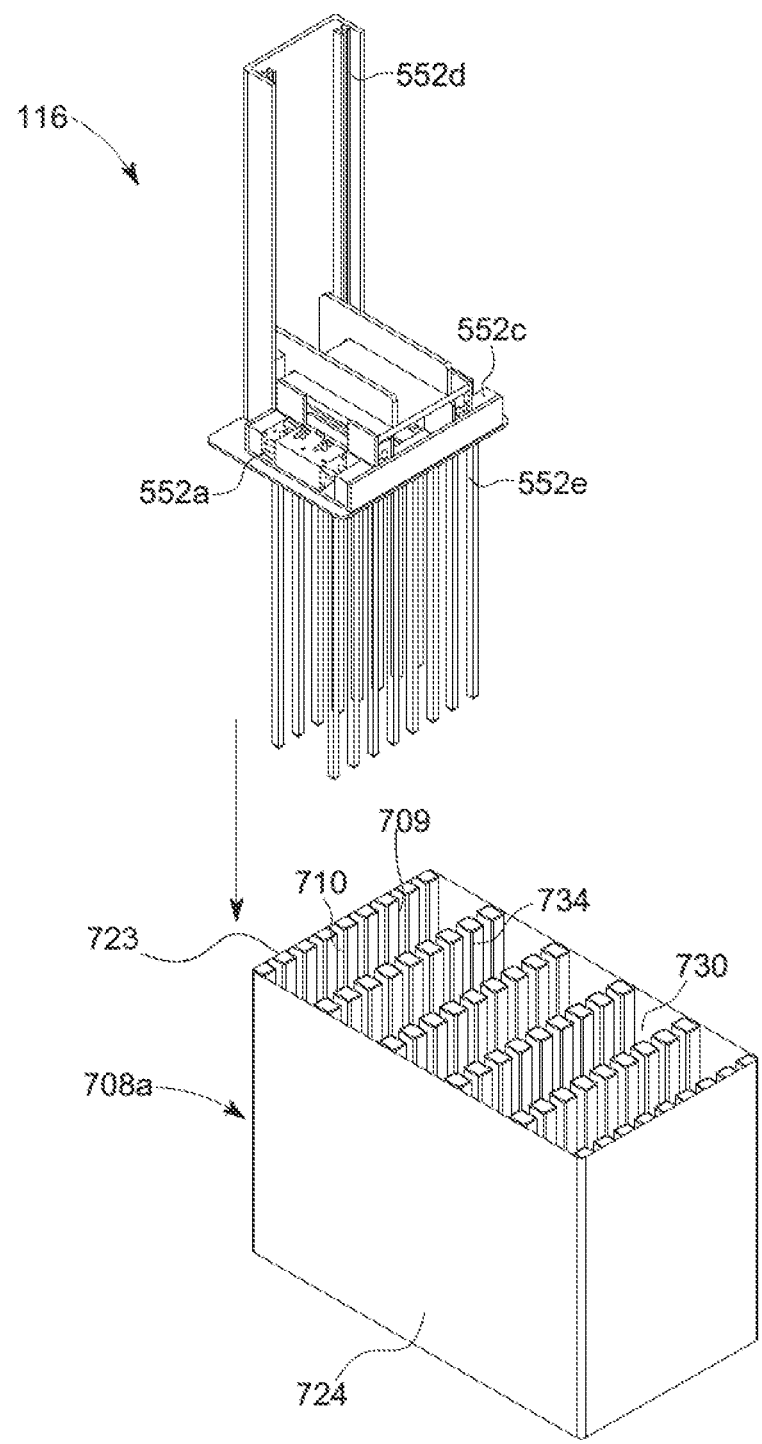
FIG. 7A1

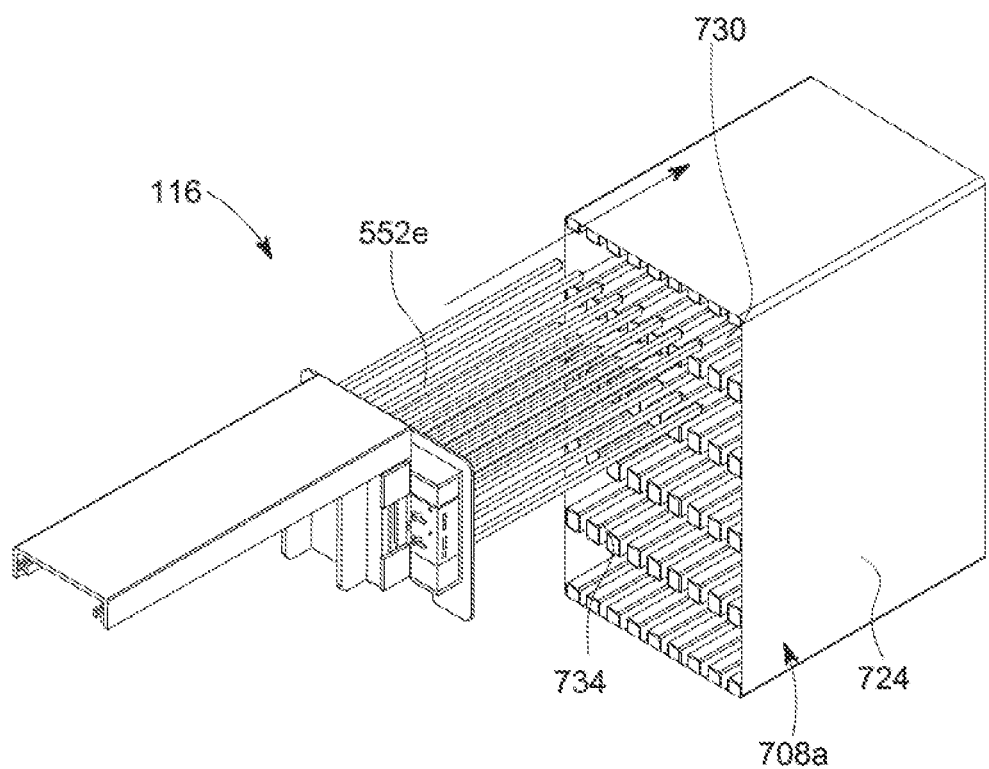
FIG. 7A2

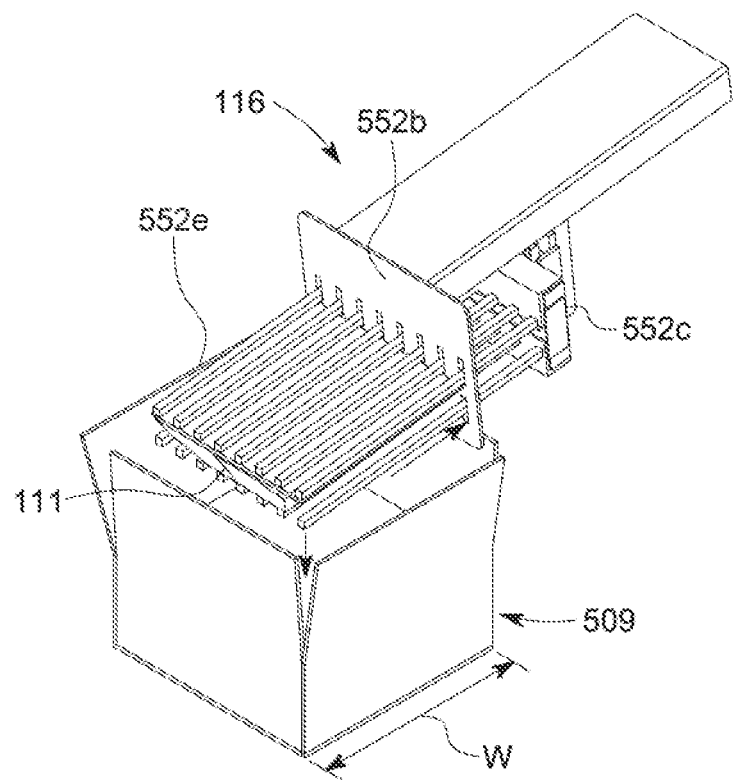
FIG. 7D1
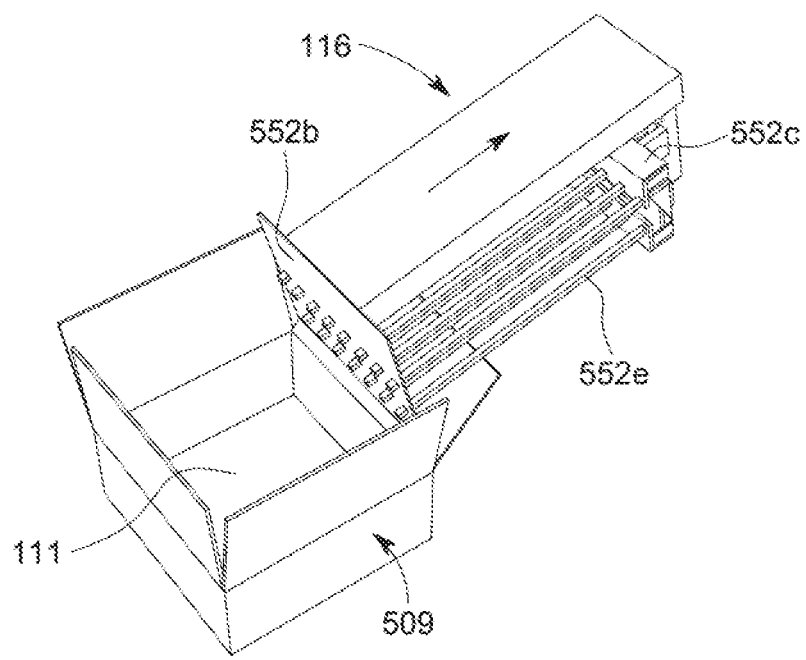
FIG. 7D2

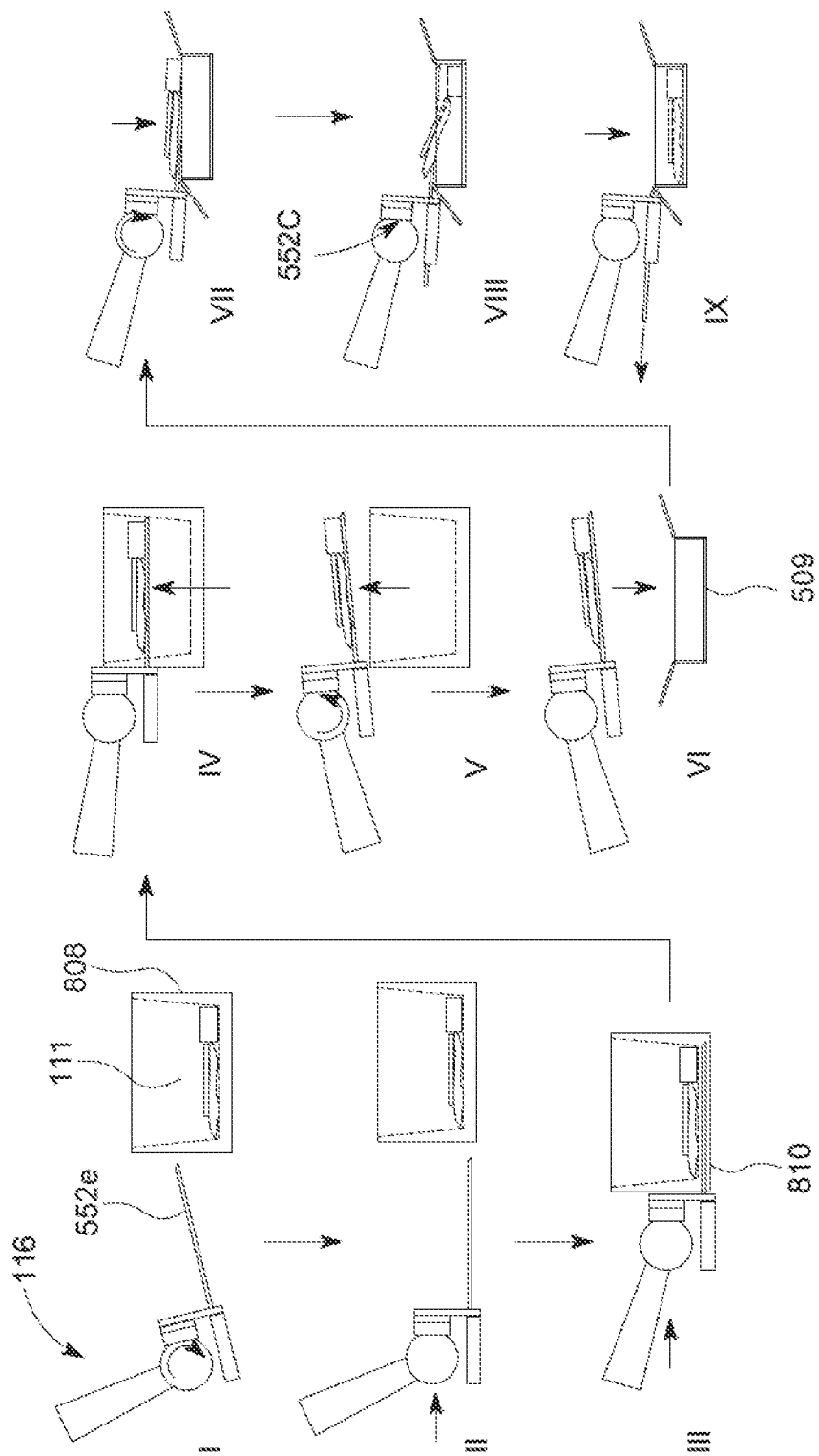

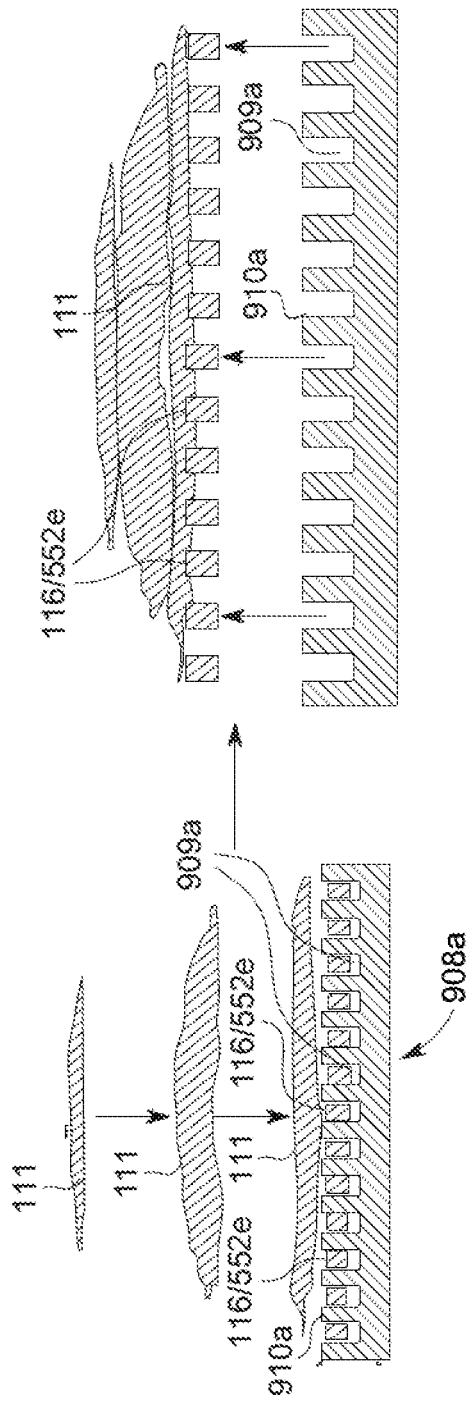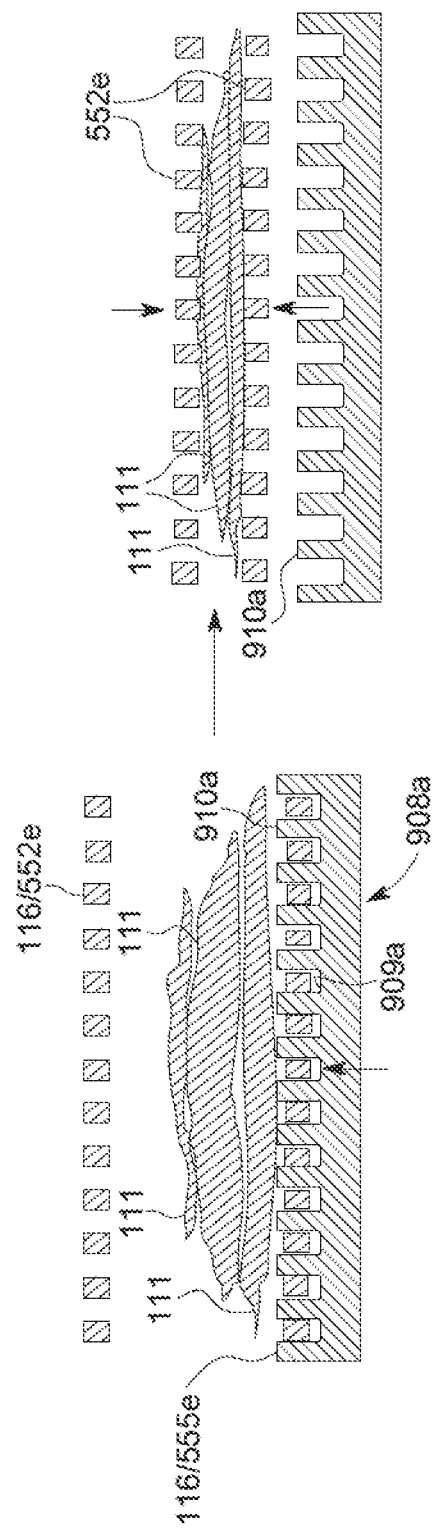

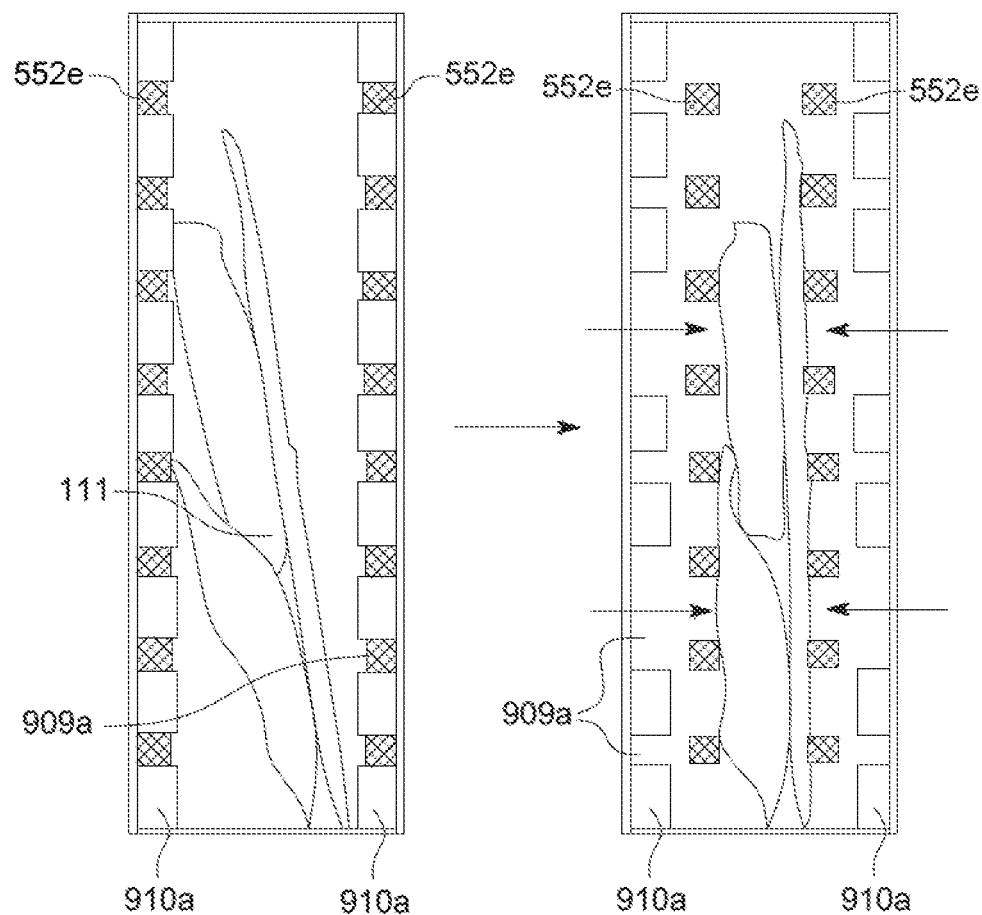
FIG. 9B2

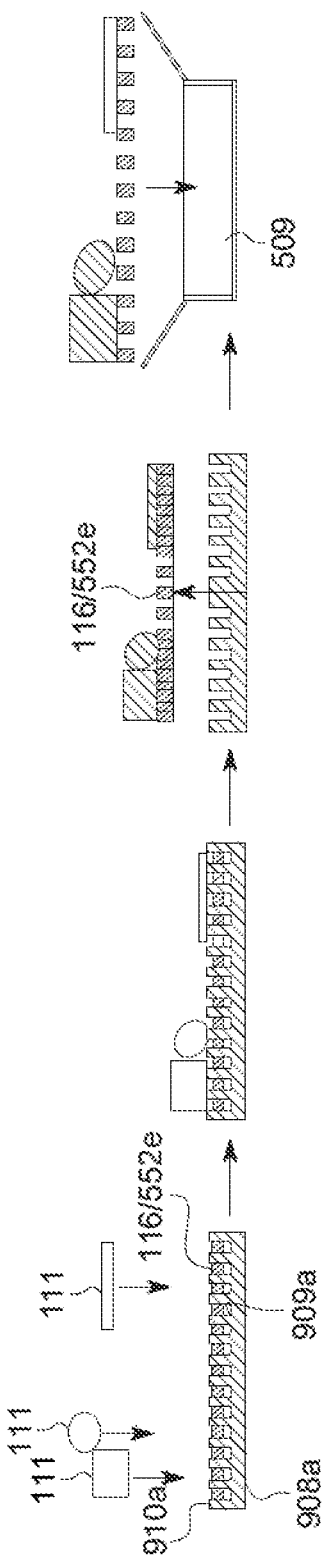
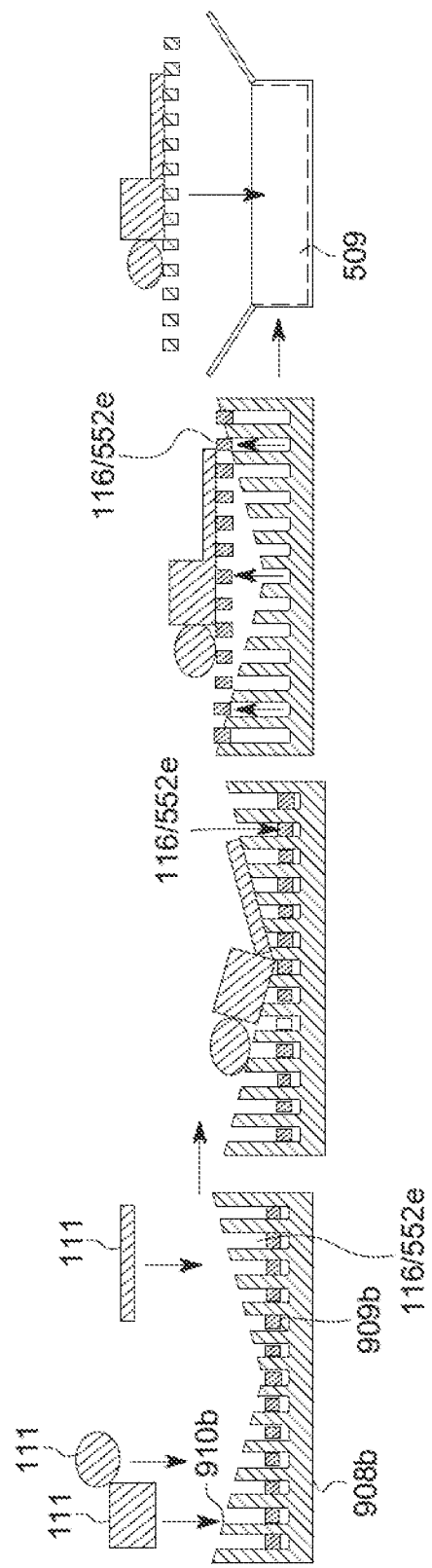
FIG. 9C
FIG. 9D

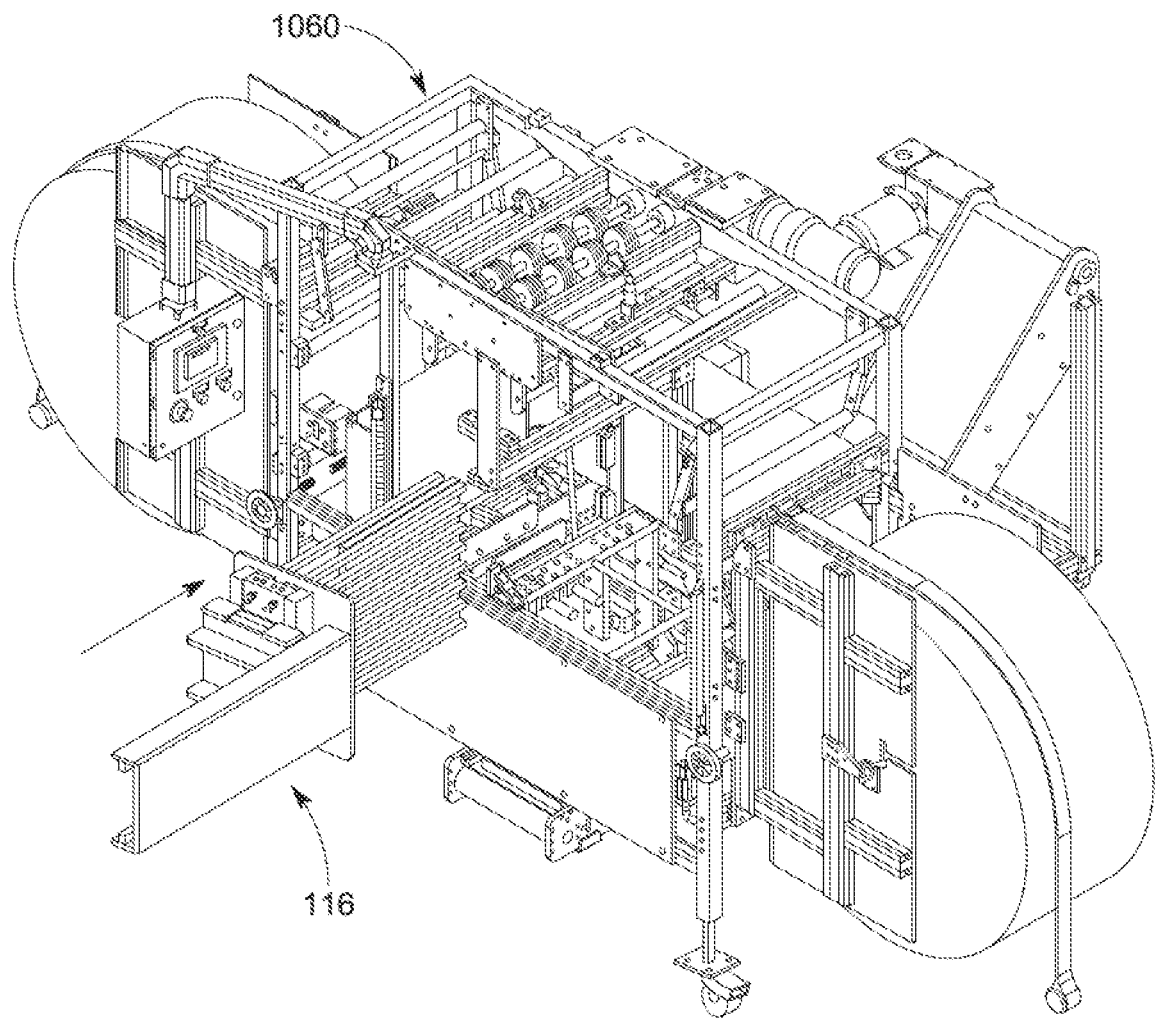
FIG. 10A1

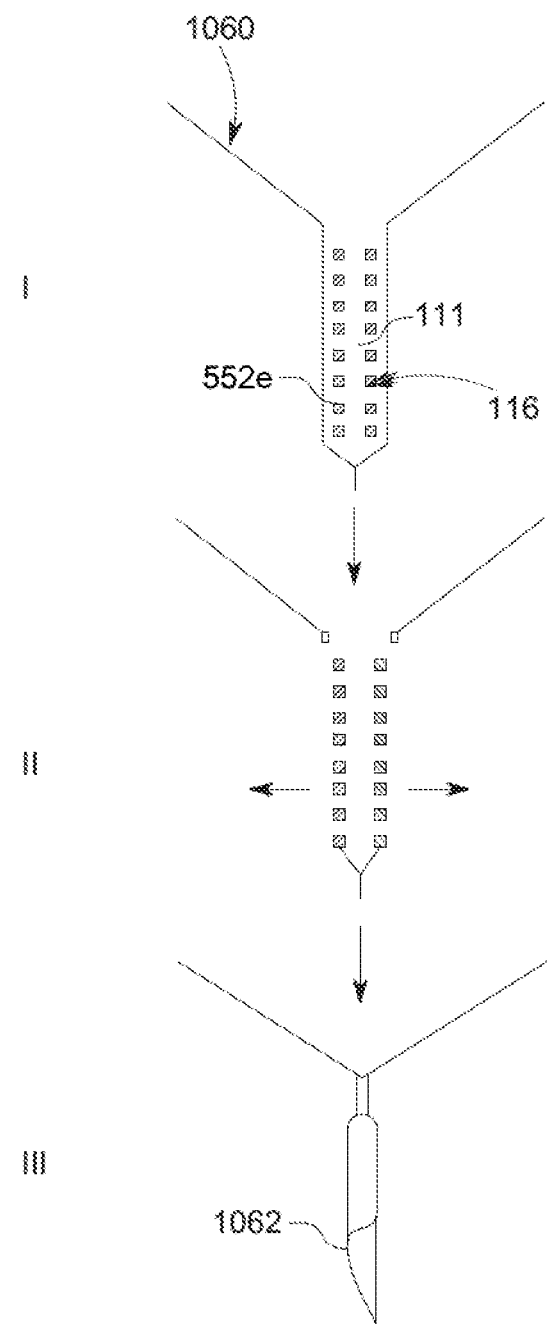
FIG. 10A2

Figure 14D

1400 - A METHOD OF HANDLING ITEMS

| 1479 - PROVIDING A TOTE HANDLER COMPRISING A GRIP HAND WITH FINGERS |

| 1481 - PROVIDING A TOTE COMPRISING A TOTE FRAME WITH A CHAMBER FOR RECEIVING THE ITEMS THEREIN, THE TOTE FRAME HAVING TOOL RELIEFS THERETHROUGH WITH TOOL RECEPTACLES THEREBETWEEN |

| 1482 - REMOVING THE ITEMS FROM THE TOTE BY PASSING THE FINGERS OF THE GRIP HAND THROUGH THE TOOL RECEPTACLES AND LIFTING THE ITEMS WITH THE FINGERS WHILE RETRACTING THE GRIP HAND FROM THE TOTE |

| 1483 - SELECTIVELY INSERTING THE FINGERS INTO RELIEFS IN ONE OR MORE CHAMBERS IN THE TOTE |

| 1484 - MAINTAINING THE ITEMS IN A PRE-DETERMINED CONFIGURATION WHILE MOVING THE ITEMS WITH THE GRIP HAND |

| 1485 - STACKING THE ITEMS IN PRE-DETERMINED CONFIGURATIONS WITH THE TOTE HANDLER |

| 1486 - SELECTIVELY GRIPPING AND RELEASING THE ITEMS BY SELECTIVELY MOVING SETS OF THE FINGERS BETWEEN AND OPEN AND CLOSED POSITION |

| 1487 - SELECTIVELY RELEASING THE ITEMS INTO THE TOTE BY SELECTIVELY EXTENDING THE FINGERS A DISTANCE INTO THE TOTE AND THEN MOVING THE FINGERS APART |

| 1488 - TILTING THE TOTE WITH THE GRIP HAND WHILE RELEASING THE ITEMS FROM THE GRIP HAND INTO THE TOTE |

| 1489 - FORMING A TOTE WALL BY STACKING THE TOTES |

| 1490 - LOADING GROUPS OF THE ITEMS INTO EACH OF THE TOTES ON A FIRST SIDE OF THE TOTE WALL AND UNLOADING THE GROUPS OF THE ITEMS FROM EACH OF THE TOTES WITH THE TOTE HANDLER ON A SECOND SIDE OF THE TOTE WALL |

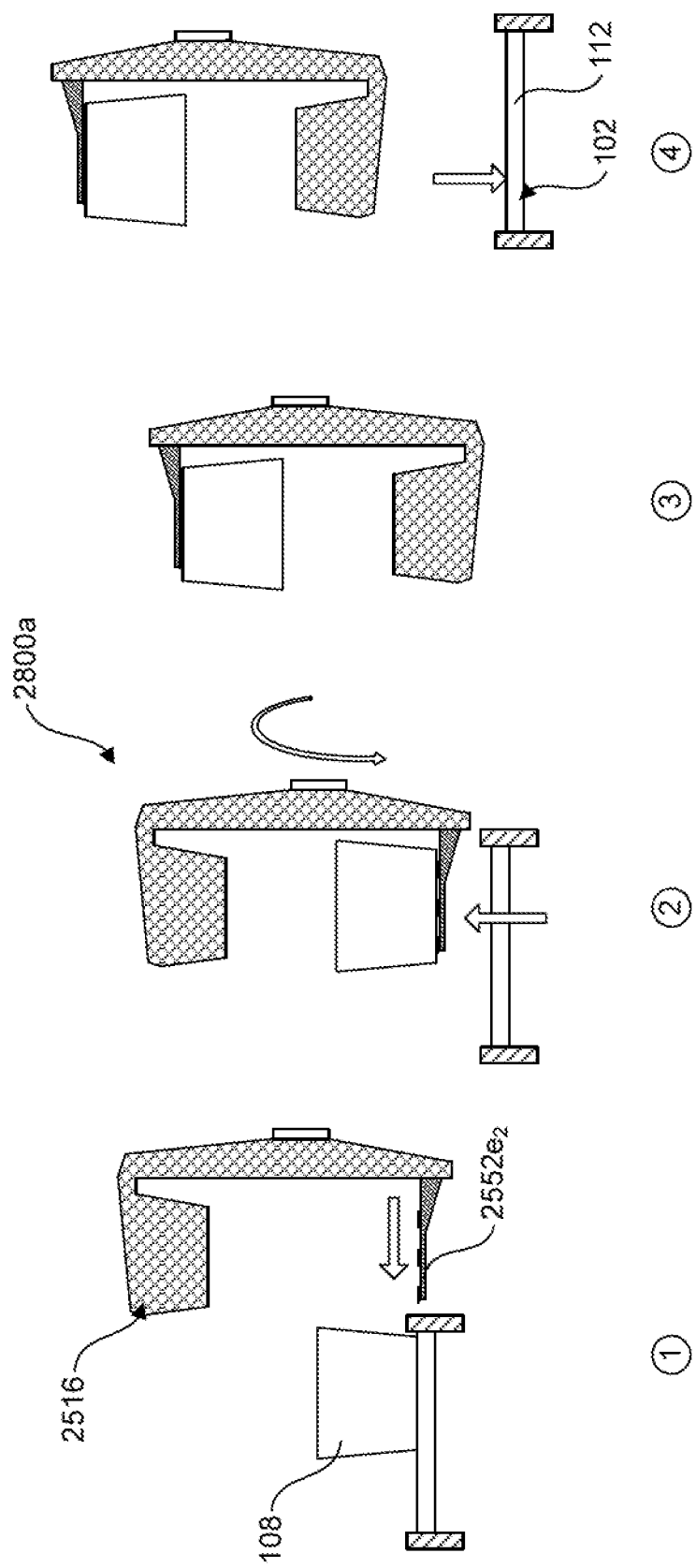

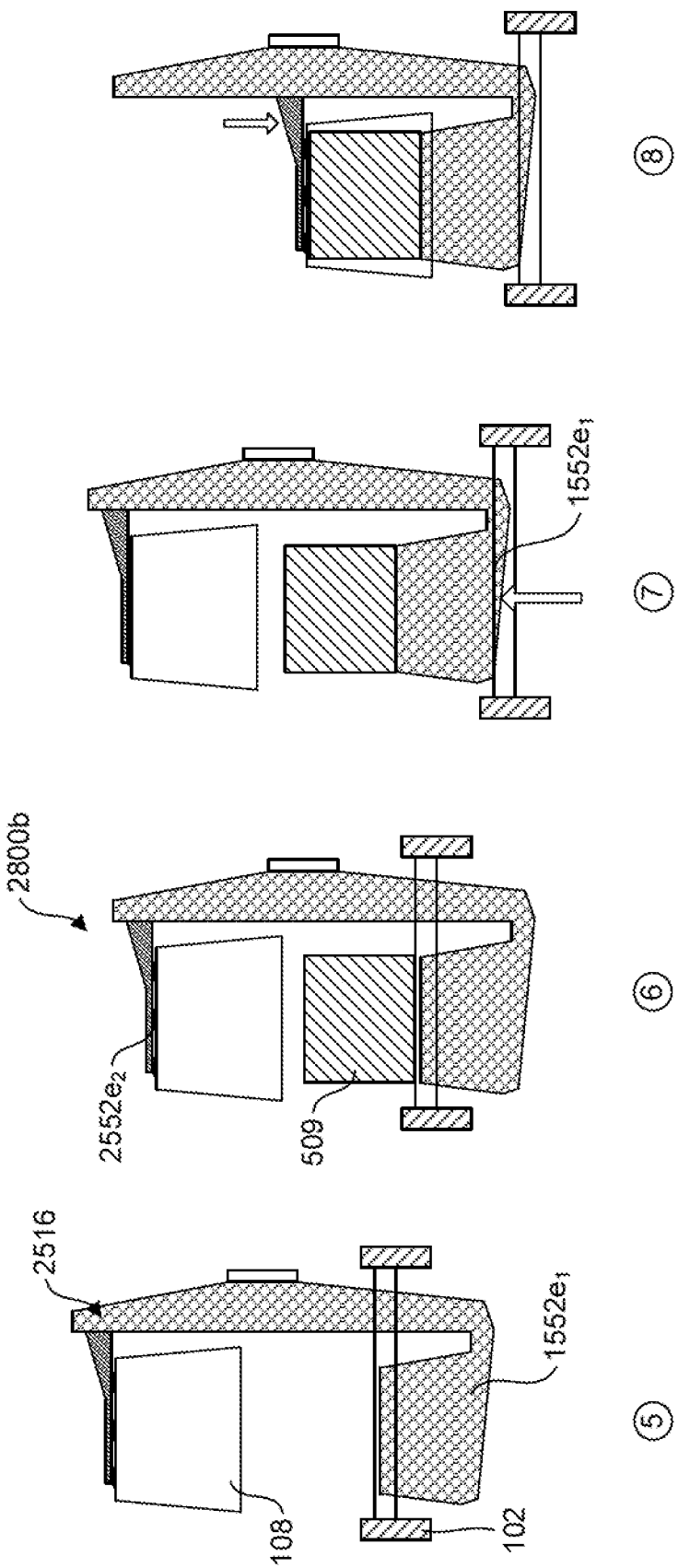

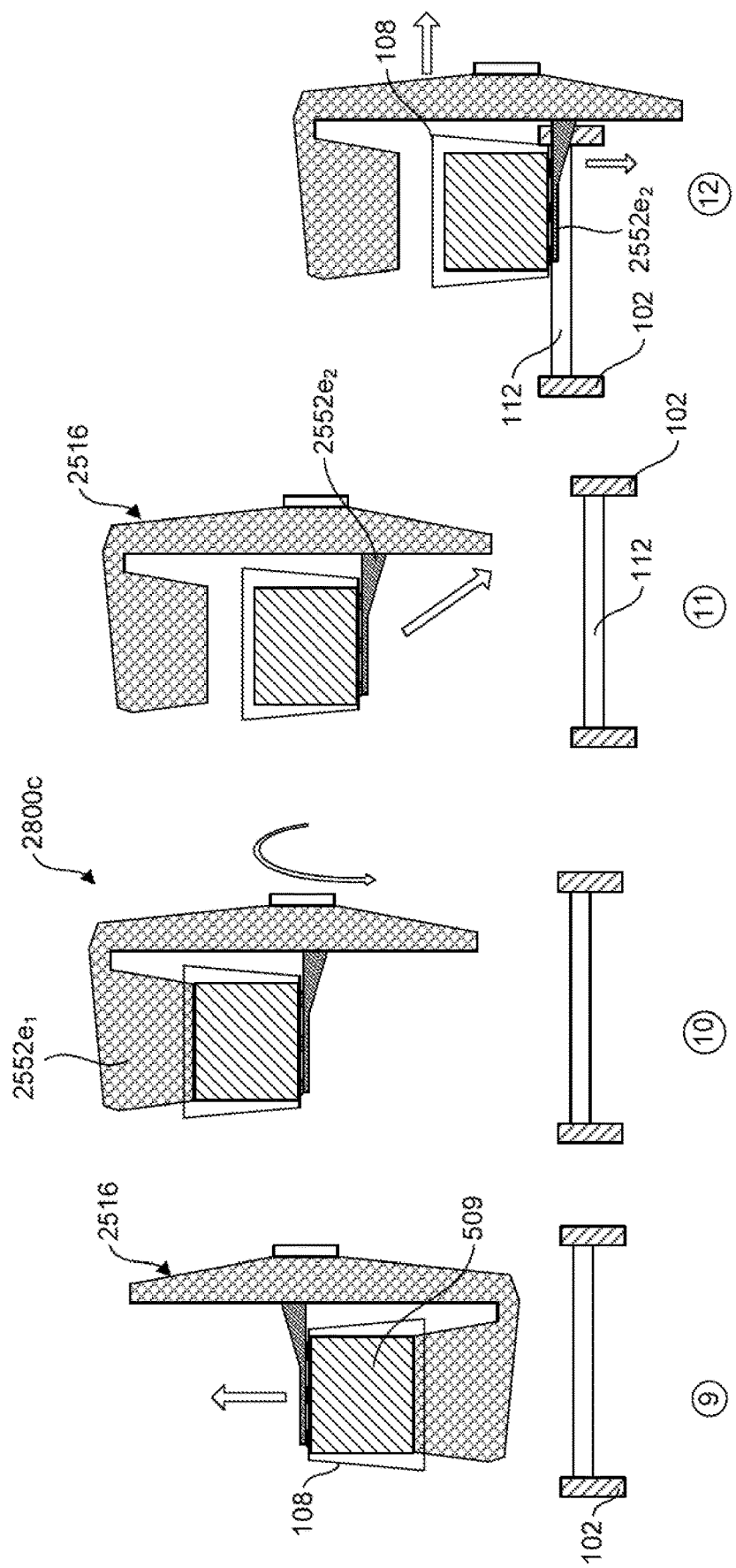

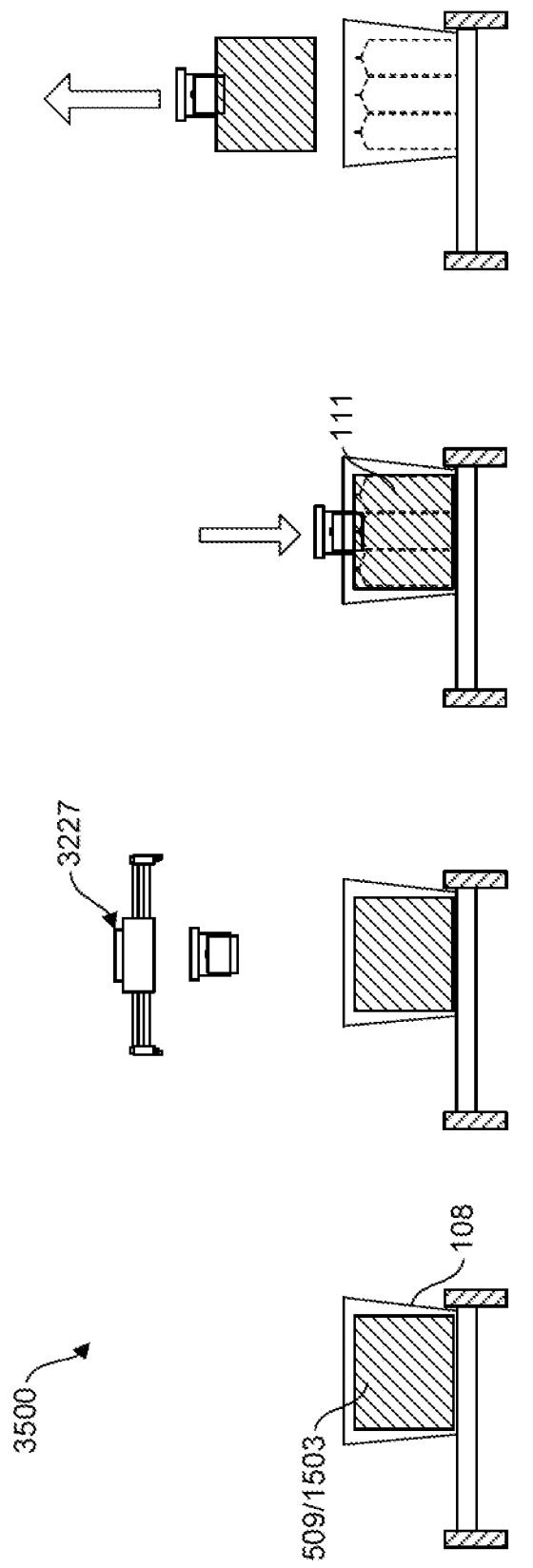

TOTE HANDLING SYSTEM WITH TOTE HANDLER AND METHOD OF USING SAME

CROSS-REFERENCE TO RELATED APPLICATIONS

This application claims the benefit of U.S. Patent Application No. 63/034,105, filed on Jun. 3, 2020 which claims the benefit of U.S. Patent Application No. 62/962,721, filed on Jan. 17, 2020, the entire contents of which is hereby incorporated in its entirety herein.

BACKGROUND

The present disclosure relates generally to material handling equipment. More specifically, the present disclosure relates to equipment, such as conveyors, robots, and shipping containers for sorting, transporting, and storing various materials.

Material handling systems are used by distributors to assemble and package items for shipment. The material handling systems may include conveyors for transporting the items from one location to another. Examples of material handling techniques that may be used are provided in U.S. Pat. Nos. 5,971,132; 4,200,178; 9,334,111; 5,984,078; 6,227,377; and 10,336,542, the entire contents of which are hereby incorporated by reference herein to the extent not inconsistent with this disclosure. Other examples of material handling devices are provided in U.S. patent/application Ser. No. 14/550,826; 62/210,348; Ser. Nos. 15/248,967; 14/775,551; 15/273,370; 14/859,295; and U.S. Pat. No. 9,926,094 commonly owned by Applicant, the entire contents of which are hereby incorporated by reference herein to the extent not inconsistent with this disclosure.

Despite advances in material handling technology, there remains a need for devices capable of efficiently manipulating items as they are processed for packaging, storage, and/or delivery, and for addressing explosive growth in ecommerce and retail business to consumer shipments which use automated solutions for processing and packing unit items. There also remains a need for techniques for efficiently moving items between shipping containers and totes without dropping or damaging merchandise. The present disclosure seeks to fill such needs.

SUMMARY

In at least one aspect, the disclosure relates to a tote handler for manipulating items for delivery. The tote handler comprises a foot positioned on a surface; an arm supported by the foot and movable thereabout; and an adjustable grip hand supported by the arm and movable thereabout. The adjustable grip hand comprises a bearing plate connected to the arm; a base slidably movable along the bearing plate; and finger assemblies supported by the base. Each of the finger assemblies comprises an actuator and fingers. The finger assemblies are movable by the actuators between a closed with the fingers urged together and an open position with the fingers urged apart, the fingers selectively movable by the actuators between a retracted and an extended position.

In another aspect, the disclosure relates to a tote handler for manipulating items for delivery. The tote handler comprises a foot positioned on a surface; a support supported by the foot; and a merger grip hand supported by the support and movable thereabout. The merger grip hand comprises a base; insert fingers secured to the base, and suction fingers. Each of the insert fingers comprises a polygonal body having a peripheral surface shaped for engaging receipt within an inner surface of a tote. The suction fingers are movably connected to the base. Each of the suction fingers comprises elongate members with suction cups thereon. The suction fingers are movable between a closed position with the suction fingers urged towards the insert fingers and an open position with the suction fingers urged away from the insert fingers.

In yet another aspect, the disclosure relates to a tote handling system for manipulating items for delivery. The tote handling system comprises a mobile carrier; a tote handler positioned about the mobile carrier. The tote handler comprises a foot positioned on a surface; a support supported by the foot; a grip hand supported by the support and movable thereabout, and a capture table. The grip hand comprises movable fingers for selectively gripping and releasing the items. The capture table is positionable about the mobile carrier. The capture table comprises a bottom and walls. At least one of the bottom and the walls comprises table reliefs. Each of the table reliefs comprises a fixed end and an unfixed end with an elongate body there between. The fixed end of each of the table reliefs is secured to one of the walls. The table reliefs are in an aligned positioned parallel to each other with a table receptacle defined between the table reliefs. The table receptacles are shaped to receive the fingers of the grip hand therethrough for engagement with the items.

In still another aspect, the disclosure relates to a method of handling unit items. The method comprises positioning a tool handler about a conveyor, the tool handler comprising a grip hand with insert fingers and suction fingers; positioning a tote onto the conveyor; lifting the tote with the tool handler by passing the suction fingers from a first position under the tote through the conveyor and to a second position above the conveyor; inverting the tote by rotating the tool handler; positioning a shipping container having items therein onto the conveyor below the tote; merging the tote with the shipping container by moving the suction fingers towards the insert fingers; after the merging, inverting the tote and the shipping container by rotating the tool handler; and releasing the tote onto the conveyor by moving the suction fingers away from the insert fingers.

Finally, in another aspect, the disclosure relates to a method of handling items. The method involves providing a tool handler comprising a grip hand with fingers; providing a capture table comprising a tote frame with a chamber for receiving the items therein, the tote frame having table reliefs therethrough with table receptacles therebetween; and removing the items from the capture table by passing the fingers of the grip hand through the table receptacles with the fingers and lifting the items with the grip hand while retracting the grip hand from the capture table.

In at least one aspect, the disclosure relates to a tote for a material handling system. The material handling system comprises a mobile carrier and a grip hand comprising fingers. The tote comprises a tote frame movably positionable on the mobile carrier. The tote frame comprises a bottom and walls extending above the bottom to define a chamber shaped to receive items therein. At least one of the bottom and the walls comprises tool reliefs. Each of the tool reliefs comprises a fixed end and an unfixed end with an elongate body there between. The fixed end of each of the tool reliefs is secured to one of the walls. The tool reliefs are in an aligned positioned parallel to each other with a tool receptacle defined between the tool reliefs. The tool receptacles are shaped to receive the fingers of the grip hand therethrough for engagement with the items in the chamber.

In another aspect, the disclosure relates to a grip hand for a material handling system. The material handling system comprises a robot. The grip hand comprises a bearing movably supported by the robot, a base slidably movable along the bearing, and finger assemblies supported by the base. Each of the finger assemblies comprises an actuator and fingers. The fingers extend from the actuator and are movable therewith. Each of finger assemblies is movable by the actuators towards a closed position with the fingers on each of the actuators together and an open position with the fingers on each of the actuators apart.

In yet another aspect, the disclosure relates to a tote system for handling items. The tote system comprises a mobile carrier, totes positionable on the mobile carrier, and a tote handler positioned about the mobile carrier. The tote handler comprises a foot positioned on a surface, an arm movably supported on the base, and a grip hand supported by the arm and movable therewith. The grip hand comprises a bearing movably supported by a robot, a base slidably movable along the bearing, and finger assemblies supported by the base. Each of the finger assemblies comprise an actuator and fingers. The fingers extend from the actuator and movable therewith. Each of finger assemblies are movable by the actuators towards a closed position with the fingers on each of the actuators together and an open position with the fingers on each of the actuators apart.

Finally, in another aspect, the disclosure relates to a method of handling items. The method comprises providing a tote handler comprising a grip hand with fingers, providing a tote comprising a tote frame with a chamber for receiving the items therein, the tote frame having tool reliefs therethrough with tool receptacles therebetween, and removing the items from the tote by passing the fingers of the grip hand through the tool receptacles and lifting the items with the fingers while retracting the grip hand from the tote.

In at least one other aspect, the disclosure relates to a tote handling system for manipulating items for packaging, storage, and/or delivery. The handling system comprises a tote handler with a grip hand and a tote. The grip hand comprises a movable palm with fingers extending therefrom. The tote comprises a frame for supporting the items. The frame defines a bottom comprising tool reliefs (struts) with tool receptacles therebetween. The tool reliefs may have a surface for receiving the items thereon. The tool receptacles are shaped to receive the fingers of the grip hand therethrough whereby the grip hand is capable of engaging the items in the tote without engaging the tote.

In another aspect, this disclosure relates to a handling system for manipulating items for delivery, the handling system comprising: a tote conveyor, a grip hand with fingers, and a tote with tool reliefs.

In yet another aspect, this disclosure relates to a material handling system substantially as shown and described herein.

Other aspects involve:
a method of decanting from a shipping container to a tote by merging the tote to a pre-opened shipping container by inverting the tote and placing inverted tote on shipping containers then holding/clamping the tote on the opened shipping containers and re-inverting the pair.
a method of merging tote surface to contents of shipping containers and eliminating drops or falls into the tote;
a method of merging the tote with the shipping container in a single tool that merges the tote and the shipping containers together;
a method of multiple processes in a single merger grip hand (decant tool) involving insert (decant) fingers that fit between rollers of the tote conveyor and combine in layers to fill the form of the tote cavity to trap the shipping container and items contained therein during rotation;
a merger grip hand with insert fingers that fit between the rollers of the tote conveyor, and with suction;
a single merger grip hand (decant tool) that both picks the tote from the tote conveyor and picks the shipping containers from the same or different conveyor, then merges the two together so as the items in the shipping containers are transferred into the tote without dropping, falling or collision with the bottom inside surface of the tote by merging the empty tote with the opened shipping containers then inverting the mated shipping containers to the tote right side up position;
a method of decanting from the shipping container to the tote or a sub-compartment of a sub-divided tote;
a pack-decanter capable of picking and rotating for the purpose of transferring pre-opened shipping containers (top removed) into a transfer (capture) table;
a subdivided tote with an open top, a rectilinear shape, at least one movable wall, and with walls and floors made with tooling reliefs and voids;
a capture table with the ability to change shape by controlling movement of at least one wall or two or more interlacing walls to affect the size of the shipping container for the purpose of matching the size of the shipping container and holding the items packed in the shipping containers after the shipping container is removed, thereby keeping contents or items in the shipping containers in the same orientation as they were packed in the shipping containers;
a pack-decant tool moved by a robot (or manipulator) with programmable combinations of suction fingers that extend to match the length of a side of the capture table and/or the tote or tote compartment size along one or more sides; and
a method of merging the tote to contents of the shipping container in a manner that eliminates drops or falls into the tote.

The summary is not intended to be limiting on the disclosure or the claims provided herein, and is to be considered in light of the drawings and description provided herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 2A, 2B1-2B2, 2C, 2D1-2D2, 2E-2H are schematic diagrams depicting example totes with tool reliefs.

FIGS. 7A1-7A2, 7B, 7C, and 7D1-7D2 are schematic diagrams depicting the grip hand in use with various totes and shipping containers.

FIGS. 8A-8C are schematic diagrams depicting the grip hand performing various tote operations.

FIGS. 9A, 9B1-9B2, 9C, and 9D are schematic diagrams depicting various loading and picking operations.

FIGS. 10A1-10A2, 10B, 10C, and 10D are schematic diagrams depicting the grip hand in use with packaging equipment.

FIG. 14D is a flowchart depicting a method of handling items.

FIGS. 28A-28L are schematic diagrams depicting a handling operation using the item tote hand.

FIGS. 35A-35D are schematic diagrams of an extraction operation using the ACE.

DETAILED DESCRIPTION

Figure 1A:
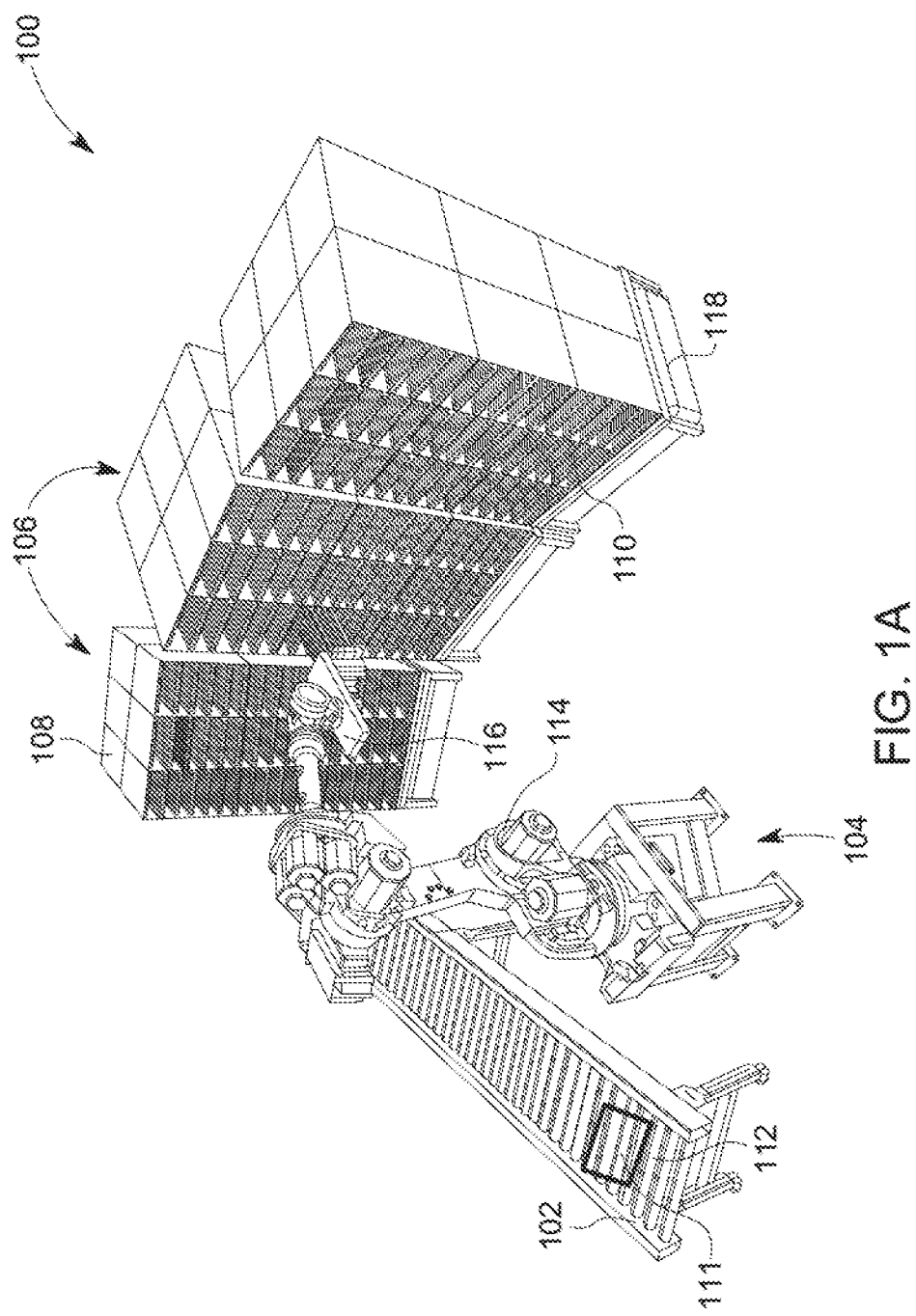
FIG. 1A-1D are schematic diagrams depicting a tote handling system, the tote handling system including a tote conveyor, a tote handler with a grip hand, and a tote wall.

The description that follows includes exemplary apparatus, methods, techniques, and/or instruction sequences that embody techniques of the present subject matter. However, it is understood that the described embodiments may be practiced without these specific details.

Tote Handling System—with Tote Handler with Grip Hand, Slotted Totes, and Tote Conveyor The present disclosure relates to a tote handling system for manipulating items for receipt, storage, packaging, and/or shipment. The handling system may include a tote conveyor, a tote handler, and totes. Manipulating the items may include packing (e.g., inserting, loading, etc.) into the totes and picking (e.g., removing, unloading, etc.) items out of the totes. The manipulating may also involve transferring the items between locations while inside or separate from the totes. The delivering may involve passing the items between various locations and/or preparing the items for transport to various locations inside a facility and/or beyond (e.g., for shipment).

"Item" refers to a unit of use goods containing consumer merchandise in individual packaging. One or more individual pieces may be contained within the unit and within the individual packaging. A "shipping container" refers to a shipping container, such as a carton, box, or other package, that houses the items received from a supplier. "Tote" refers to a container (storage or carrier) capable of carrying one or more items received from the shipping container along the tote handling system.

The tote handler includes a grip hand for moving the items to and from the tote, the tote conveyor, and/or other locations. The tote may be shaped to store the items therein. The tote may be stacked into tote walls, passed along the tote conveyor, and/or between locations manually or by the tote handler. The tote has tool reliefs with tool receptacles therebetween that support the items in the tote and that allow the grip hand to pass therethrough to engage (e.g., lift, grip or release) the items within the tote. This may allow the grip hand to pick and place the items in and out of the tote without disturbing the tote.

The tote handling system is intended to provide one or more of the following capabilities, among others: to reduce labor demands without being disruptive to existing ecommerce fulfillment operations, to automate pack out operations in order fulfillment, to provide automatic unloading and/or placement of single and multiple items, to enable placement of picked items in totes in previously picked to intermediate shipping containers, to automate picking items or item groups from put walls or mobile shelving, to enable automatic unloading and placement of items into shipping containers (e.g., boxes, polybags and other forms of packaging), to flexibly able to adapt to existing manual pick operations while eliminating most labor in pack out operations, to allow robots or pick and place machines to pick and pack multiple items into packaging without requiring the use of vision systems, to maintain multi-item arrangements and/or layering accomplished in the picking operation, to center one or more randomly scattered unit items, to provide tooling interface between the tote handler (e.g., robot) and the tote while allowing a special designed gripper to pick the entire contents of the chamber (compartment) or tote, to unload items from totes with a conveyor only and loading direct into automated bagging and carton wrap machines, to provide a low impact solution that does not drastically change the distribution center layout, to enable use with existing material handling and packaging machinery, to provide a design for intermediate shipping containers (e.g., shelving, shuttles, conveyor, and put walls) for manual or automated picking and fulfillment operations, to provide intermediate storage systems and end of arm tooling that mechanically interacts with the intermediate storage and handling, to provide devices to replace or modify intermediate storage shipping containers and devices used in order fulfillment to consolidate orders to pack out operations, to ease implementation and integration with existing technologies, to provide a means by which the intermediate storage devices are transferred to pack out stations, the reduce or eliminate costly investment by the fulfillment warehouse, to provide ease of implementation for use with existing intermediate storage devices used in order fulfillment, to impose minimal impact on existing warehouse infrastructure, to provide either a direct replacement for intermediate consolidation shipping containers or be capable of being retrofit to existing shelving, to enable use with existing equipment (e.g., conveyors, put walls, pick or put to light systems, carousels, vertical carousels, automated guided vehicles (AGV) and autonomous mobile robots (AMR)), to provide intermediate storage systems with common surfaces (e.g., floors, walls or partitions) in which unit items are put for consolidations and transfer to order pack out, to add relief to the floor and walls of totes thereby creating voids for tooling to be inserted into the tote, to allow the grip hand to fit in the voids created by the tool relief in the floor and or walls of the totes, to provide voids to allow the tooling for gripping unit items to be inserted under or around items without requiring contact with the items, and to provide tooling able to engage (e.g., clamp, grip or lift) the items without damage or disturbing the original placement of the items in the intermediate storage. Note that among embodiments exhibiting one or more of these capabilities, not all embodiments may exhibit them to the same degree.

FIGS. 1A-1D are schematic diagrams depicting a tote handling system 100 including a tote conveyor 102, a tote handler (device) 104, and a tote wall 106, the tote wall 106 including totes 108. The tote conveyor 102 as shown is a conventional linear conveyor with rollers 112 capable of sliding the tote 108 and/or other items 111 therealong. It will be appreciated that the tote conveyor 102 may include one or more conveyor portions of various shapes and sizes, with various options, such as diverters, transfers, ramps, packaging equipment, etc. (not shown) as is described further herein. While FIG. 1 shows a tote conveyor 102, any mobile carrier may be used, such as the conveyor 102, a cart, an autonomous mobile robot, an automated guided vehicle, an automatic storage and retrieval system, a shuttle, and combinations thereof.

The tote handler 104 is depicted as a six-axis handling robot (robot tote handler) 114 positionable about the tote conveyor 102 for moving the items 111 (and/or the totes 108) on and off of the tote conveyor 102. The tote handler 104 also includes the 114 robot and a grip hand (tool) 116 at an end of the handling robot 114 for engaging the totes 108 and/or the items 111. The tote handler 104 may be capable of engaging the tote 108 for transferring the items 111 to and/or from the tote 108, the tote conveyor 102, and/or other locations as is described further herein.

The tote wall 106 is shown as including multiple totes 108 stacked in groups. Three sections of the totes 108 are shown, with each section including six columns and numerous rows of the totes 108. The totes 108 are supported on a tote platform 118. The tote platform 118 may be stationary, manual with wheels, or have any other suitable structure. In this example, the tote platform 118 is an autonomous mobile robot capable of moving the totes 108 to various locations as described further herein.

The totes 108 that form the tote wall 106 are configured to support the items 111 therein. The totes 108 are also configured with tool reliefs 110 shaped to work with the tote handler 104 and the grip hand 116 to facilitate insertion and removal of the items 111 from the totes 108 by the grip hand 116 as is described further herein.

Figure 1B:
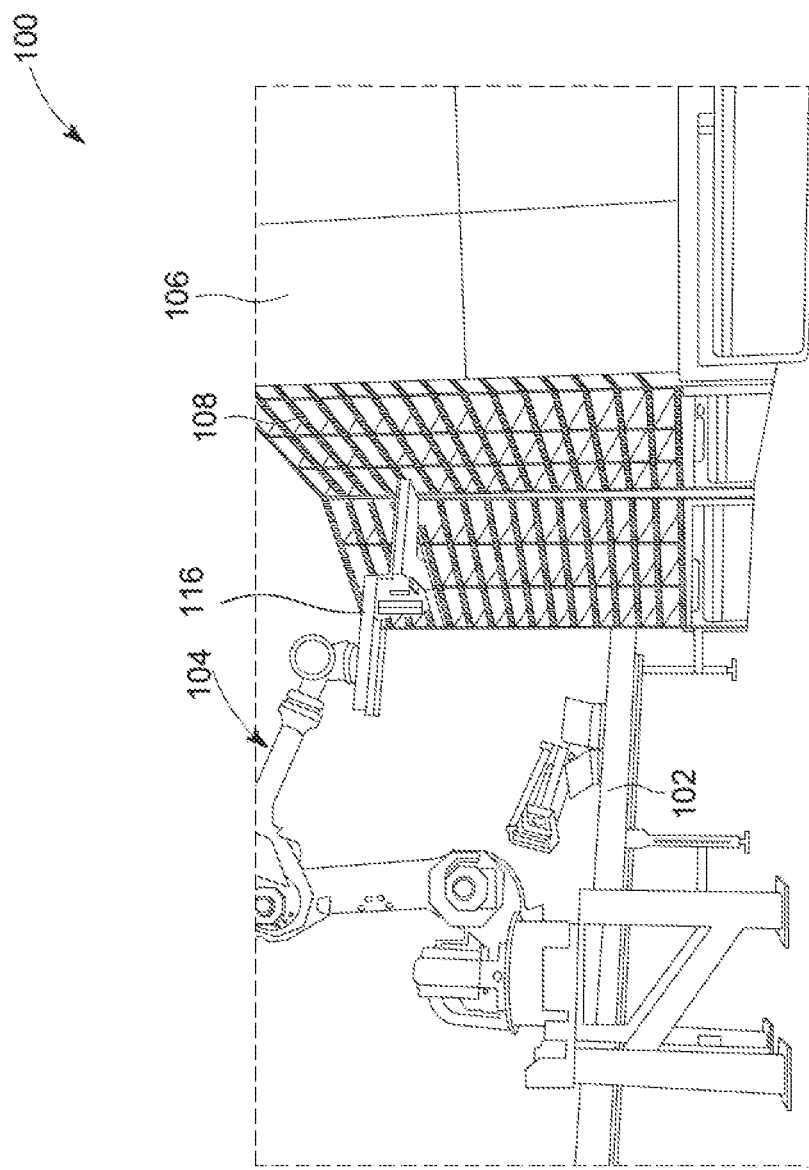
Figure 1C:
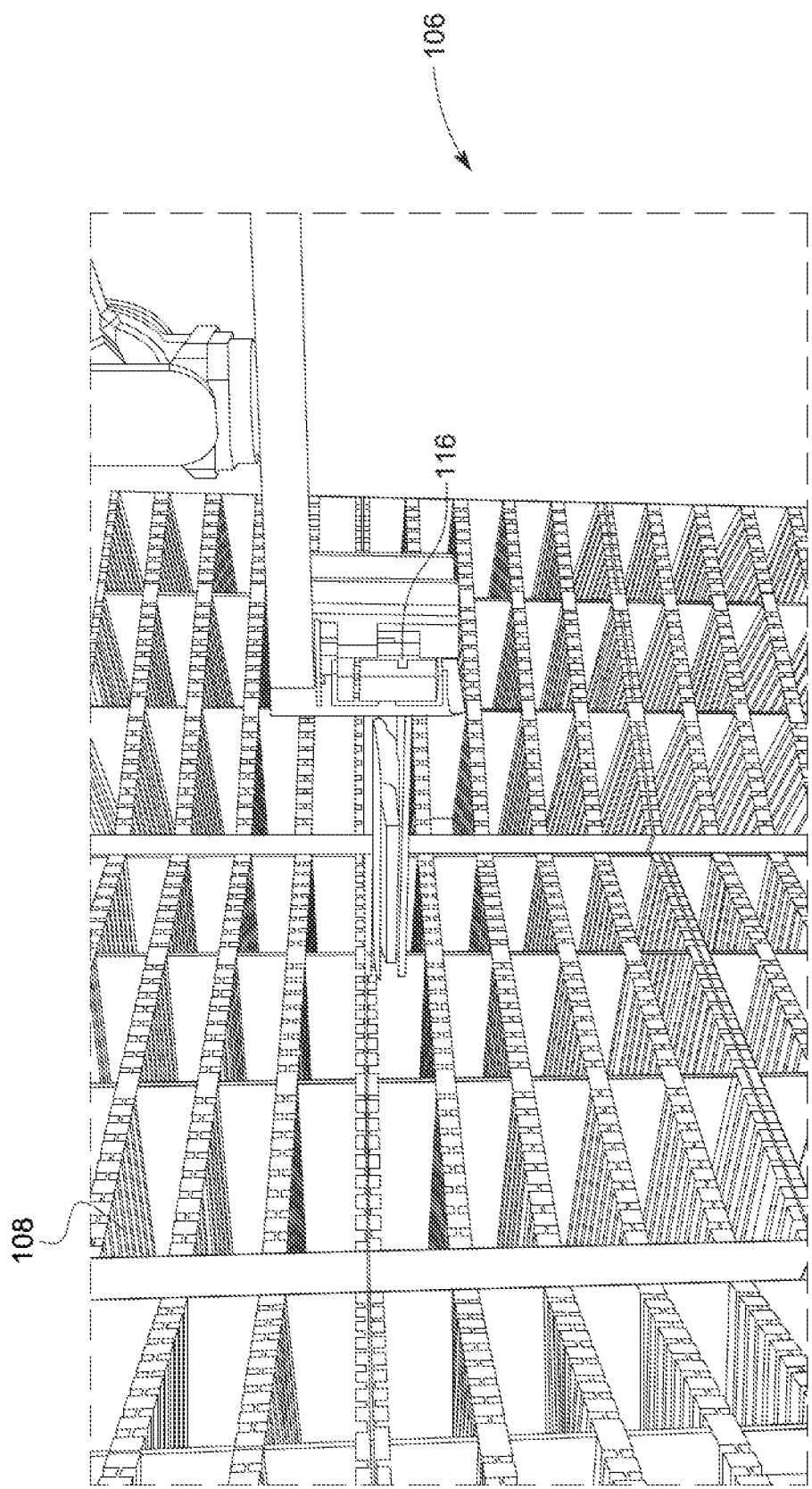
Figure 1D:
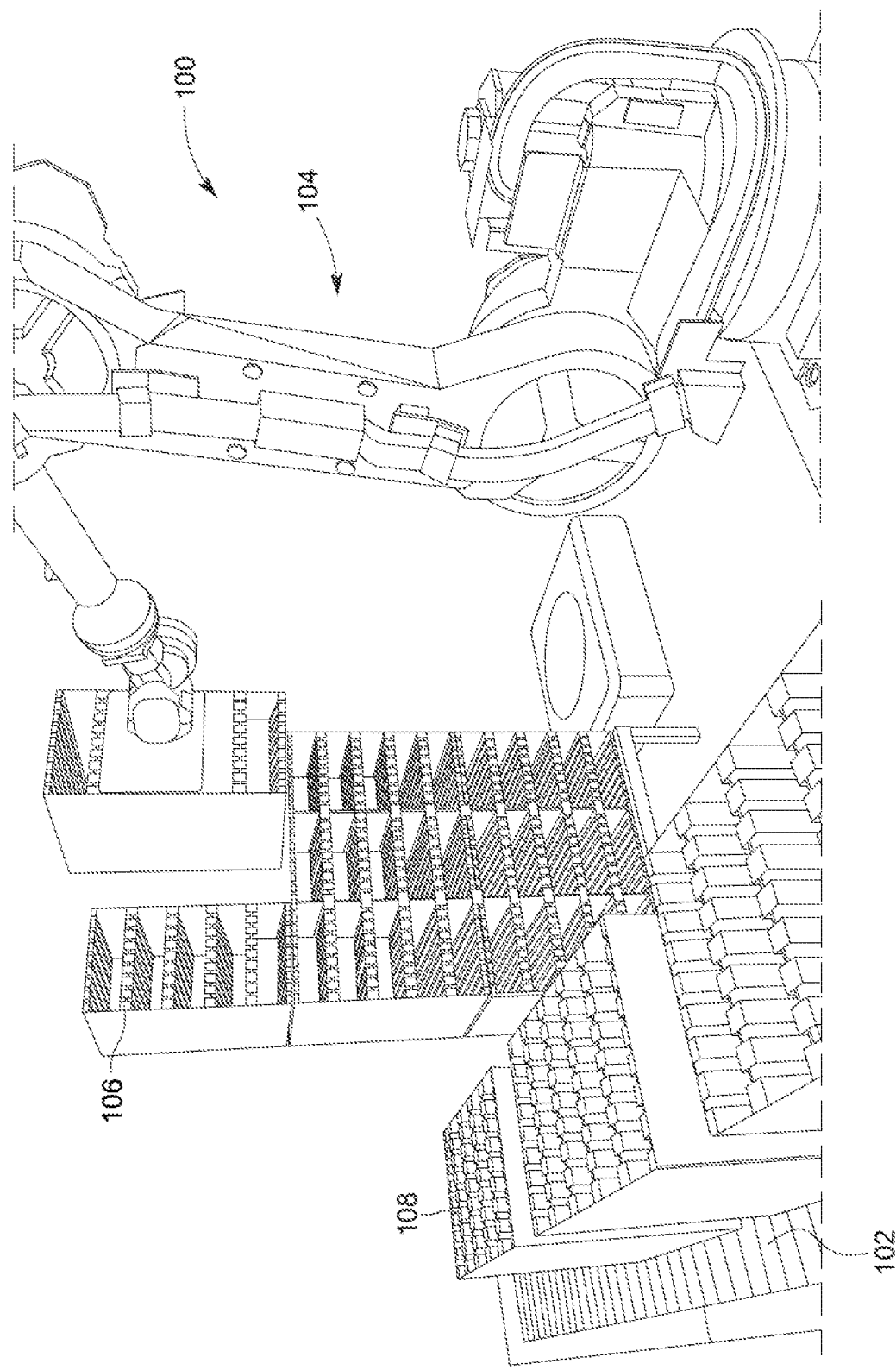

As also shown by FIGS. 1A-1D, the tote handler 104 may move items 111 and/or the totes 108 between the conveyor 102 and the tote wall 106. For example, one or more of the items 111 may be inserted into or removed from the totes 108 by the tote handler 104 as shown in FIGS. 1A-1C and discussed further herein. One or more of the totes 108 may be moved by the tote handler 104 to form the tote wall 106 as shown in FIG. 1D. The tote handler 104 may use the grip hand 116 to manipulate the items 111 and/or the totes 108 as is described further herein.

While a specific configuration of the tote handling system 100 and its components is depicted (here and in later figures), it will be appreciated from this disclosure that one or more of various configurations of the tote conveyors 102, the tote handler 104, the grip hand 116, the totes 108, and other handling equipment as described herein may be used to handle the items 111. For example, one or more tote handlers 104 and/or tote hands 116 capable of operating with the totes 108 and the tote conveyor 102 may be used in other embodiments.

Figure 2E:
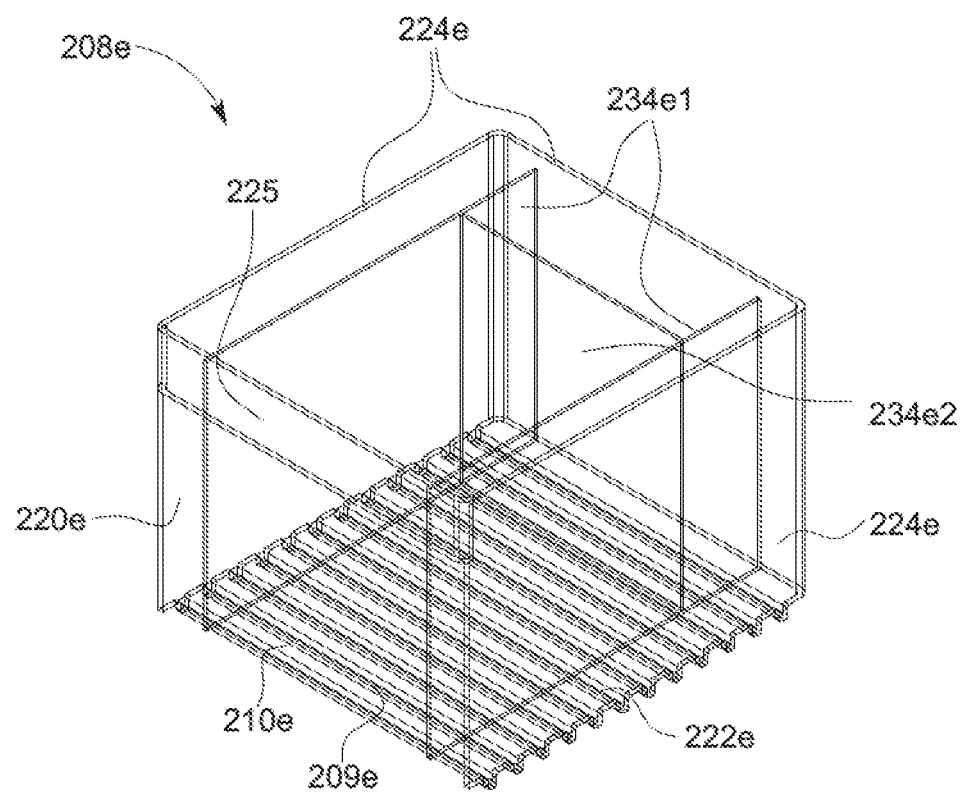

FIGS. 2A, 2B1-2B2, 2C, 2D1-2D2, 2E-2H are schematic diagrams depicting example totes 208a-h with tool reliefs 210a-h. Each of the totes 208a-h have a frame 220a-h with a bottom 222a-h and walls 224a-h. The bottom 222a-h comprises tool reliefs (struts) 210a-h with the tool receptacles 209a-h therebetween for receiving the grip hand 116 therethrough as shown in FIGS. 1 and 2B1-2B2.

While each of the example totes 208a-h shown in these figures are depicted as having a cuboid shape with a respective flat bottom 222a-h and two or more respective flat walls 224a-h with right angles therebetween, it will be appreciated from this disclosure that the shape of the tote may vary. Also, while the respective tool reliefs 210a-h and tool receptacles 209a-h (and the corresponding grip hand 116) are depicted as having a linear shape and parallel arrangement, it will be appreciated from this disclosure that the shape of these can also vary.

The totes 208a-h may be made of any suitable material capable of supporting items therein, such as metal, fiber, or plastic. The material may be, for example, a rigid plastic, such as high density polyurethane, capable of carrying the items 111. The totes 208*a-h* may have a structure with a strength sufficient for material handling purposes, such as for transport, use with handling equipment, and for forming the tote wall 106 of FIG. 1. The totes 208*a-h* may be integrally formed (e.g., by injection molding), or be formed from separate pieces that may be joined together (e.g., interlocking pieces).

The tote 208*a* of FIG. 2A has a rectangular bottom 222*a* with two rectangular walls 224*a* extending vertically thereabove. The walls 224*a* are positioned along edges of the bottom 222*a* on opposite sides thereof. In this example, the walls 224*a* are flat with lips 227*a* extending along a top edge thereof. The bottom 222*a* has a flat bottom surface 228*a* and a curved upper surface 229*a*. The curved upper surface 229*a* has a parabolic shape that is higher adjacent the walls 224*a* and lower therebetween for urging items thereon towards a middle of the tote 208*a*.

The bottom 222*a* includes a plurality of linear, parallel tool reliefs 210*a* extending between the walls 224*a* parallel thereto. Each of the tool reliefs 210*a* has a linear, elongate body extending from the bottom surface 228*a* to the top surface 229*a* and from one end of the bottom 222*a* to an opposite end of the bottom 222*a*. The tool reliefs 210*a* are secured at one end and open at an opposite end to define the tool receptacles 209*a* therebetween.

The tool receptacles 209*a* are spaces defined between each of the tool reliefs 210*a*. The tool receptacles 209*a* are depicted as linear, parallel spaces shaped to receive the grip hand 116 therethrough as is described further herein. For descriptive purposes, a portion of the grip hand 116 is depicted in the tool receptacles 209*a* between the tool reliefs 210*a*.

The tote 208*b* of FIGS. 2B1, 2B2 is similar to the tote 208*a* of FIG. 2A, except that this version has a different bottom 222*b*, three side walls 224*b*, and a slotted front wall 223. The bottom 222*b* is similar to the bottom 222*a* of FIG. 2A, except that it has a flat upper surface 229*b* formed from the tool reliefs 210*b*. The side walls 224*b* may be solid as shown in FIG. 2B2, or vented as shown in FIG. 2B1.

The front wall 223 in this example, is an extension of the bottom 222*b*. The tool reliefs 210*b* have a first portion that extends along the flat bottom 222*b*, and a second portion that extends vertically upward to define the front wall 223. The tool receptacles 209*b* extend between the first and second portions of the tool reliefs 210*b* to receive corresponding portions of the grip hand 116 oriented in alignment thereto as schematically depicted in FIG. 2B1. As further shown in FIG. 2B2, the portion of the grip hand 116 may be positioned in non-alignment (e.g., perpendicular to the tool reliefs 210*b* and tool receptacles 209*b*) for supporting the tote 208*b* thereon.

The tote 208*c* of FIG. 2C is also similar to the tote 208*a* of FIG. 2A, except that this version has three walls 224*c* and a partial wall 225. The partial wall 225 extends between an upper portion of two of the opposite walls 224*c* and defines an opening 230*c* between the opposite walls 224*c* and the bottom 222*c* that leads to a chamber defined within the walls 224*c* and the bottom 222*c*. An identifier 236 is provided on the partial wall 225 for identification as is described further herein.

The tool reliefs 210*c* (with tool receptacles 209 therebetween) extend perpendicularly between opposite walls 224*c*. The bottom 222*c* is provided with conveyor reliefs 232 extending from the tool reliefs 210*c*. These conveyor reliefs 232 may be used in conjunction with the tote conveyor 102 (FIG. 1) to move the tote 208*c* as is described further herein.

The tote 208*d* of FIGS. 2D1 and 2D2 are similar to the tote 208*c* of FIG. 2C with similar tool reliefs 210*d*, tote receptacles 209*d*, and opening 230*d*. In this version, this tote 208*d* has two adjacent walls 224*d*, the partial wall 225, and the front wall 223. As also shown in FIG. 2D1, the tool reliefs 210*d* are provided with a support 234 between the first and second portions of the tool reliefs 210*d*. An additional support 234 may also be provided between the tool reliefs 210*d* and the wall 224*d* as shown in FIG. 2D2.

The tote 208*e* of FIG. 2E is similar to the tote 208*c* of FIG. 2C, except partition walls 234*e*1, 234*e*2 are provided within the tote 208*e*. These partition walls 234*e*1, 234*e*2 may be integrally formed or insertable into the tote 208*e*. The partition walls 234*e*1, 234*e*2 may form interior walls to subdivide the tote 208*e* into separate chambers (sub-compartments). As shown in this example, two of the partition walls 234*e*1 are parallel to opposite walls 224*e* and a third partition walls 234*e*2 extends perpendicularly between the two parallel partition walls 234*e*1. The third partition walls 234*e*2 is parallel to the partial wall 225. These partition walls 234*e*1, 234*e*2 rest on the tool reliefs 210*e* and may be supported by the walls 224*e* and/or partial wall 225.

Figure 2F:
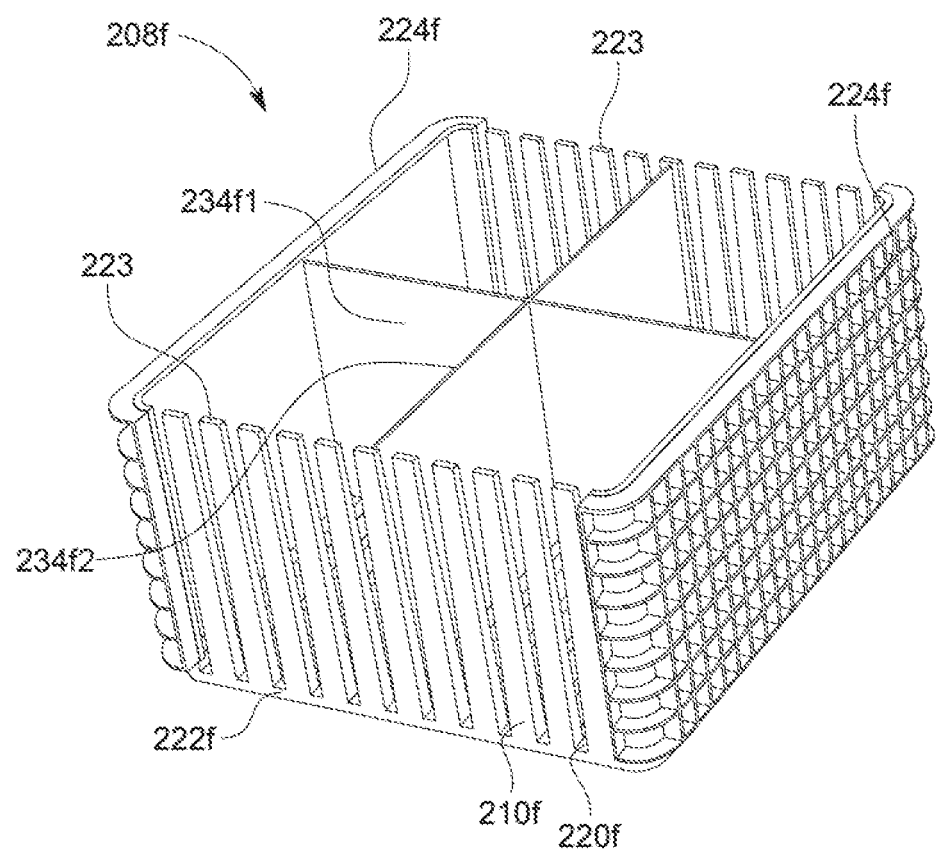

The tote 208*f* of FIG. 2F is similar to the tote 208*b* of FIG. 2B, except that this version has two opposite walls 224*f*, two opposite front walls 223, and partition walls 234*f*1, 234*f*2. In this version, both of the front walls 223 are formed from the tool reliefs 210*f*. The tool reliefs 210*f* have a first portion along the bottom 222*f*, and two second portions forming each of the front walls 223. This example shows the tool reliefs 210*f* of the bottom 222*f* separate from the tool reliefs 210*f* of the front walls 223, but they may be continuous with the tool reliefs 209*f* extending from the bottom 22*f* and through the front wall 223 as shown for example in FIGS. 2D1-2D2.

Also, in the version of FIG. 2F, the partition walls 234*f*1, 234*f*2 are provided. The partition wall 234*f*2 extends between the front walls 223, and the partition walls 234*f*1 extends between the walls 224*f*. The partition walls 234*f*1, *f*2 may be interlocking walls, or have separate portions. The partition walls 234*f*1, 234*f*2 divide the tote 208*f* into separate chambers (or sub-compartments), each accessible by the grip hand 116.

Figure 2G:
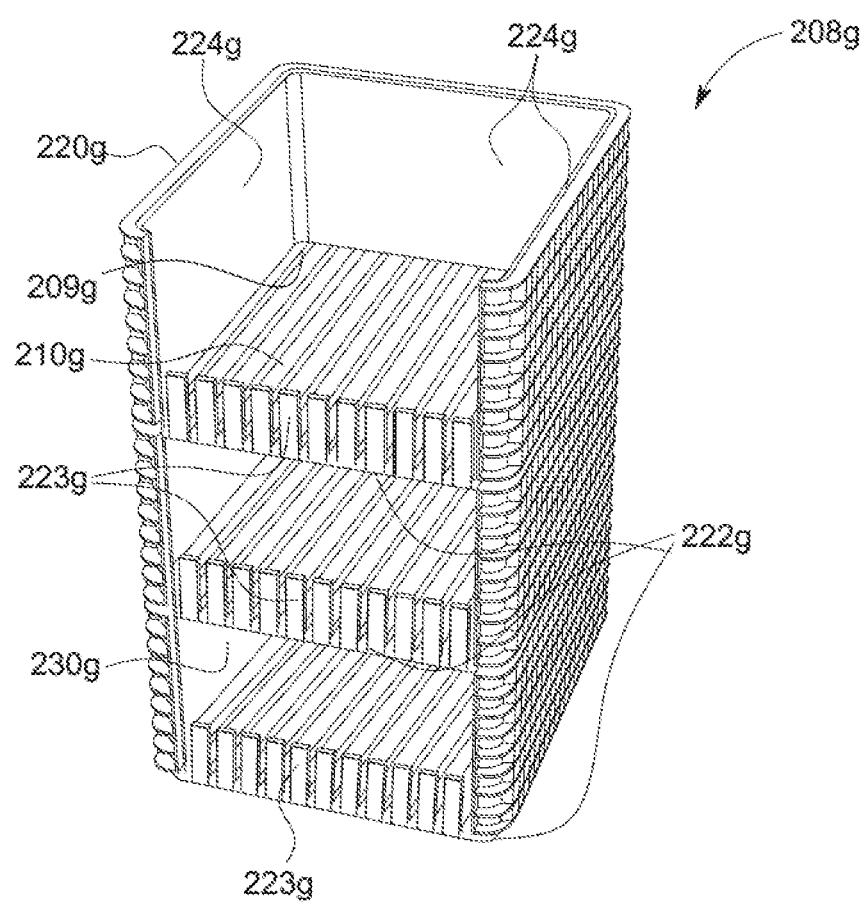

The tote 208*g* of FIG. 2G is similar to the tote 208*b* of FIG. 2B, except that this version includes multiple (three) bottoms 222*g*, three vertical walls 224*g*, and multiple (three) partial front walls 223*g*. Each of the three bottoms 222*g* are positioned at different heights between the three vertical walls 224*g*. The tote 208*g* also has three sets of tool reliefs 210*g* along the bottoms 222*g*.

Each of the sets of tool reliefs 210*b* has a first portion defining the respective bottoms 222*g* and a second portion defining the respective front walls 223*g*. The second portion of the tool reliefs 210*g* extends only partially above the bottom 222*g* to define the short front wall 223. A front opening 230*g* is defined between the front wall 224 and the walls 224*g*. The front opening 230*g* at a top of the tote 208*h* is open, and the other openings 230*g* are enclosed by a bottom 222*g* thereabove.

Figure 2H:
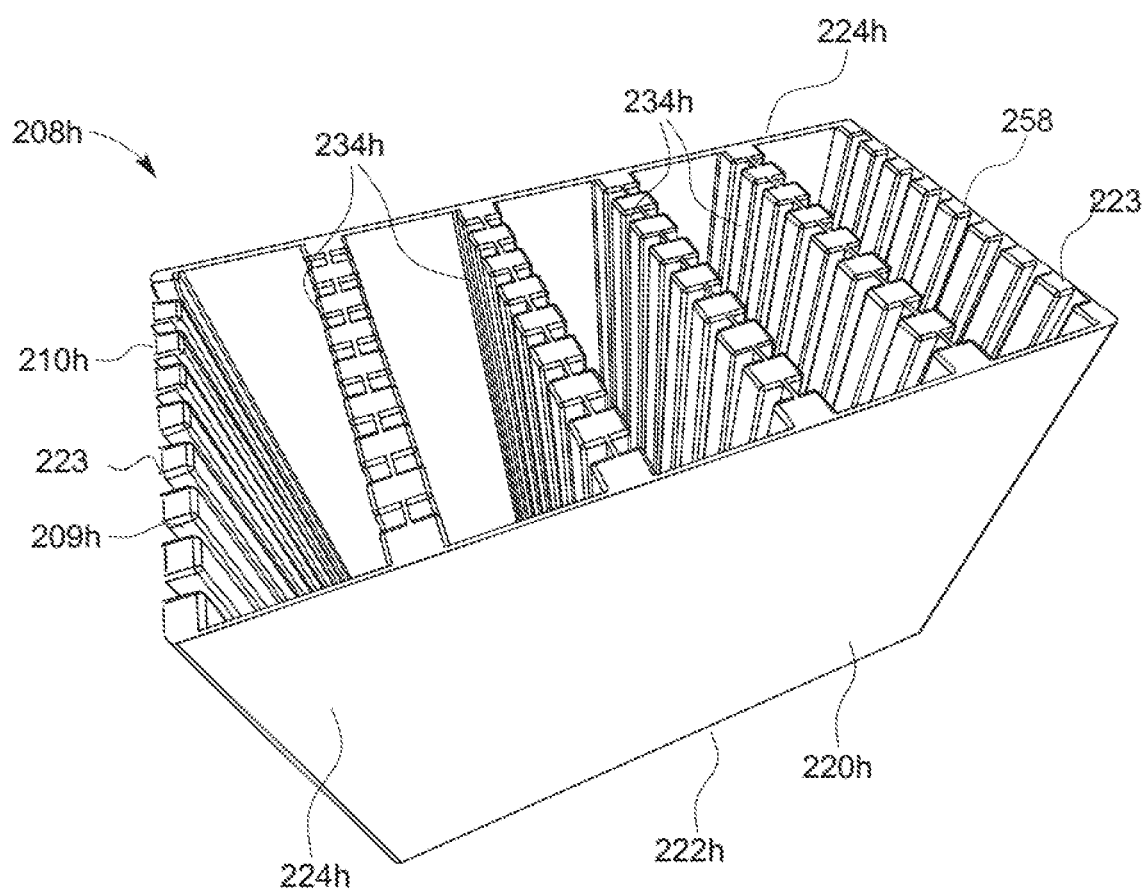

The tote 208*h* of FIG. 2H has a flat solid bottom 222*h* with two solid vertical walls 224*h* and two slotted front walls 223 extending above the bottom 222*g*. The slotted front walls 223 are each formed from a set of parallel tool reliefs 210*h* extending between the walls 224*h*. The tool reliefs 210*g* are spaced apart with tool receptacles 209*g* therebetween shaped to receive a portion of the grip hand 116 similar to the tool receptacles 209a of FIG. 2A. This version also shows detachable joints 258 in the tool receptacles 209h between the tool reliefs 210h to provide support to the tool reliefs 210h. The joints 258 may be detached when in use to allow the grip hand 116 to pass therethrough. This version also has multiple partition walls 234h extending between the walls 224h. The partition walls 234h in this example are similar to the walls 224h and are positioned parallel thereto a distance therefrom to define chambers therebetween.

The totes 208a-h may optionally be provided with additional features, such as an identifier 236 as shown in FIG. 2C. The identifier 236 may be a label with a number, bar code, or other information usable in identifying the tote and/or its contents. The identifier 236 may also be an electrical device, such as a sensor or radio frequency identification ("RFID") tag, detectable, programmable, or capable of storing information about the tote and/or its contents. Optionally, the identifier 236 may be scanned and programming applied to cycle the handling system 100 (FIG. 1) based on the information detected in the identifier 236.

Figure 3A:
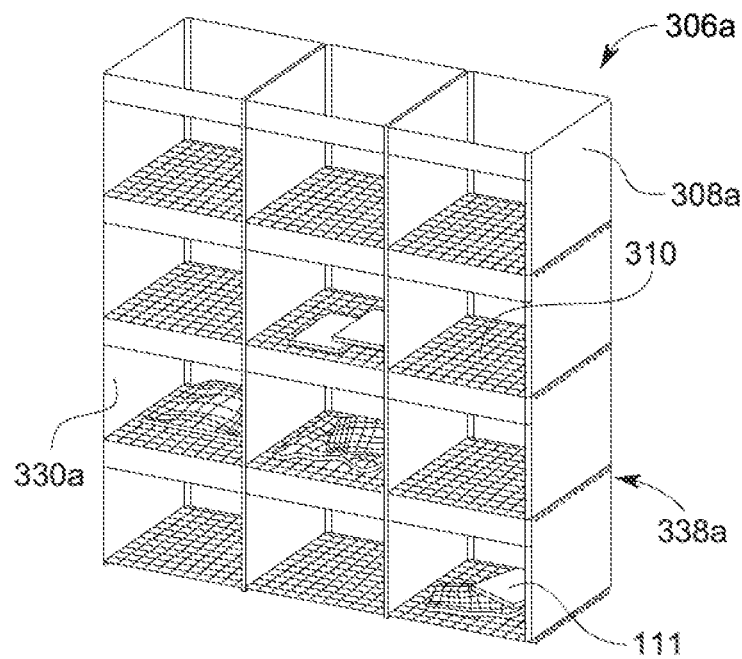
FIGS. 3A-3C are schematic diagrams depicting example configurations of the tote wall.
Figure 3B:
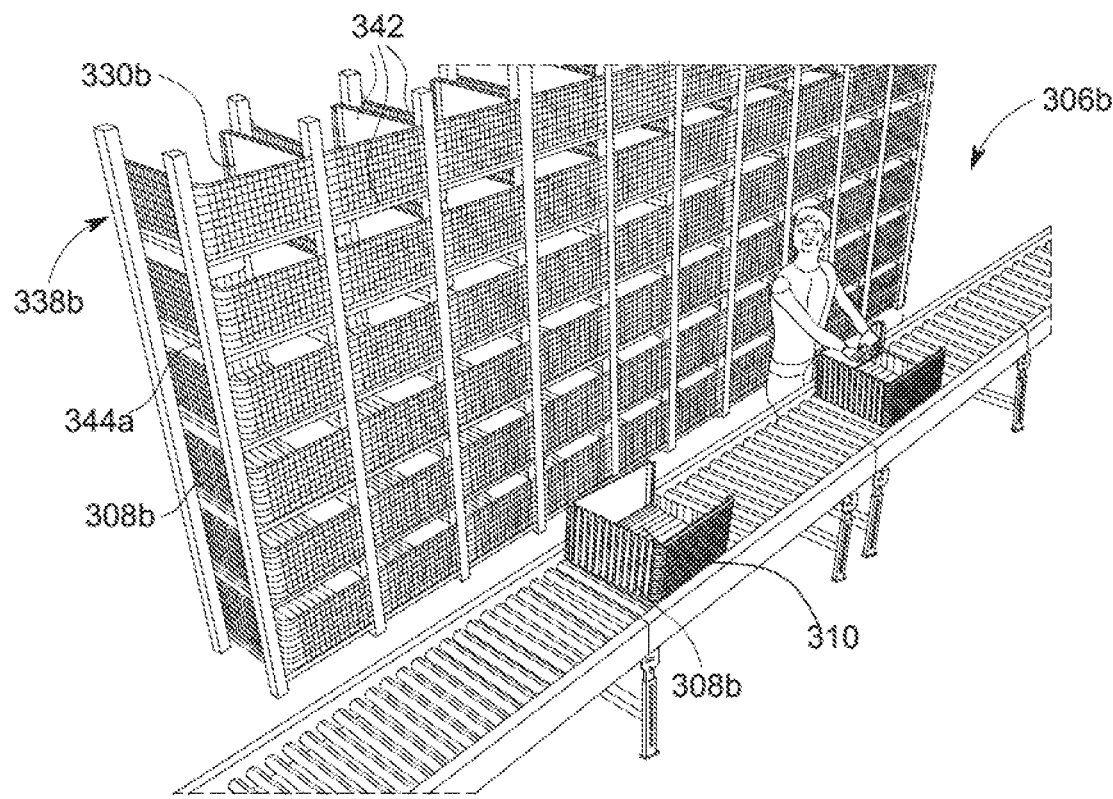
Figure 3C:
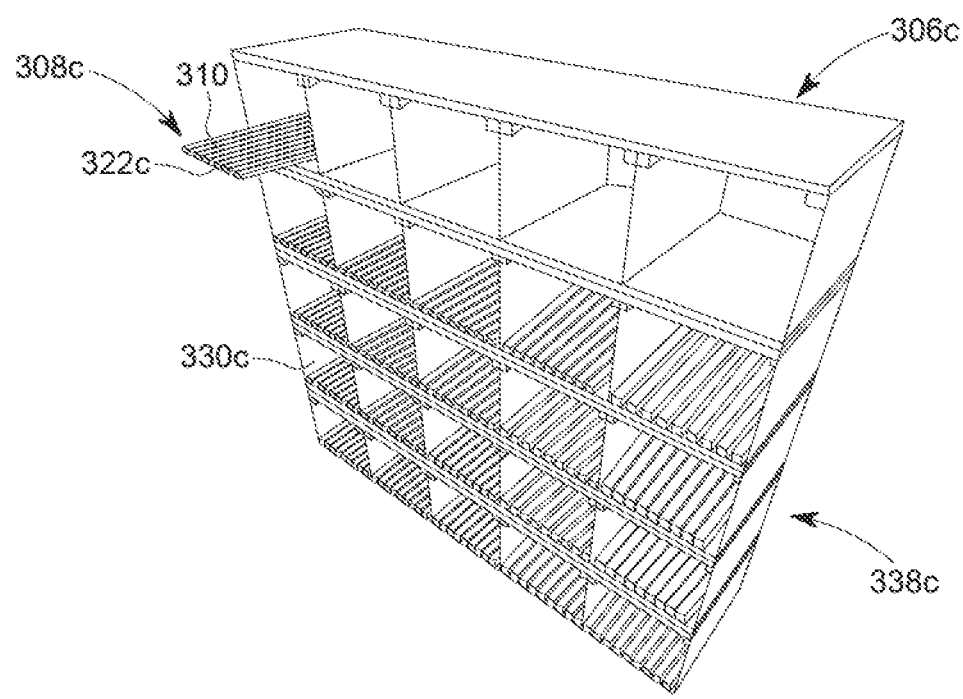

FIGS. 3A-3C are schematic diagrams depicting example configurations of the tote wall 306a-c. Each of these figures shows various totes 308a-c joined together vertically and horizontally in various manners to form various versions of the tote wall 306a-c. Each of the totes 308a-c include tool reliefs 310 capable of receiving the grip hand 116 (FIG. 1), thereby enabling selective stacking, sorting and storing of the items 111. While specific arrangements of the totes 308a-c and tote walls 306a-c are shown, various alternative combinations may be defined to facilitate loading, sorting, storing, etc.

FIG. 3A shows the tote wall 306a formed from interlocking totes 308a. The totes 308a may be similar to the totes 208c previously described in FIG. 2C. One or more of the totes 308a may be removably stacked to form a desired size of wall, such as the four rows and three columns shown in FIG. 2C. In some versions, the totes 308a may have a common top/bottom or sidewall with an adjacent tote 308a, thereby reducing components needed to form the tote wall 306a.

The totes 308a may have connectors or interlocking features (not shown) that join together when stacked with similar totes 308a. Such interlocking features may include mating connections (not shown) that allow the totes 308a to lockingly engage when pressed together. Portions of the totes 308a may join to define a frame 338a with chambers 330a shaped to receive one or more of the items 111 therein. Additional braces or support mechanism (not shown) may also optionally be provided to secure the totes 308a together.

FIG. 3B shows the tote wall 306b formed from totes 308b and a wall frame 338b. In this version, the wall frame 338b has vertical and horizonal beams 342 connected together. These beams 342 form chambers 330b shaped to receive and support the totes 308b therein. The totes 308b are similar to the totes 208b of FIGS. 2B1 and 2B2 (without the front wall 223), but any tote described herein may be used. The totes 308b may be supported in the chambers 330b by various mechanisms, such as a platform 344 connected to the frame 338b, or rails (not shown) in the frame 338b that receivably engage portions of the tote 308b.

FIG. 3C shows the tote wall 306c formed from a wall frame 338c with the totes 308c therein. In this version, the frame 338c is a conventional put wall (or place wall) structure including a series of chambers 330c with the totes 308c positioned therein. The totes 308c in this version include only a bottom 322c with the tool reliefs 310. The totes 308c may be similar to the tote 208c of FIG. 2C, except without any walls 224c or 223, but any tote with tool reliefs insertable into the chambers 330c may be used.

Figure 4A:
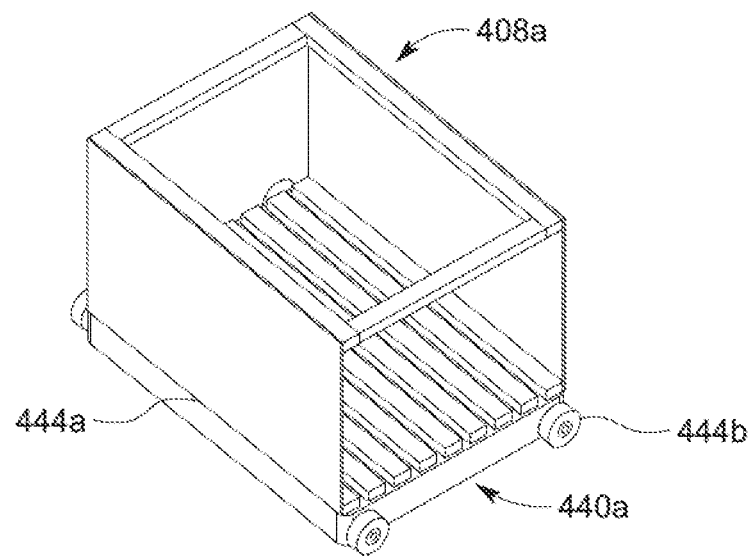
FIGS. 4A-4C are schematic diagrams depicting example mobile totes.
Figure 4B:
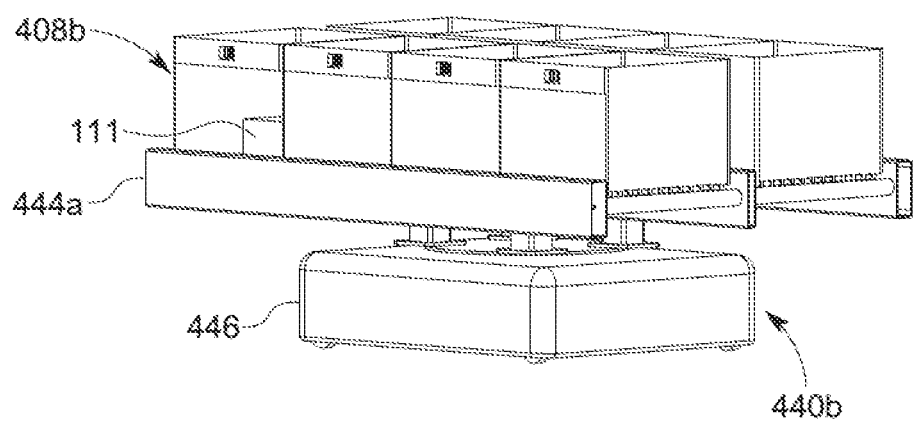
Figure 4C:
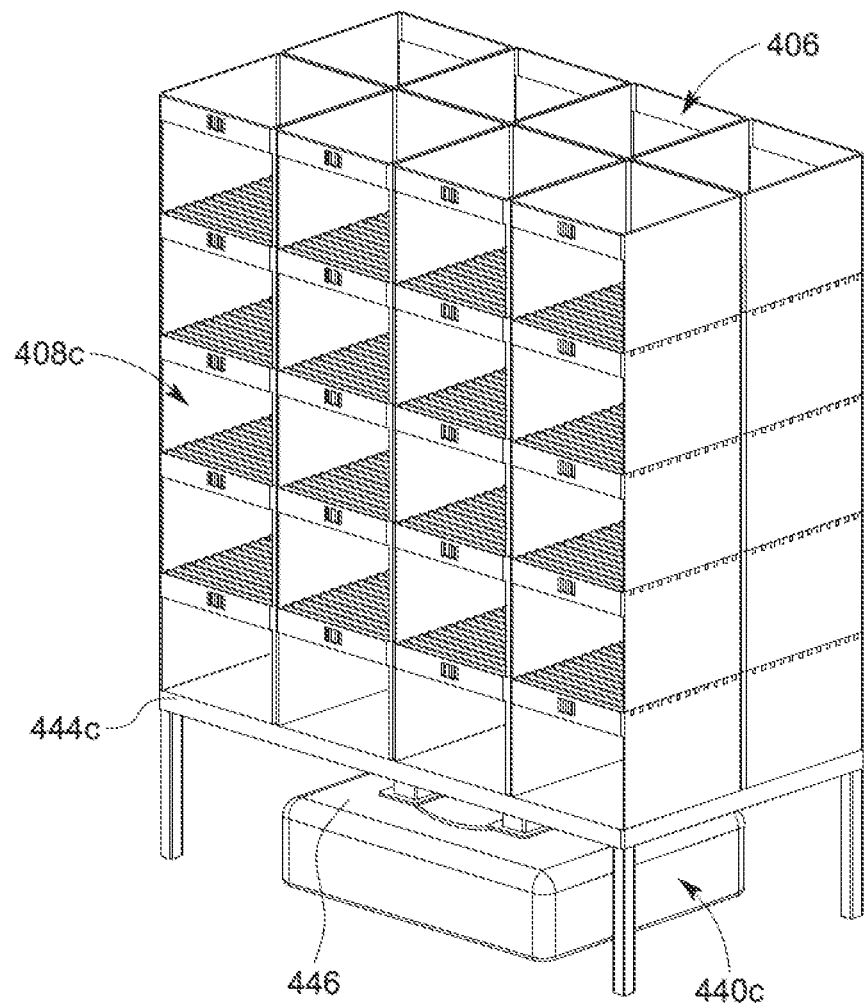

FIGS. 4A-4C are schematic diagrams depicting example mobile totes 408a-c. Each of these figures shows one or more totes 408a-c carried by a mobile based 440a-c for transporting one or more of the items 111 (as shown in FIG. 4B). While specific arrangements of the totes 408a-c and mobile bases 440a-c are shown, various combinations may be defined to facilitate loading, sorting, storing, etc.

FIG. 4A shows a single mobile tote 408a on a single mobile base 440a in a cart (or shuttle) configuration. The tote 408a is shown as being similar to the tote 208c of FIG. 2C. This tote 408a may rest on the mobile base 440a and may be removable therefrom, or may be integrally formed with the mobile base 440a. The mobile base 440a may include a separate platform 444a with wheels 444b. The platform 444a may be a solid platform or a frame shaped to support the tote 408a thereon. The wheels 444b are connected to the platform 444a to allow rolling movement thereof. The mobile base 440a may be manually pushed, or be provided with electronics for driven and/or automated movement.

FIG. 4B shows multiple totes 408b on a mobile base 440b. In this version, the totes 408b are shown as including two rows of totes 408b that are similar to the tote 208c of FIG. 2C. Two or more of the totes 408b may be interlocked together in one or more groups in a manner similar to the totes 308a of FIG. 3A. While only two rows of four totes 408b are shown, one or more rows of one or more totes 408b may be stacked and assembled to form a desired configuration.

The mobile base 440b includes two platforms 444a carried by a mobile robot 446. Each of the two platforms 444a supports a set of the totes 408b. Each of the platforms 444a may be a portion of a conveyor to allow the totes 408b to slide to/from another conveyor. The mobile robot 446 may be a conventional robot capable of carrying and transporting the totes 408b and the platforms 444a. The mobile robot 446 may be programmable and operate with the platforms 444a to move the totes 408b.

FIG. 4C shows a tote wall 406 carried by the mobile platform 440c. The tote wall 406 includes multiple stacked totes 408c. The tote wall 406 may be similar to the tote wall 306a of FIG. 3A. The mobile platform 440c includes a platform 444c and the mobile robot 446. In this version, the tote wall 406 is supported on the platform 444c above the mobile robot 446. The platform 444c may support the tote wall 406 on the mobile robot 446 during transport, and off the mobile robot 446 while at rest on the floor. The platform 444c may be connected or connectable to the tote wall 406 and/or the mobile robot 446. For example, the tote wall 406 may be defined to include the platform 444c, and the mobile robot 446 may be adapted to lift the platform 444c with the tote wall 406 thereon when transport is needed.

FIGS. 5A-5E are schematic diagrams depicting various views of portions of the tote handler 104 having a grip hand 116. The tote handler 104 is depicted as including a handling robot 114 with a grip hand 116 usable with totes 508 and other shipping containers 509 (e.g., the boxes or cartons) on the conveyors 102. The grip hand 116 is movable by the handling robot 114 about the conveyors 102, the totes 508, the shipping containers 509, and other equipment for selectively moving one or more of the items 111. The grip hand 116 may be used to move the items 111 into and out of the totes 508 and the shipping containers 509. The grip hand 116 is configured to selectively access the items 111 and move them to a desired location. The grip hand 116 is shaped to pass through the tote 508 to selectively move the items 111 in a specific arrangement as is described further herein.

The handling robot 114 may be any robot or mechanical manipulator capable of carrying the grip hand 116 and moving the grip hand 116 into desired positioned. In this example, the handling robot 114 has a foot 548a and an articulated arm 548b. The foot 548a may be a frame supported on the floor or other surface. The arm 548b includes various linkages to permit rotation, tilt, and extension to achieve movement in the x, y, and z axes. A connection 548c is provided at an end of the arm 548b to support the grip hand 116 thereon. The connection 548c may be any suitable connection capable of movably supporting the grip hand 116, such as a u-joint.

The grip hand 116 includes a palm 550a and finger assemblies 550b capable of lifting the totes 508, the shipping containers 509, the items 111, etc. The palm 550a is supported on the arm 548b by the connection 548c with the finger assemblies 550b extending therefrom. The palm 550a includes a base 552a, a backing plate 552b, and bearings 552d. The bearings 552d are attached to the connection 548c. The base 552a is movably supported (e.g., slidably movable) along the bearings 552d. The backing plate 552b is fixed to an end of the bearings 552d. The base 552a supports the finger assemblies 550b thereon for movement therewith as the base 552a slides along the bearings 552d.

The finger assemblies 550b include actuators 552c and fingers 552e. The actuators 552c are movably positioned on the base 552a. Two actuators 552c are shown, but any number may be provided. The two actuators 552c are slidably movable along the base 552a between a position closed position adjacent to each other, and an open position a distance apart. A finger plate 553 is secured to each of the actuators 552c. The fingers 552e are secured to the actuators 552c by the finger plates 553 for movement therewith. An end of each of the fingers 552e is secured to the finger plates 553 and extends therefrom. In this version, a rows of fingers 552e is supported on each of the finger plate 553 and the corresponding actuator 552c.

The fingers 552e are depicted as narrow rods secured at one end to the finger plates 553. However, the fingers 552e may be of alternative structure in alternative embodiments. The fingers 552e are depicted as being evenly spaced apart in two linear rows (one row on each of the actuators 552c) and parallel to each other, but various arrangements may be provided as described further herein.

The fingers 552e are shaped to pass through the tool receptacles 209a between the tool reliefs 210a of the totes as shown in FIGS. 2A and 2B1-2B2. Note that the fingers 552e are designed to mate with and pass through the tool reliefs 110, shown in FIG. 1. Thus, if the tool reliefs 110 have a geometry differing from that shown in FIG. 1, then the fingers 552e may likewise have a different geometry. The fingers 552e may also be sized to extend into the chambers of the totes 508 to reach into and access the items 111 therein.

The finger plates 553 are movably supported on the base 552a by the actuators 552c. The actuators 552c are positioned on and movable about the base 552a. As the actuators 552c move between the open and closed position, the rows of the fingers 552e move therewith. An item space 555 is defined between the rows of fingers 552e when in the open position. Movement of the actuators 552c may allow the fingers 552e to selectively open to receive or to release the items 111, and to close to grip the items 111 and to fit within chambers in the totes 508 as needed.

Figure 5A:
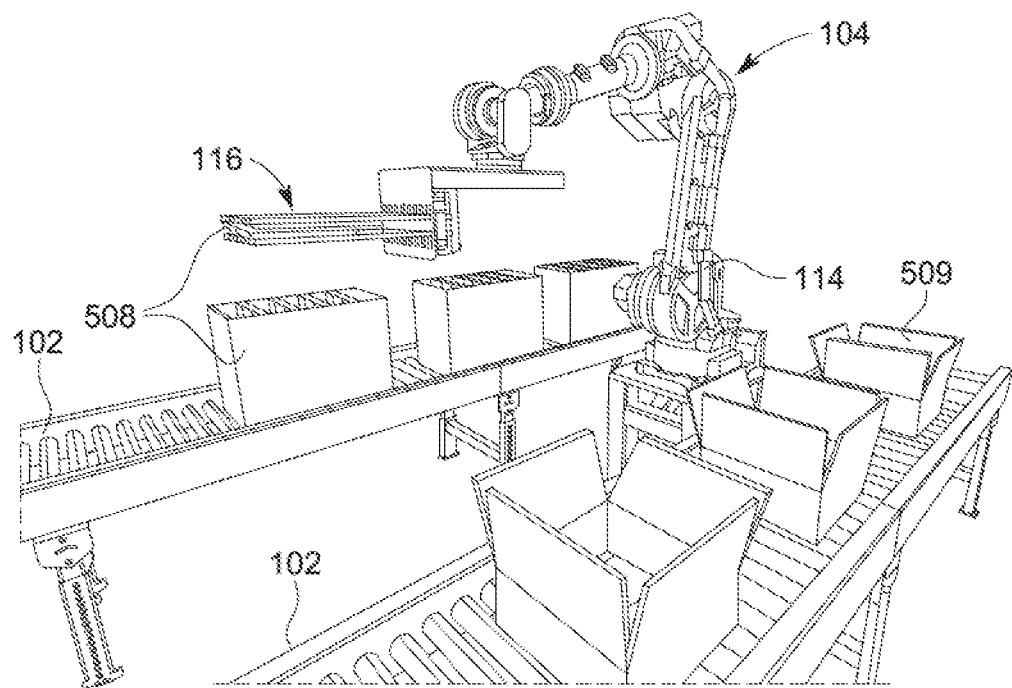
FIGS. 5A-5E are schematic diagrams depicting various views of portions of the tote handler and the grip hand.

The actuators 552c may be selectively activated to move the finger plates 336 together and apart in a gripping action, thereby moving the fingers 552e together and apart in a grip and release motion. The actuators 552c may also be selectively activated to manipulate the bearings 552d (and thereby the backing plate 552b), and/or to selectively extend and retract the fingers 552e. This motion may be used to position the fingers 552e about the shipping container 509 to unload items as shown in FIG. 5A, or to remove items from the tote 508 as described further herein. Also as shown in FIG. 5E, the grip hand 116 may be positioned with the fingers 552e in alignment with a width of the shipping container 509 for unloading therein.

The handling robot 114 and/or the grip hand 116 may be activated to selectively move in a manner that allows the fingers 552e to manipulate the items 111 as needed. Various movements may be provided. For example, the bearings 552d may be coupled to the backing plate 552b to selectively extend and retract the backing plate 552b along a length of the fingers 552e. The backing plate 552b may be moved by the bearings 552d to selectively push items 111 positioned between the fingers 552e, thereby releasing the items 111.

Figure 5B:
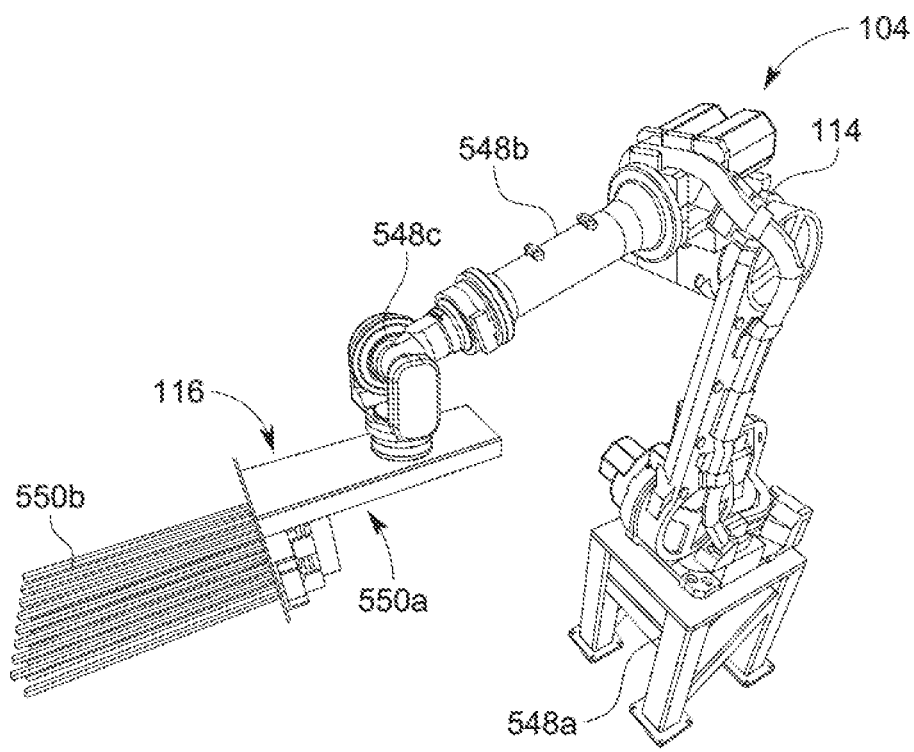
Figure 5C:
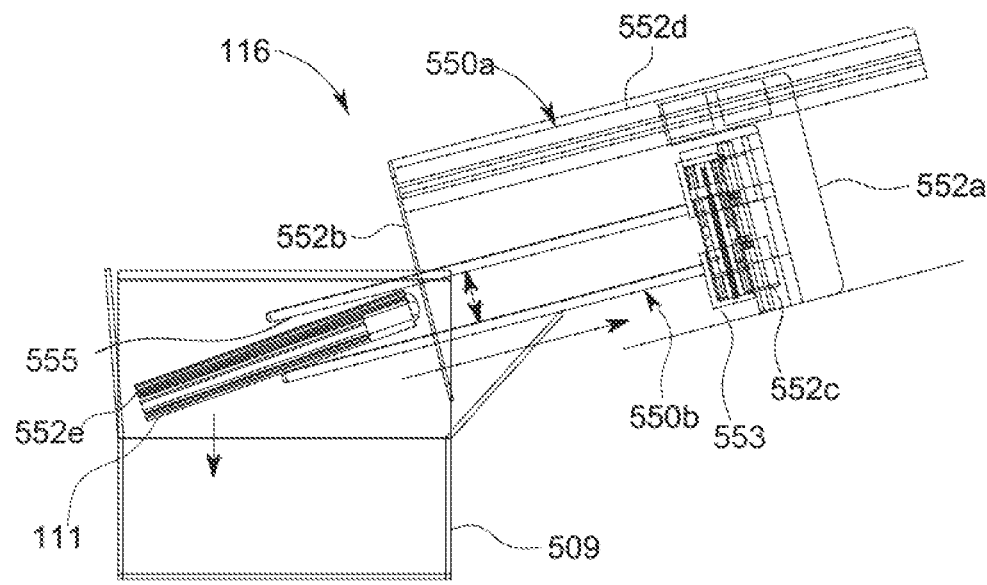
Figure 5D:
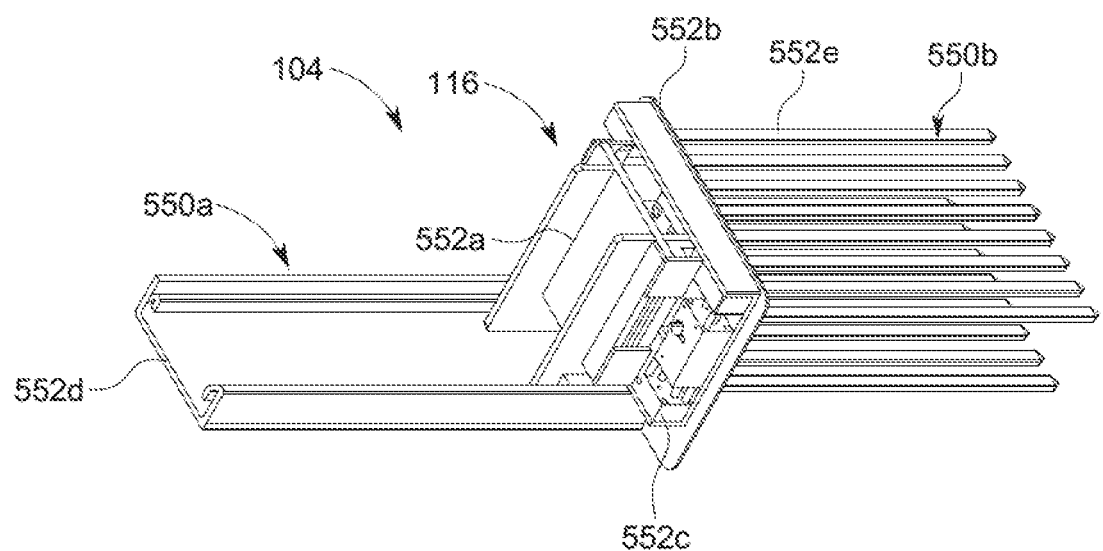
Figure 5E:
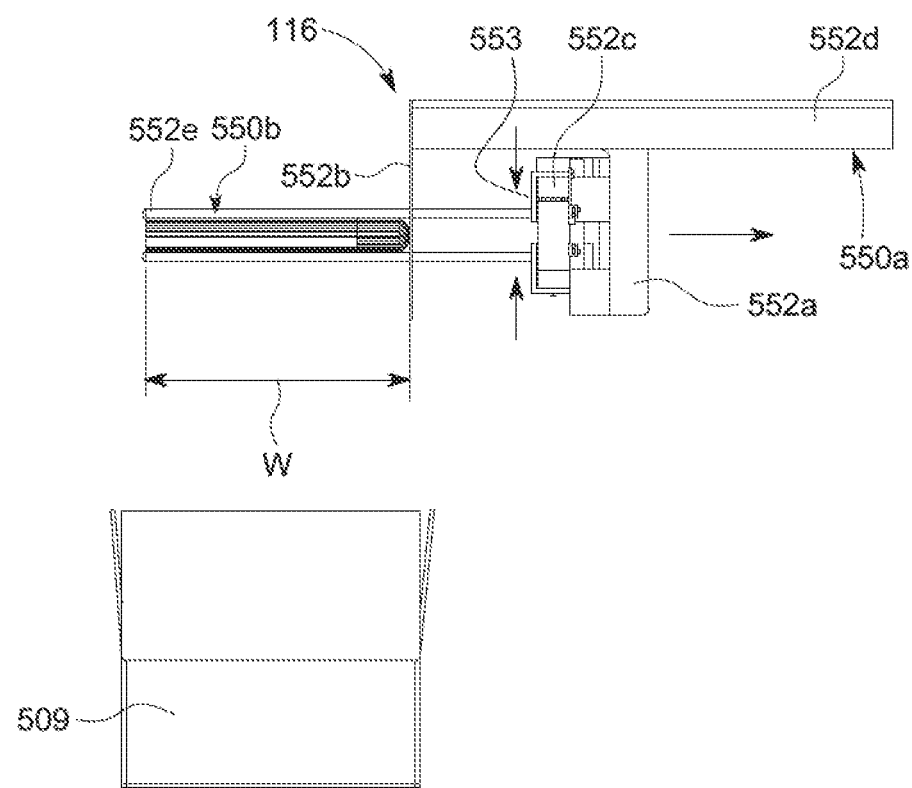

While FIGS. 5A-5C depict an example grip hand 116 with movable sets of the fingers 552e for gripping the items 111, it will be appreciated that the grip hand 116 may also be used for manipulating the totes 108, the shipping containers 509, the conveyor 102, and other portions of the handling system 100. It will also be appreciated that the grip hand 116 may be in various forms, such as the grip hand 116 of FIGS. 5A-5C, as well as other versions, such as an adjustable grip hand with selectively extendable fingers and a merger grip hand as described further herein.

Figure 6A:
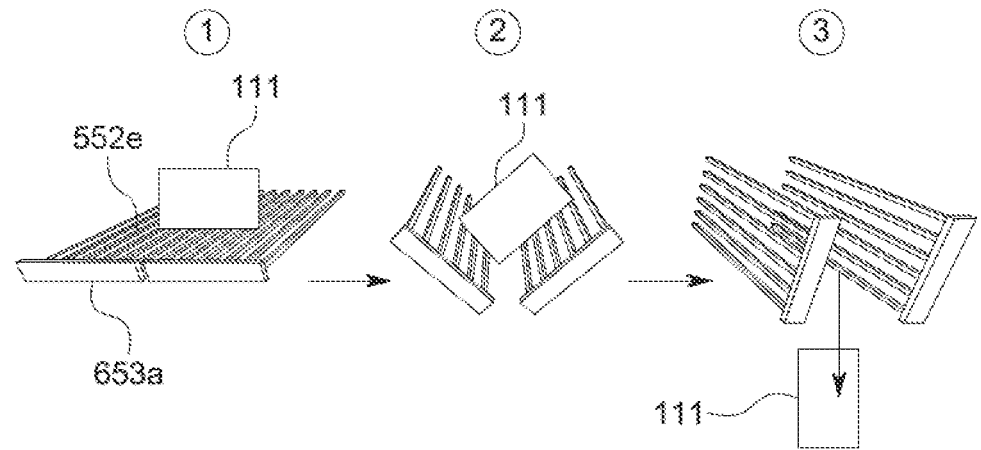
FIGS. 6A-6B are schematic diagrams depicting example configurations of fingers of the grip hand.
Figure 6B:
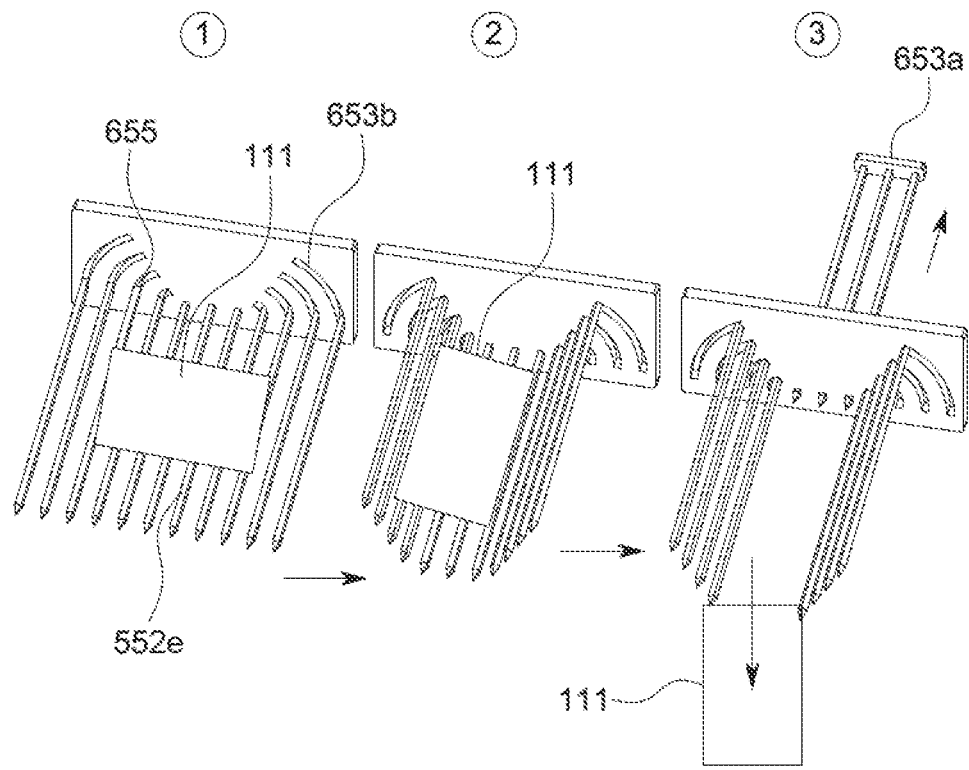

FIGS. 6A-6B are schematic diagrams depicting example configurations of the fingers 552e of the grip hand 116 (FIGS. 5A-5E). As demonstrated by FIGS. 6A and 6B, the actuators 552c may be activated for various movements about the base 552a to allow for extension, retraction, rotation, etc. of the finger assemblies 550b.

As shown in the flat configurations of FIG. 6A, the fingers 552e may be secured to one or more finger plates 653a. The finger plates 653a may act as (or be coupled to) the plates 553 supported and moved by the actuators 552c on the base 552a of the palm 550a as shown in FIGS. 5A-5E. One or more of the finger plates 653a and corresponding fingers 552e may be arranged to interact with (e.g., lift, grip, etc.) the items 111.

As shown in position 1 of FIG. 6A, the fingers 552e may define a flat surface for supporting the items 111. This flat position may be used for lifting and scooping the items 111. As shown in position 2, the finger plates 653a may be rotated to an angle to support and center the items 111 thereon. As shown in position 3, the finger plates 653 may be rotated to a parallel position to allow the item to fall therebetween (e.g., into the shipping container 509 of FIG. 5E).

As shown in the angled (or curved) configuration of FIG. 6B, finger plates 653a and the guide plates 653b may be provided about the fingers 552e to provide a path for movement of the fingers 552e. As shown in position 1, the fingers 552e may be in a flat orientation about the guide plate 653b. As shown in position 2, an outer portion of the fingers 552e move through slots 655 in the guide plates 653b to define a curved shape for supporting and centering the items 111 on the fingers 552e. An inner portion of the fingers 552e carried by the finger plate 653a may be retracted using the finger plate 653a to define an opening between the fingers 552e to release the items 111 as indicated by the arrow (position 3).

FIGS. 7A-7D2 are schematic diagrams depicting the grip hand 116 positioned in various orientations about the totes 708a-c and shipping containers 509 for use therewith. As shown by these figures, the grip hand 116 may be positioned to pass into various types of totes and shipping containers in various orientations to insert or remove items 111 therefrom.

FIGS. 7A1 and 7A2 show the grip hand 116 being inserted vertically and horizontally, respectively, into the tote 708a. The tote 708a may be similar to the tote 208h of FIG. 2H. This version has side walls 724, front wall 723, chambers 730, and vertical walls 734. As shown in these views, the tote 708a may be positioned in various orientations (e.g., vertically and horizontally) during use with the grip hand 116. The handling robot 114 (FIG. 5A or 5B) may be activated position the grip hand 116 in the proper orientation about the tote 708a for use therewith. The grip hand 116 may be positioned such that the fingers 552e are aligned with the chamber 730 of the tote 708a.

The fingers 552e are insertable into the chamber 730 by advancement of the base 552a along the bearing 552d (and/or by advancement of the grip hand 116 by the robot 114). Once in the chamber 730, the actuators 552c may be engaged to move the fingers 552e together to grip the item(s) 111 for removal from the chamber 730, or to spread the fingers 552e apart to release the item(s) 111 into the chamber 730. Optionally, the grip hand 116 may be advanced to pass the fingers 552e through the receptacles 709 between the tool reliefs 710 of the tote 708a, thereby passing through one or more of the partition walls 734 and one or more of the chambers 730 in the tote 708a.

Figure 7B:
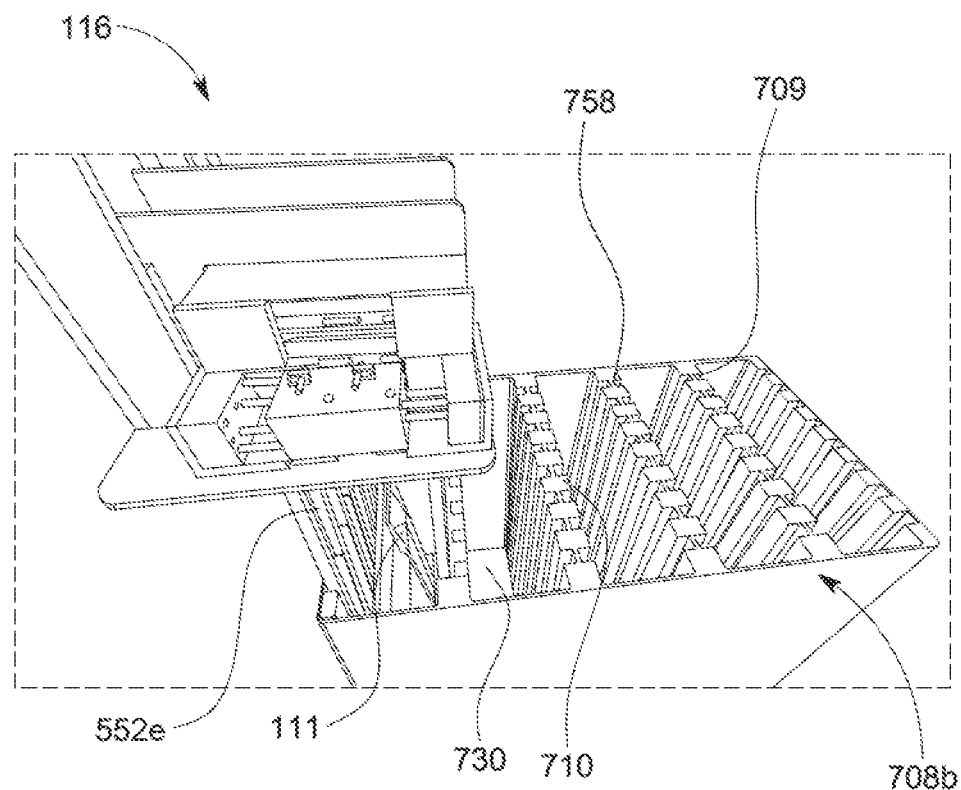

FIG. 7B shows the grip hand 116 in use with the tote 708. The tote 708b is similar to the tote 708a, except that the tool reliefs 710 have been joined by joints 758. The joints 758 may partially or completely obstruct the receptacles 709 to prevent the fingers 552e from passing between the separate chambers 730 of the tote 708b. This version may be used to isolate the items 111 in each chamber 730 and/or to contain the fingers 552e in a single chamber 730 during a gripping operation. The receptacles 709 may be closed, but still define a depression between the tool reliefs 710, thereby permitting the fingers 552e to pass into the receptacles 709 to lift the items 111.

Figure 7C:
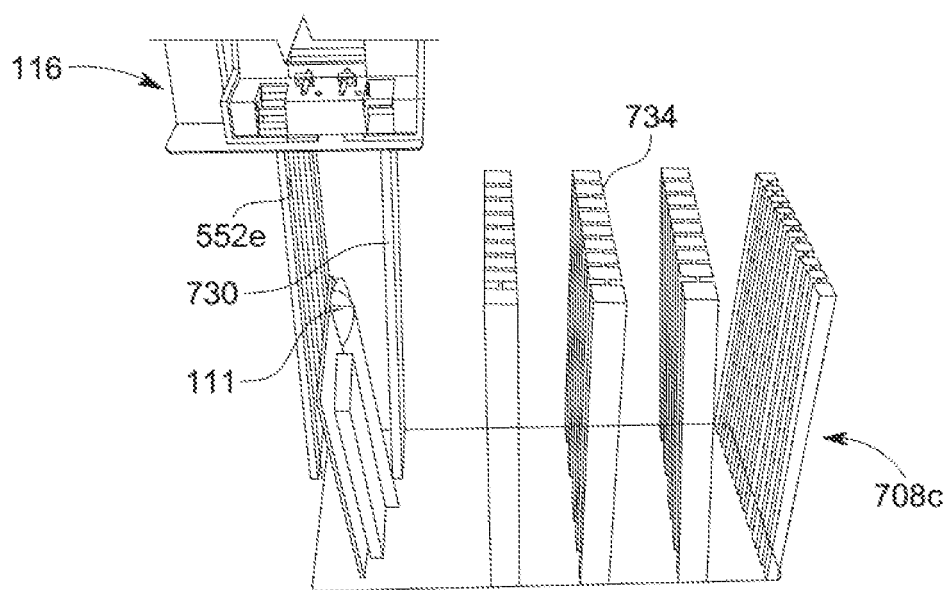

FIG. 7C show the grip hand 116 performing a release operation in the tote 708c. The tote 708c may be similar to the tote 708a with multiple partition walls 734 supported on the bottom 722. For descriptive purposes, some of the side walls 724 of the tote 708c of FIG. 7A1 have been removed to show the items 111 and fingers 552e therein. As demonstrated by this view, the tote 708c may have various configurations including one or more partition walls 734 and one or more chambers 730. As also demonstrated by this view, the grip hand 116 may be positioned so that the fingers 552e enter the chamber 730 and release the items 111. The fingers 552e may be positioned for non-contact with the partition walls 734 (or the side walls 724) of the tote 708c.

FIGS. 7D1 and 7D2 show the grip hand 116 positioned about the shipping container 509 for performing an unloading operation. The shipping container 509 in this version is a box, but any shipping container or tote may be used. In FIG. 7D1, the grip hand 116 is positioned above the shipping container 509 with the item 111 gripped between the fingers 552e. The grip hand 116 may be positioned at an angle above the shipping container 509 in alignment with an opening in the tote 708d. The fingers 552e are in an extended position with the backing plate 552b adjacent an edge of the shipping container 509. The fingers 552e may be sized and positioned to correspond to the width W of the opening in the shipping container 509 to facilitate the unloading operation.

As shown in FIG. 7D2, the fingers 552e may be retracted away from the shipping container 509 and into the grip hand 116 using the actuators 552c. Once retracted, the items 111 are free to fall into the shipping container 509. The backing plate 552b may act as a stop to prevent the items 111 from retracting with the fingers 552e. The fingers 552e may also pass through slots in the backing plate 552b. The backing plates may be used to prevents the items 111 from being carried into the finger assemblies 550b, thereby leaving the items 111 in place when the finger assemblies 550b are retracted through the backing plate 552b.

Figure 8B:
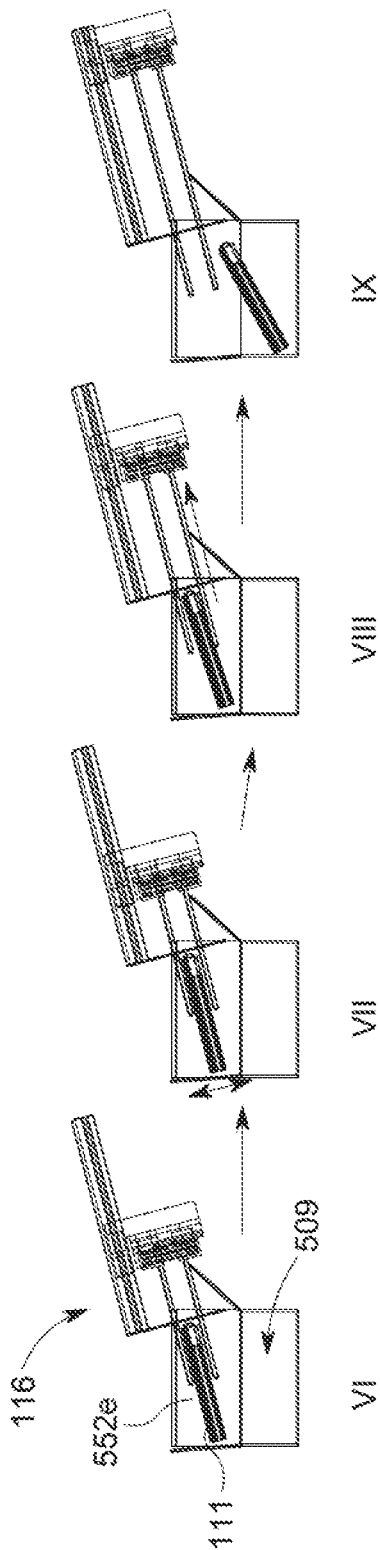

FIGS. 8A-8B are schematic diagrams depicting the grip hand 116 performing various tote operations. In each of these figures, the grip hand 116 picks (e.g., lifts, grips, etc.) the item 111 from the tote 808 and/or releases (places) the item 111 into a shipping container 509. These diagrams also demonstrate the capability of maintaining an orientation of the items 111 as positioned in the tote 808 when moving the items 111 to the shipping container 509. The tote 808 may be any of the totes described herein with tool reliefs and tote receptacles shaped to receive the fingers 552e therethrough (see, e.g., tool reliefs 210a-h and tool receptacles 209a-h of FIGS. 2A-2H).

FIG. 8A shows the grip hand 116 performing a 'pick and place' tote operation. This operation involves picking (e.g., lifting or scooping) the items 111 up from the tote 808 in steps I-V, and then placing (e.g., lowering) the items 111 in the shipping container 509 in steps VI-IX. In step I, the grip hand 116 is positioned adjacent the tote 808. In step II, the fingers 552e of the grip hand 116 are rotated into alignment with the items 111 in the tote 808. In step III, the fingers 552e are advanced into the tote 808 between the tool reliefs of the tote 808 and then in step IV pass through the receptacles of the tote 808 to lift (scoop up) the items 111. The items 111 rest on the row of fingers 552e. In step 5, the fingers 552e are rotated by the grip hand 116 as the items 111 are lifted from the tote 808 to prevent the items 111 from falling from the fingers 552e.

With the pick operation completed, the items 111 may now be carried by the grip hand 116 to the shipping container 509 to perform the place operation. In step VI, the grip hand 116 is moved to a position with the fingers 552e aligned above the opening in the shipping container 509. In step VII, the grip hand 116 is lowered so that the fingers 552e with the items 111 thereon extend into the opening in the shipping container 509. In steps VIII and IX, the fingers 552e are retracted as described in FIGS. 7D1 and 7D2 to place (e.g., release) the items 111 into the shipping container 509. As shown in these figures, the tote fingers 552e may be positioned at a flat or angled orientation during the operation to facilitate or restrict movement of the items 111 as needed.

FIG. 8B shows the grip hand 116 performing a gripper placing operation for packing the shipping container 509. In this version, the grip hand 116 includes two rows of the fingers 552e that grip the items 111 therebetween as previously described in FIGS. 7D1 and 7D2. In step VI of this version, the grip hand 116 is moved to a position with the fingers 552e aligned above an opening in the shipping container 509. In step VII, the actuators 552c of the grip hand 116 is activated to open the rows of the fingers 552e and un-grip the items 111. In steps VIII and IX, the fingers 552e are retracted as described in FIGS. 7D1 and 7D2 to place (e.g., release) the items 111 to fall into the shipping container 509.

Figure 8C:
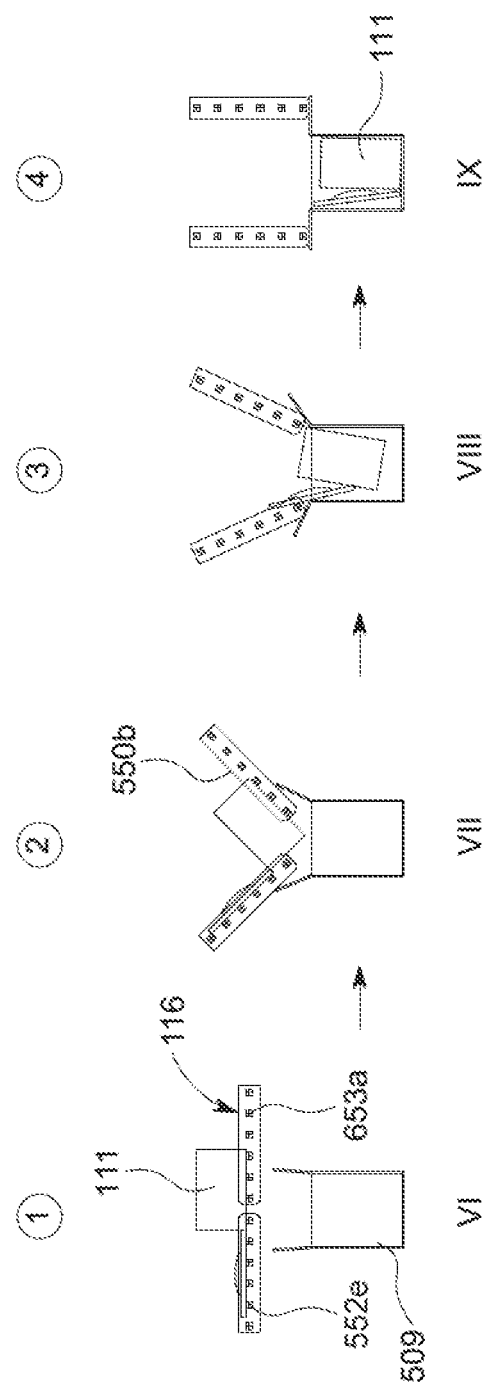

FIG. 8C shows the grip hand 116 packing the shipping container 509 in a split finger packing operation. In this version, the steps VI-IX of packing operation are used to move the items 111 between sets of fingers 552e of the grip hand 116. The actuators 552c of the grip hand 116 rotate the fingers 552e between a horizontal position as shown in step VI to an angled position in step VII, to an open position in step VIII, and to a vertical position in step IX in a manner similar to the fingers 552e of FIG. 6A. In steps VI to VII, the grip hand 116 is moved from a horizontal to an angled position above the tote 808b with the items 111 resting above the opening of the tote 808b on the fingers 552e. As the fingers 552e are rotated, a space is provided between the fingers 552e to allow the item 111 to fall between the sets of the fingers 552e to allow the item 111 to fall into the tote 808b as shown in positioned VIII and IX.

FIGS. 9A, 9B1-9B2, 9C, and 9D are schematic diagrams depicting various loading and picking operations. Each of these figures shows the items 111 loaded onto a tote 908a, b, and the fingers 552e of the grip hand 116 passing through the tote 908a, b to remove the items 111. For descriptive purposes only a portion of a tote 908a, b with tool reliefs 910a, b and the receptacles 909a, b is shown. As demonstrated by these figures, the items 111 may be loaded into the tote 908a, b and removed in a pre-determined position by the grip hand 116.

FIG. 9A shows a loading and picking operation using a lifting configuration similar to that of steps I-V of FIG. 8A. In this version, the items 111 are vertically stacked on the flat tool reliefs 910a, and one set of the fingers 552e lifts the items 111 from the tote 908a. The fingers 552e of the grip hand 116 extend between the tool reliefs 910a and into the receptacles 909a below the items 111. The fingers 552e may then be lifted, thereby also lifting the items 111 therewith.

FIGS. 9B1 and 9B2 show a loading and picking operation using a gripping configuration similar to that of FIG. 8B. FIG. 9B1 shows the tote 908a in a horizontal position, and FIG. 9B2 shows the tote 908a in a vertical position with the items 111 loaded and picked therefrom. In FIG. 9B1, the items 111 are vertically stacked and the fingers 552e of the grip hand 116 are inserted into the tote 908a to remove the items 111 similar to the operation in FIG. 9A. In this version, the grip hand 116 includes two sets of fingers 552e capable of moving together to grip the items 111, with one set of the fingers 552e pass into the receptacles 909a between the tool reliefs 910a as in FIG. 9A and the other set of fingers 552e above the items 111. The grip hand 116 may lift both sets of the fingers 552e, thereby also lifting the items 111 from the tote 908a. The sets of fingers 552e may also move together to grip the items 111 in a reverse operation to the movement of the fingers 552e as described in FIG. 5E. In FIG. 9b2, the items are stacked horizontally with the fingers 552e extending into the tote 908a to grip and remove the items 111.

FIG. 9C shows a loading and picking operation using a lifting configuration. This version is similar to that of FIG. 9A, except that, in this version, the items 111 are stacked horizontally about the tool reliefs 910a of the tote 908a. The grip hand 116 has a single set of fingers 552e capable of lifting the items 111 and placing them in the shipping container 509 similar to the operation of steps VI-IX of FIG. 8A. As demonstrated by this figure, the fingers 552e are inserted into the receptacles 909a of the tote 908a to lift the items 111 while maintaining a horizontal arrangement of the items 111 as the fingers 552e lift the items 111 and drop them into the shipping container 509.

FIG. 9D shows a loading and picking operation using a slanted placement operation. This version is similar to the version of FIG. 9C, except that the tote 908b has slanted tool reliefs 910b similar to those of FIG. 2A. As the items 111 are placed on the slanted tool reliefs 910b, the items 111 are urged toward a middle of the tote 908b and centered along the tool reliefs 910b. The fingers 550 of the grip hand 116 then lift the items 111 and place them in the shipping container 509 in a similar manner to the operation of FIG. 9C.

Figure 10B:
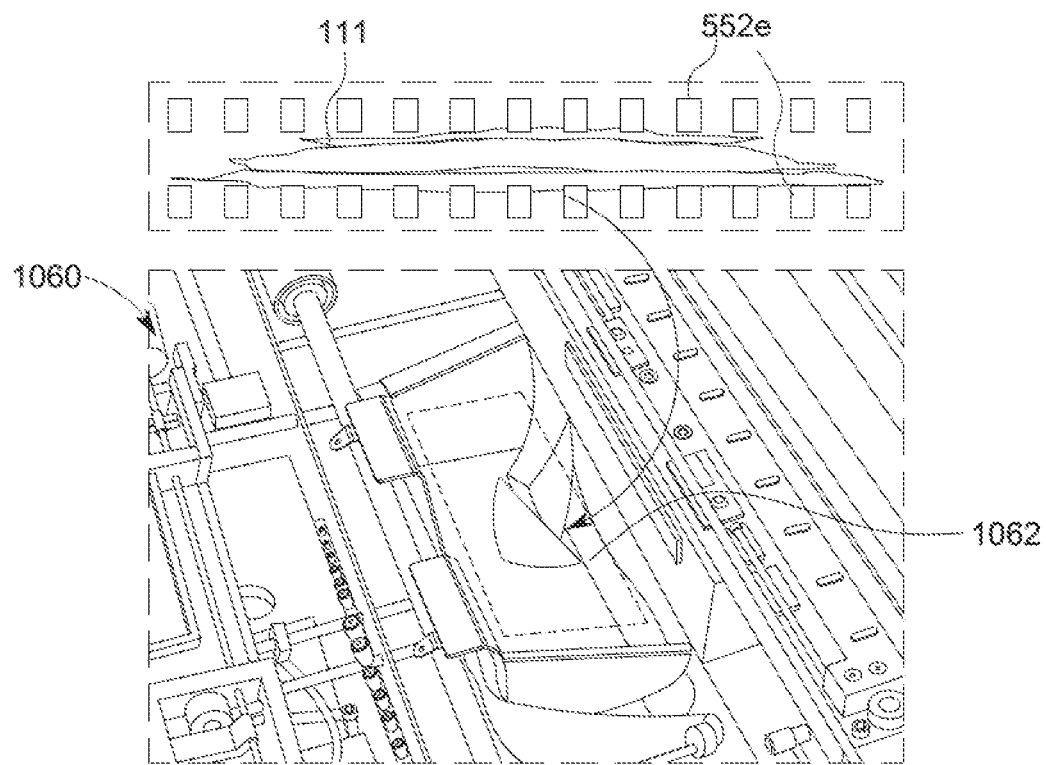

FIGS. 10A-14C show various tote operations using conveyors and other handling equipment. FIGS. 10A1-10A2, 10B, 10C, and 10D are schematic diagrams depicting the grip hand 116 in use with packaging equipment 1060 for packaging the items 111. As shown in FIG. 10A1, the grip hand 116 delivers the items 111 to the packaging equipment 1060. As shown in FIG. 10A2, the grip hand 116 has two sets of fingers 552e gripping the items 111. Upon insertion into the packaging equipment 1060, the fingers 552e expand and then release the items 111 into the packaging equipment 1060 in a manner similar to FIG. 8B. The items 111 are inserted into the packing machine 1060 with the fingers 552e (step I), the fingers 552e move to an ungripped position (step II), and then the fingers 552e are retracted to release the items 111 so that the packing equipment 1060 may surround and seal the items with the plastic 1062 (step III).

FIG. 10B shows a portion of the packing machine 1060 depicting the unloading of the items 111 from the fingers 552e in greater detail. In this example, the packaging equipment 1060 is a semi-automatic polybag machine capable of encasing the items 111 in plastic 1062. As also shown, the items 111 are stacked between the fingers 552e during insertion into the machine.

Figure 10C:
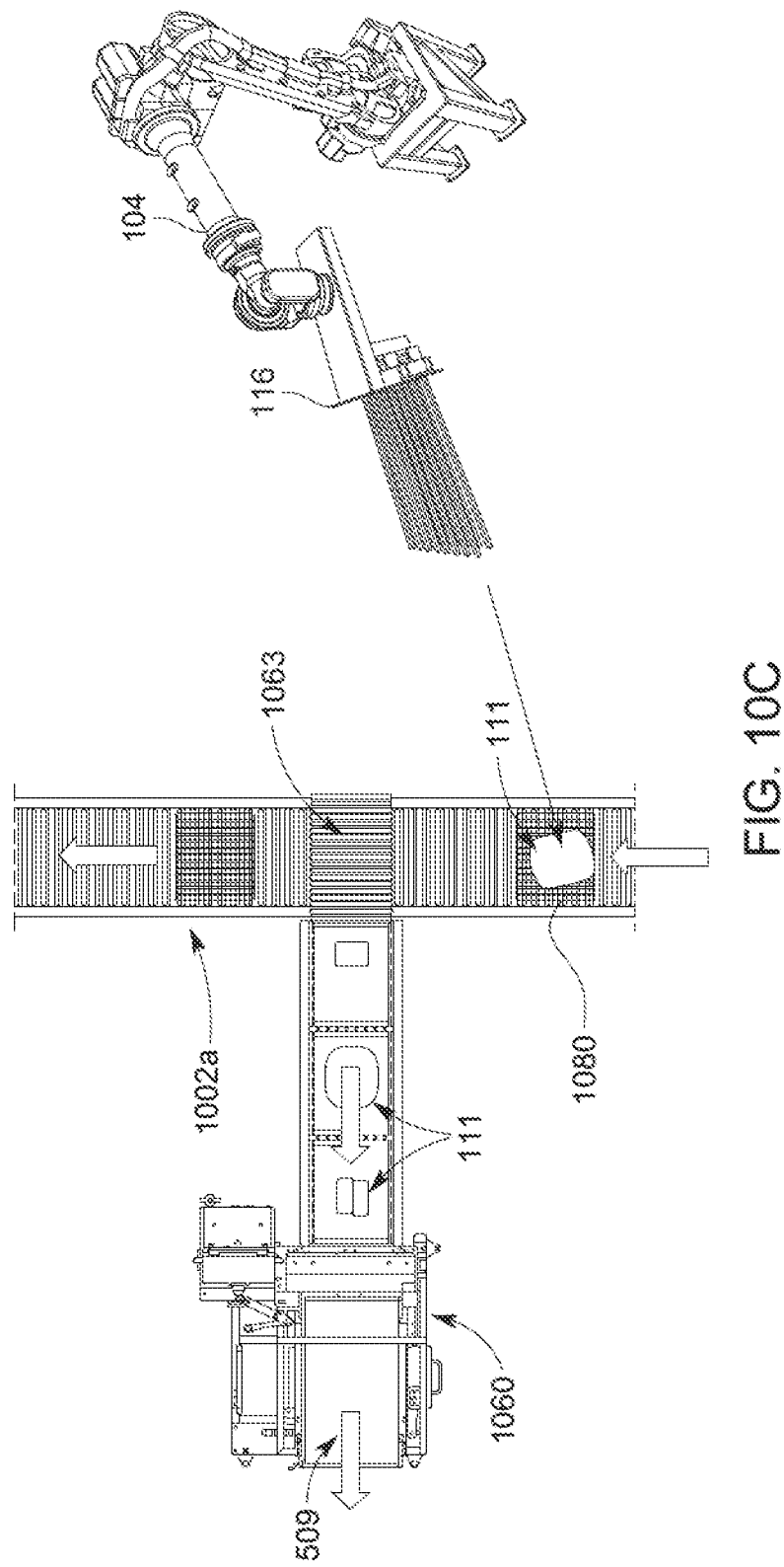

FIG. 10C conceptually shows the grip hand 116 in use with a tote conveyor 1002a. In this example, the tote handler 104 passes items 111 into totes 1080 on the tote conveyor 1002a. The tote conveyor 1002a passes the totes 1080 to the packaging equipment 1060. Various devices may be provided along the tote conveyor 1002a, such as a transfer (or diverter) 1063 for passing the totes 1080 between conveyors, and a packaging equipment 1060 for packaging (e.g., box, bag, cover in plastic, etc.) and labeling the items 111 for shipment in the shipping containers 509.

Figure 10D:
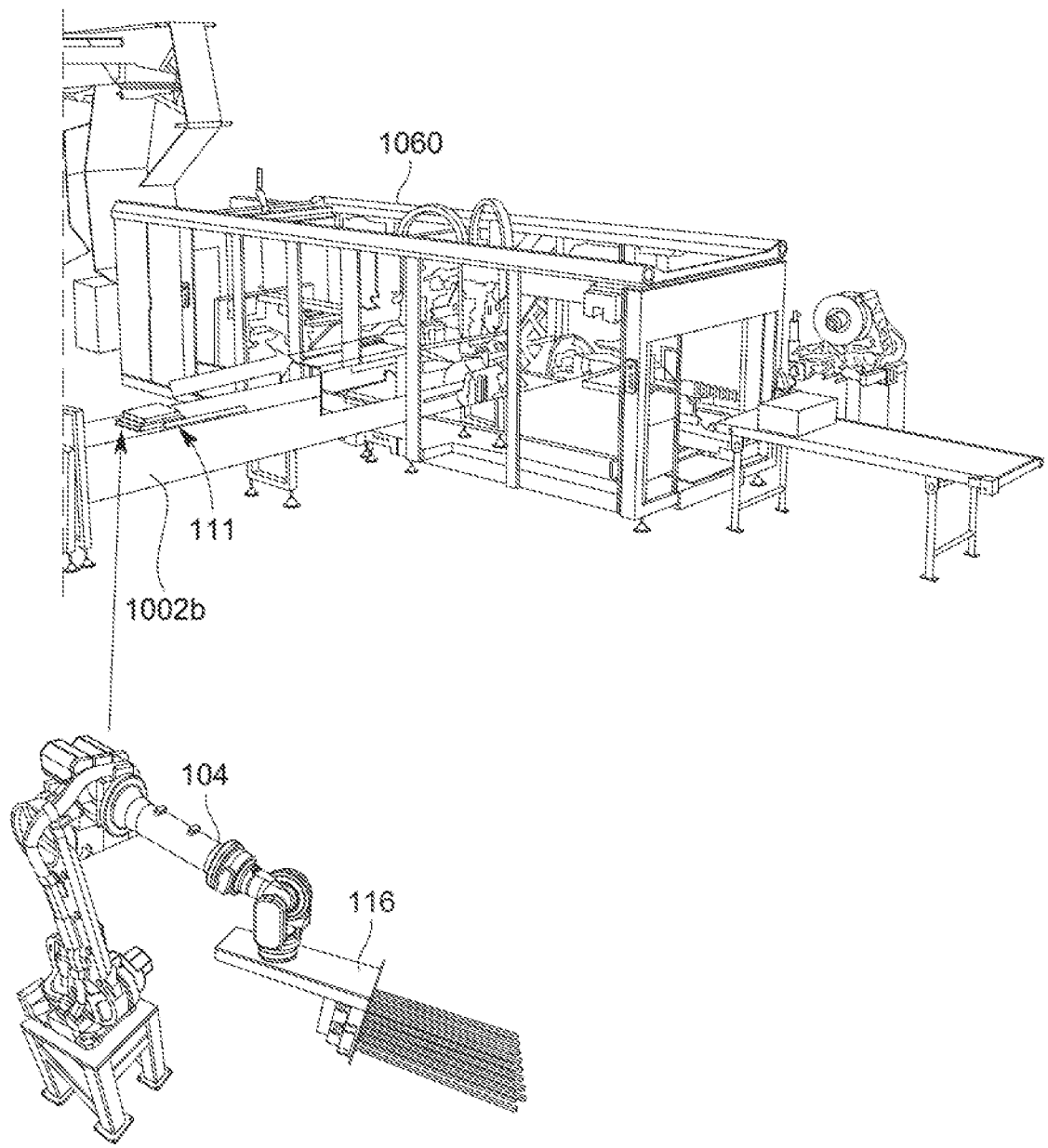

FIG. 10D shows the tote handler 104 in use with another tote conveyor 1002b. As shown in this example, the tote handler 104 may unload the items 111 from the tote 1080 onto the tote conveyor 1002 in a specific configuration for packaging in the packaging equipment 1060.

FIGS. 11A-11E are schematic diagrams depicting various configurations of the tote conveyor 1102. As shown in these views, the tote 1108 may be used with a variety of tote conveyors for performing transport operations for moving the totes 1108 to desired locations for picking, placing, loading, and/or other tote operations. The tote conveyors 1102 may have a variety of conveyor portions 1102a1, 1102a2 that form desired pathways, and may have transfers 1103 for directing the totes 1108 therebetween. The tote handler 104 may be positioned about one or more of the conveyor portions 1102a1, 1102a2 for picking, placing, or otherwise handling the items 111 about the conveyor 1102 for use with various equipment as demonstrated by FIGS. 10A-10D.

Figure 11A:
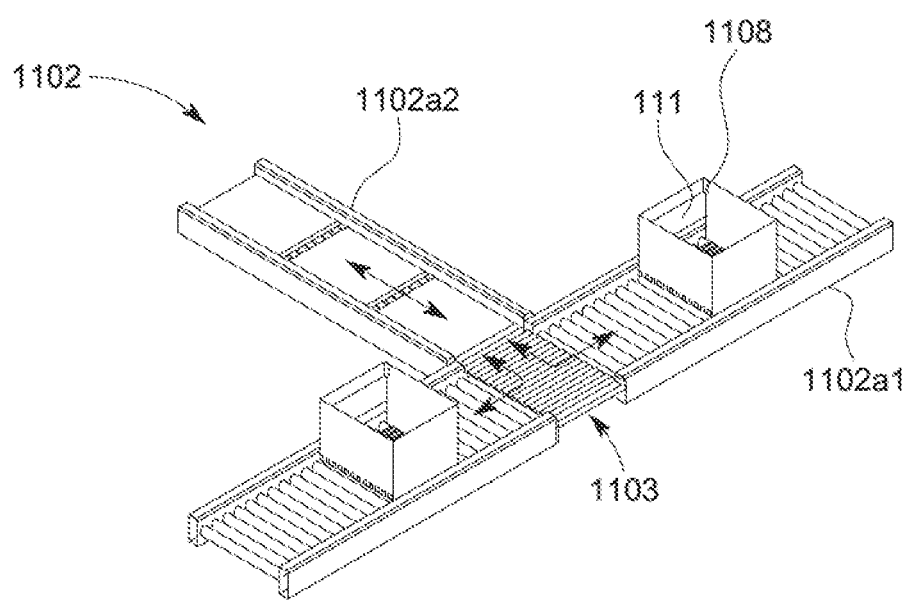
FIG. 11A-11E are schematic diagrams depicting various configurations of portions of the tote conveyor.
Figure 11B:
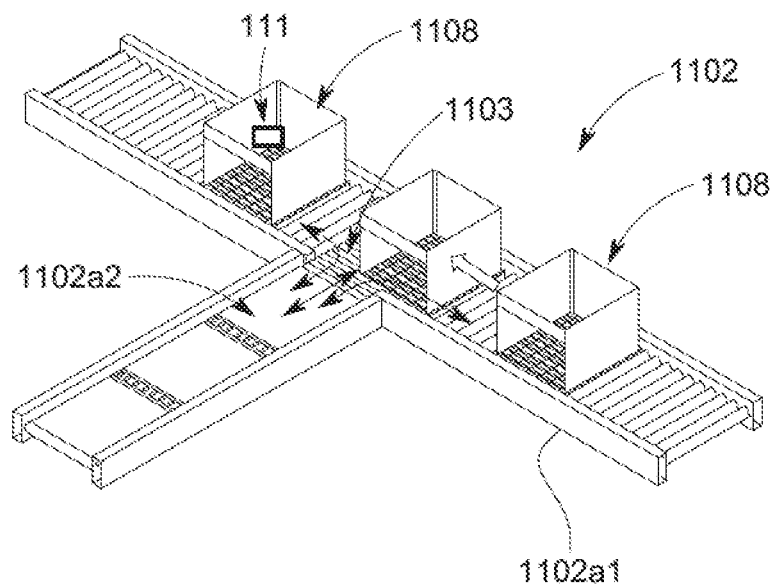

FIGS. 11A and 11B show the tote conveyors 1102 as including first conveyor portions 1102a1 and a second conveyor portion 1102a2 connected by a transfer 1103 for transporting the tote 1108 and items 111. The first and second conveyor portions 1102a1, 1102a2 may be conventional conveyors with rollers, belts, or other devices capable of supporting and transporting the totes 1108. The first and second conveyor portions 1102*a*1, 1102*a*2 may be passive or driven by a motor or other device. The transfer 1103 may be a conventional transfer 1103, such as a belt or roller transfer (or diverter), capable of redirecting the totes 1108 from the first convey portion 1102*a*1 to the second conveyor portion 1102*a*2.

In the example of FIG. 11A, the tote 1108 with items 111 therein passes from the first conveyor portion 1102*a*1 to the second conveyor portion 1102*a*2 via the transfer 1103. The items 111 are unloaded from the tote 1108 at the second conveyor portion 1102*a*2. The empty tote 1108 then returns to the first conveyor portion 1102*a*1 via the transfer 1103 and continues along a remainder of the first conveyor portions 1102*a*1.

In the example of FIG. 11B, multiple totes 1108 with the items 111 may be staged for selective movement from the first conveyor portion 1102*a*1 to the second conveyor portion 1102*a*2, thereby unloading items 111 from each of the totes 1108 in a specific order. The conveyor 1102 may be programmed to selectively advance one or more of the totes 1108 in a desired sequence for selective sorting and unloading the items 111.

Figure 11C:
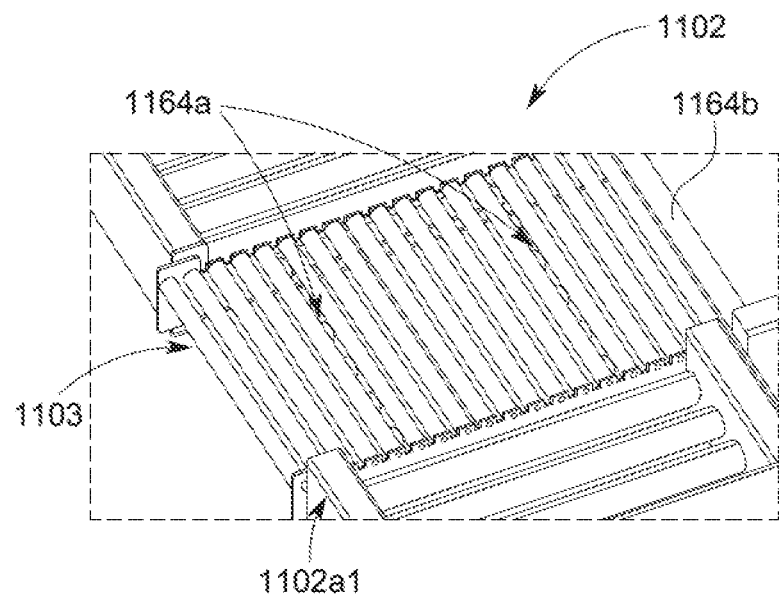
Figure 11D:
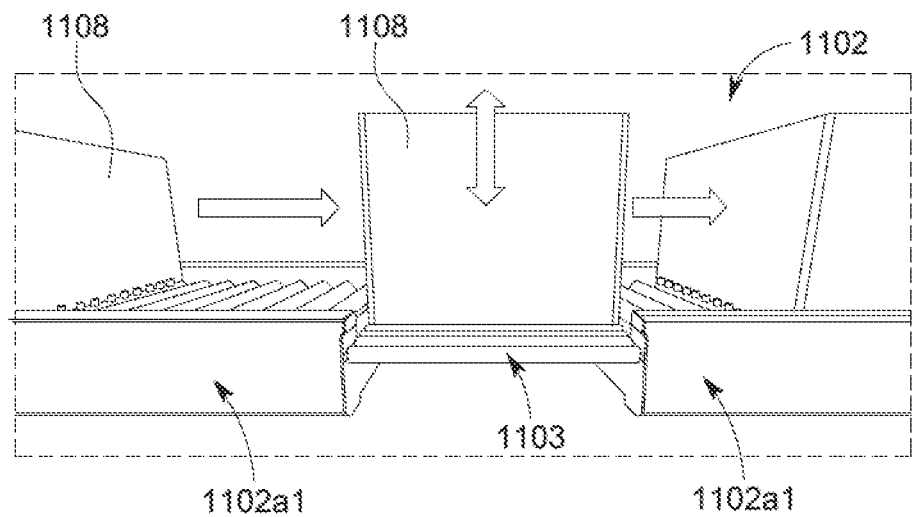

FIGS. 11C and 11D show portions of the conveyor 1102 in greater detail. As shown in FIG. 11C, the transfer 1103 may include transfer belts 1164*a* and long rollers 1164*b* that are selectively activated to engage the tote 1108 and steer the tote 1108 in the desired direction to the desired conveyor portion 1102*a*1 or 1102*a*2 (FIGS. 11A and 11B). The transfer belts 1164*a* may be bands that lift above the transfer rollers 1164*b* and rotate in a direction aligned with the first conveyor portion 1102*a*1. The transfer rollers 1164*b* may be positioned below the first conveyor portion 1102*a*1 and be positioned at a level similar to the second conveyor portion 1102*a*2 (FIGS. 11A and 11B). The transfer rollers 1164*b* may be driven to rotate in a direction aligned with the second conveyor portion 1102*a*2 (FIGS. 11A and 11B).

As shown in FIG. 11D, the conveyor portions 1102*a*1 are conventional roller driven conveyors connected to the transfer rollers 1164*b* of the transfer 1103. The tote 1108 is advanced from the first conveyor portion 1102*a*1 onto the transfer 1103 by raising and rotating the transfer belts 1164*a*. The transfer belts 1164*a* lower to allow the transfer rollers 1164*b* to engage and drive the tote 1108 onto the second conveyor portion 1102*a*2 as shown in FIGS. 11A and 11B. The second conveyor portion 1102*a*2 may then move the tote 1108 to and from the transfer 1103. The transfer 1103 may advance the tote 1108 back onto the first conveyor portion 1102*a*1 in either direction after the tote 1108 returns from the second conveyor portion 1102*a*2 (FIGS. 11A and 11B). One or more of the transfers 1103 and conveyor portions 1102*a*1, 1102*a*2 may be used to cycle the items 111 to desired locations as needed.

Figure 11E:
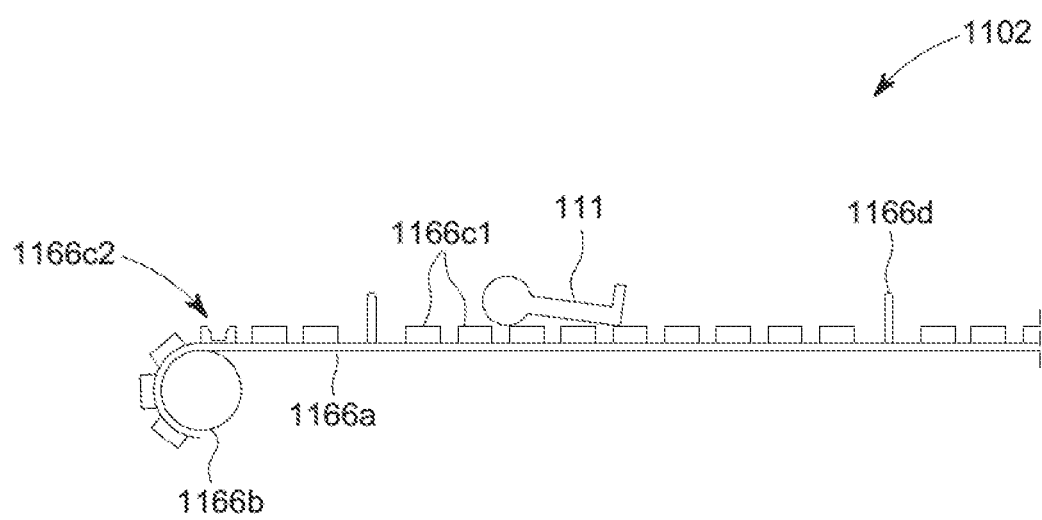

The tote conveyor 1102 may be provided with additional features to facilitate transport operations. For example, as shown in FIG. 11E, the conveyor 1102 may be belt conveyors with a belt 1166*a* driven around a head stock roller 1166*b* and provided with belt reliefs 1166*c*1 and belt reliefs 1166*c*2 for engaging the tote 1108. For descriptive purposes only a portion of the conveyor 1102 is shown, but may continue around the headstock roller to form a complete loop. The belt reliefs 1166*c*1 may include raised portions to support the totes 1108. The belt reliefs 1166*c*1 may include raised portions that support and flex the belt 1166*a* as it rotates around the head stock roller 1166*b*. Cleats 1166*d* may also be provided to separate certain totes 1108 and/or items 111 placed on the conveyor 1102. Other features, such as cutting devices, scanners, limit switches, computers, bins, and other devices may be provided about the tote conveyor 1102.

FIG. 12A-12H are schematic diagrams depicting various configurations of a tote transfer 1103. As shown in these views, the tote 1208 is configured to carry item 111 and to operate with the tote transfer 1103 to facilitate movement of the tote 1208 by the transfer 1103. The transfer 1103 may engage the tote 1208 and change a direction of travel of the tote 1208. The tote transfer 1103 may move the tote 1208 about the first conveyor portion 1102*a*1 and the second conveyor portion 1102*a*2 as described in FIGS. 11A-11D.

Figure 12A:
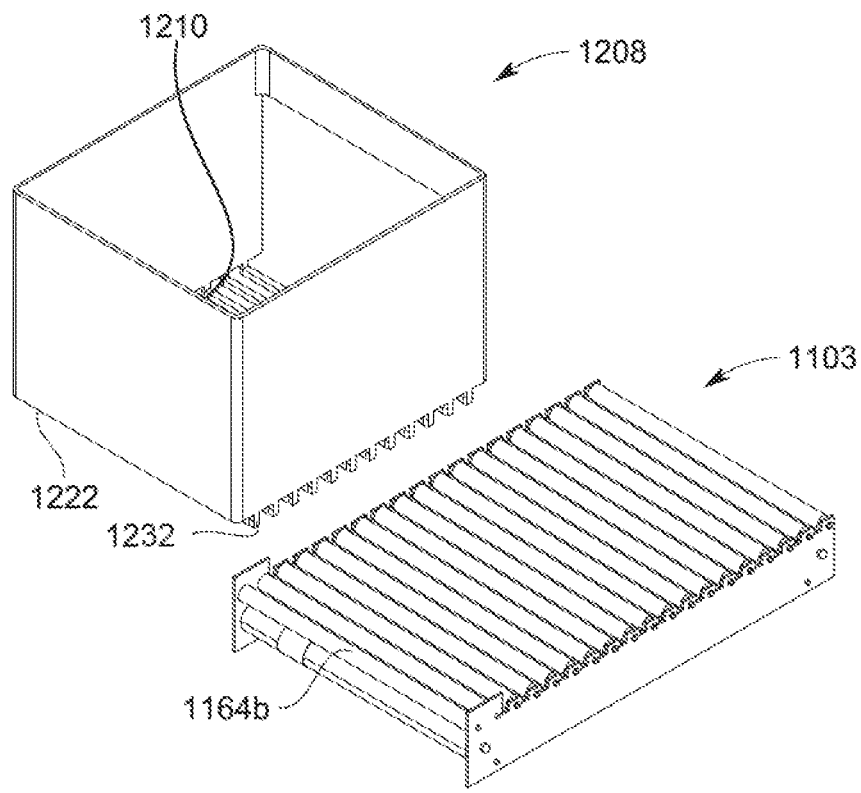
FIG. 12A-12H are schematic diagrams depicting various configurations of a conveyor tote and a conveyor tote transfer.
Figure 12B:
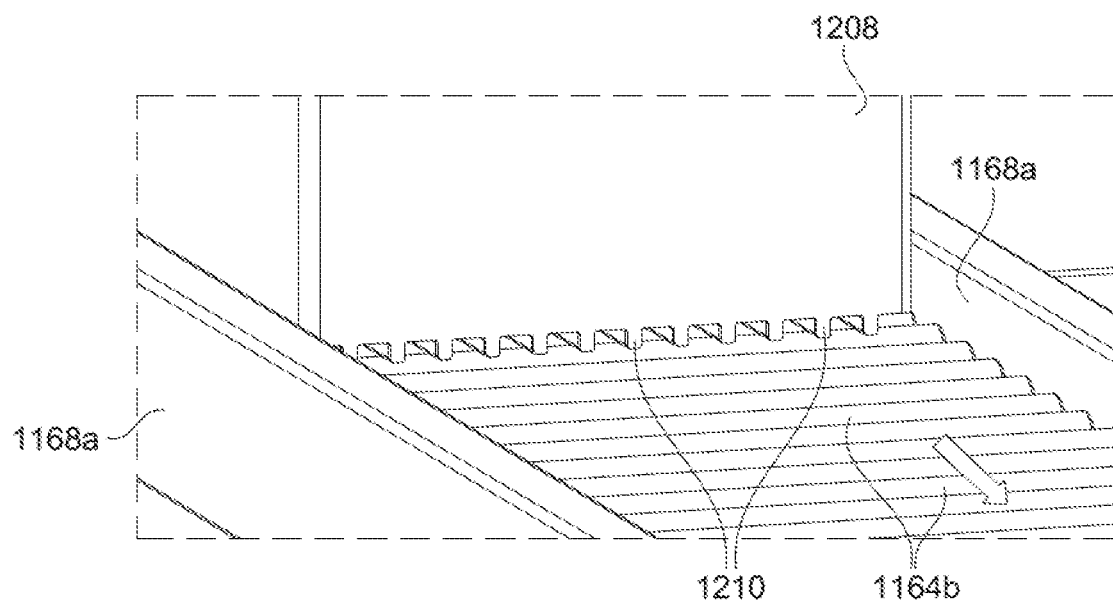
Figure 12C:
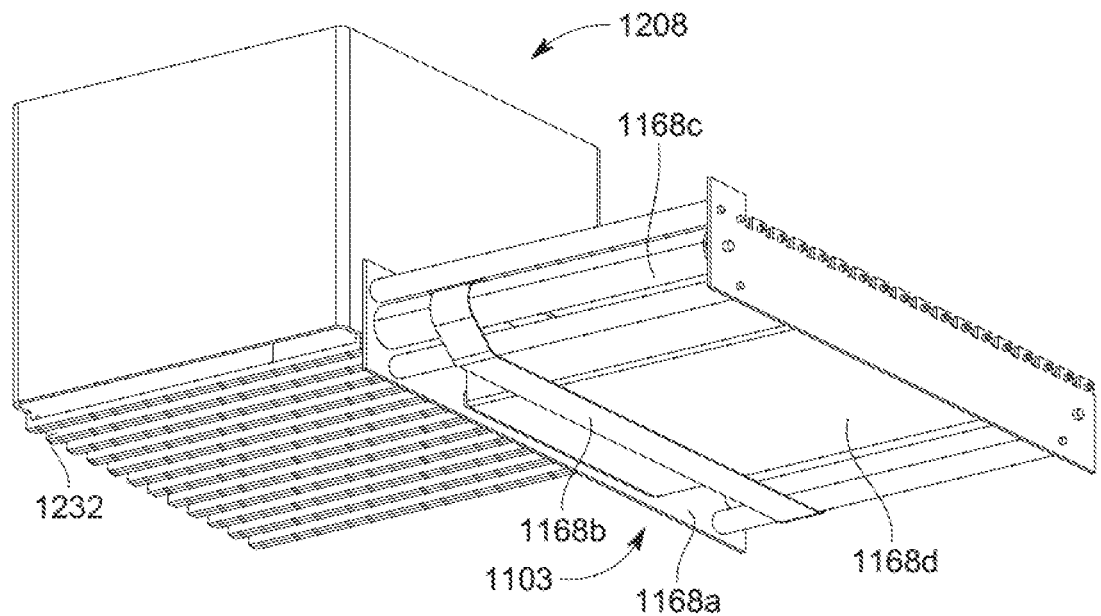
Figure 12D:
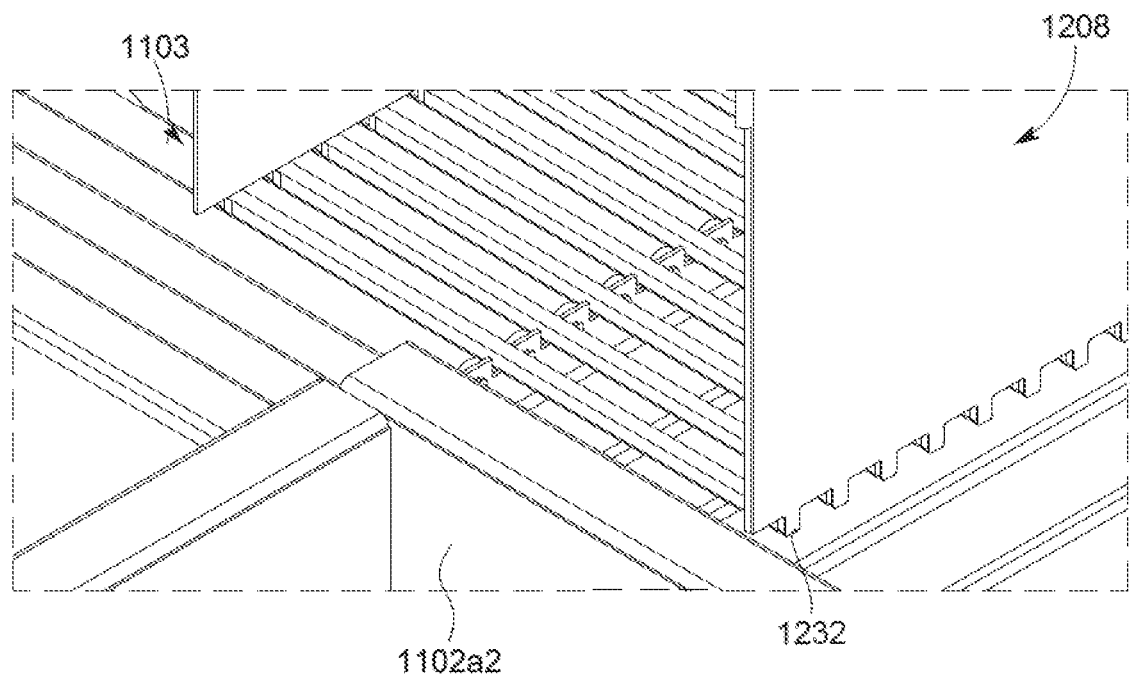
Figure 12E:
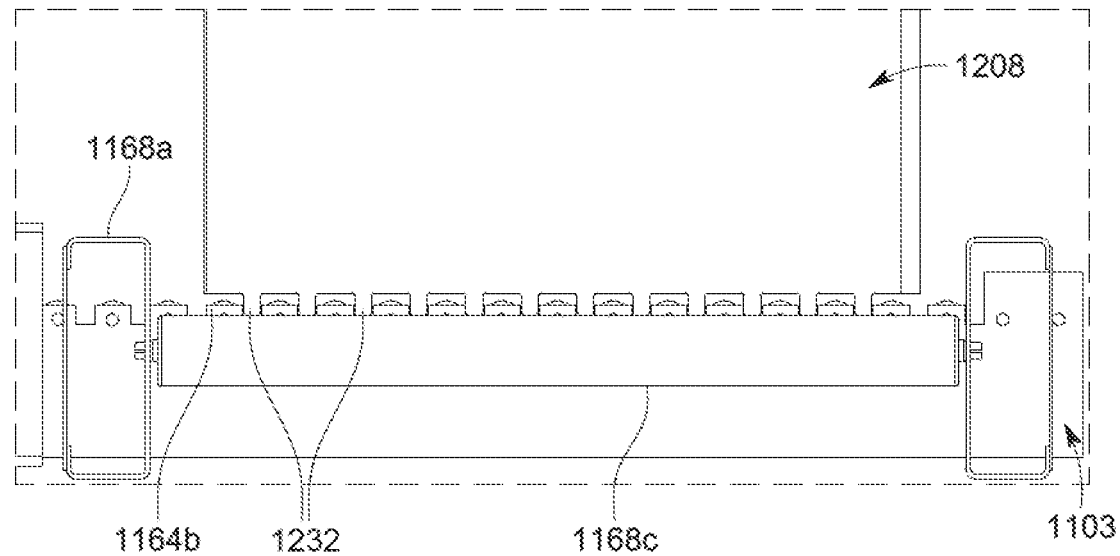
Figure 12F:
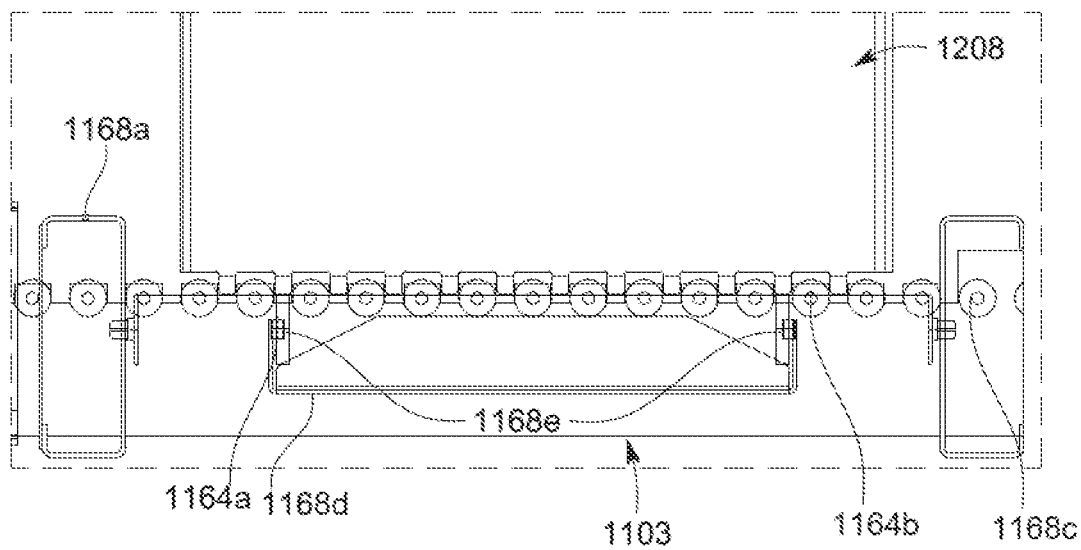
Figure 12G:
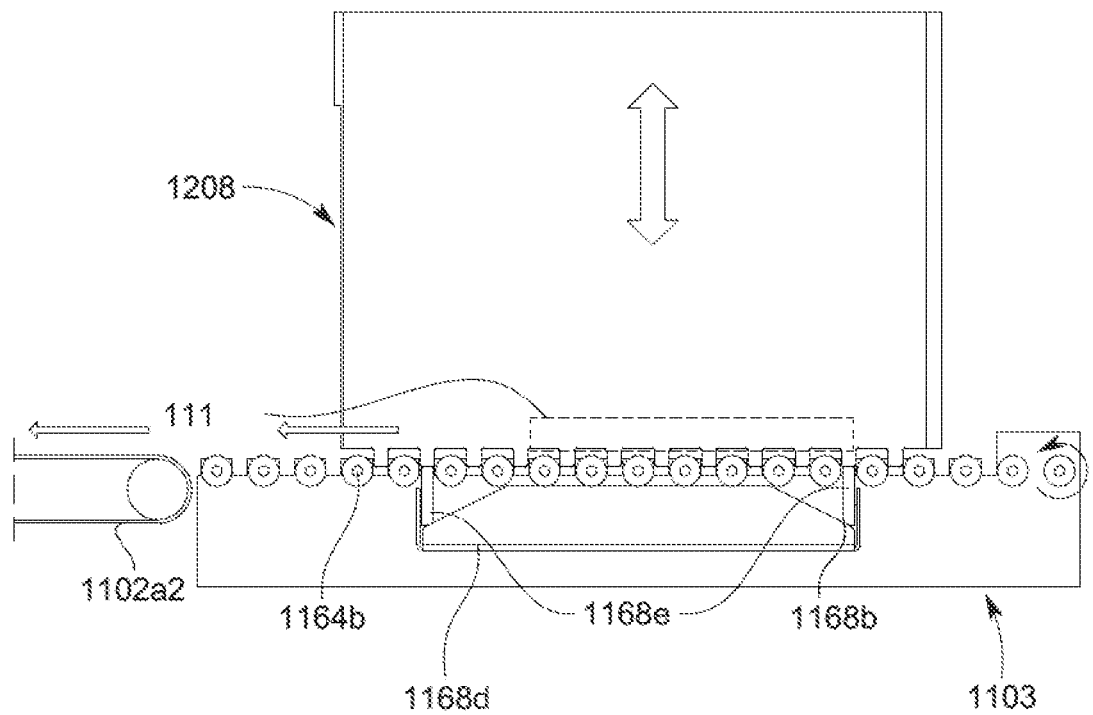
Figure 12H:
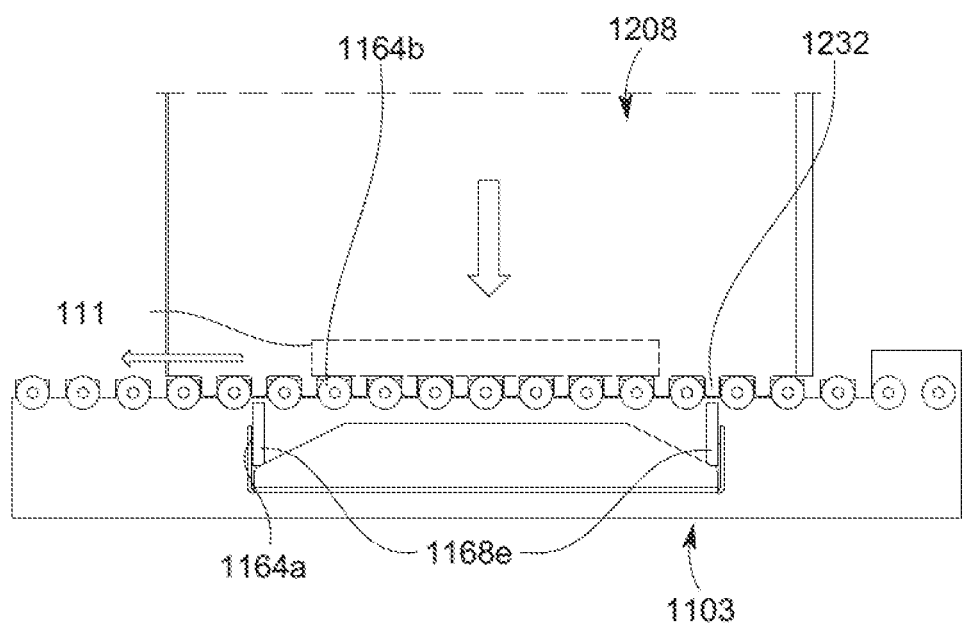

As shown in FIG. 12A-12C, the tote 1208 may be similar to the tote 208*c* of FIG. 2C. In this example, the conveyor reliefs 1232 extend below the tool reliefs 1210 from the bottom 1222 of the tote 1208 a distance therebelow to engage the transfer 1103. The conveyor reliefs 1232 may be oriented on the first and second conveyor portions 1102*a*1, *a*2 such that the tote 1208 is supported and can slidably move thereon as shown in FIG. 12B. In this position, the tote 1208 may be moved onto the transfer 1103 by the transfer belts 1164*a* as shown in FIG. 11A-11D. The tool reliefs 1210 are shaped to fit between the tote rollers 1164*b* of the tote transfer 1103 as shown in FIGS. 12E-12F. Once the transfer belt 1164*a* lowers (FIG. 11D), the conveyor reliefs 1232 may fall into gaps between the tote rollers 1164*b* as shown in FIGS. 12G-12H.

As also shown in FIGS. 12A-12H, the tote transfer 1103 includes a frame 1168*a*, a drive belt 1168*b*, a drive roller 1168*c*, and a carriage 1168*d*. The frame 1168*a* is notched to correspond to the tool reliefs 1232 as shown in FIG. 12E. The drive roller 1168*c* rotates the drive belt 1168*b* which rotates the transfer rollers 1164*b*. The carriage 1168*d* is supported on the frame 1168*a*, and rotationally supports the belts 1164*a* thereon. Belt rollers 1168*e* are also supported on the carriage 1168*d* for rotating the belts 1164*a*.

Figure 13A:
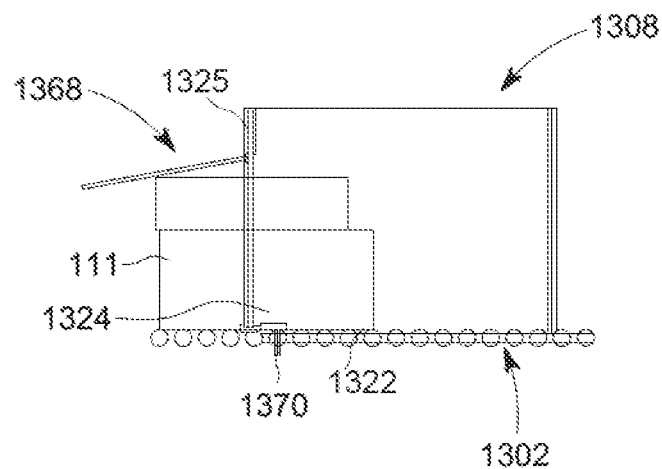
FIG. 13A-13C are schematic diagrams depicting the conveyor tote having a tote door.
Figure 13B:
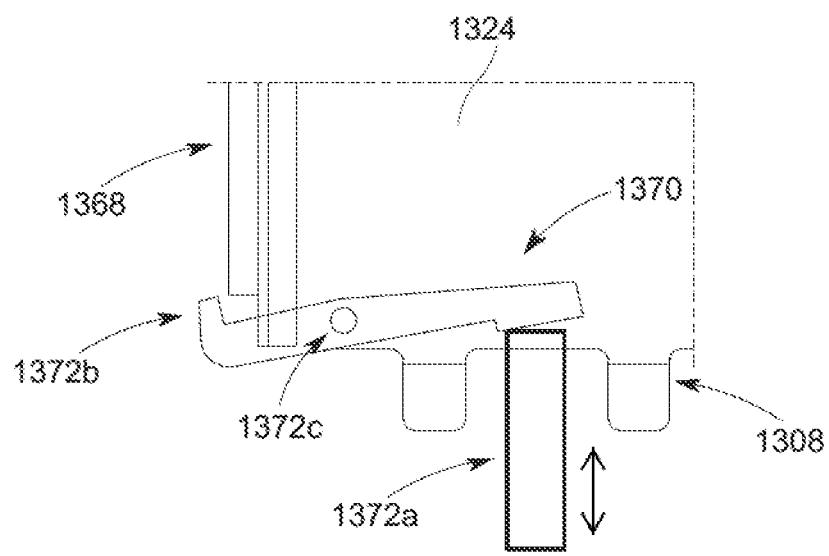
Figure 13C:
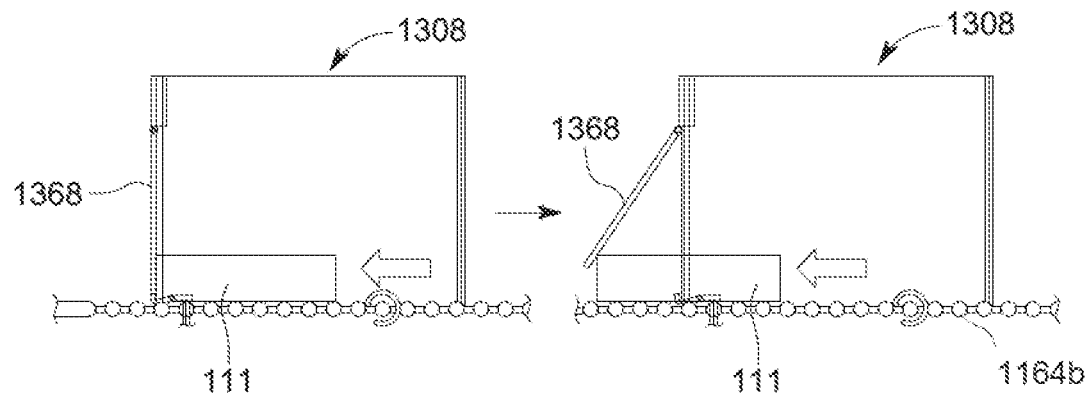

FIG. 13A-13C are schematic diagrams depicting another tote 1308. This tote 1308 is similar to the tote 208*c* of FIG. 2C, except with a conveyor door 1368. This tote 1308 may be used to activate the conveyor 1302 to remove the items 111 from the tote 1308. The tote 1308 has the conveyor door 1368 hingedly connected to the front wall 1325. The conveyor door 1368 may lift open to reveal the items 111 in the tote 1308 as shown in FIG. 13A.

The tote 1308 is slidably movable along the conveyor 1302. This conveyor 1302 may be similar to the conveyor 1102 of FIGS. 11A-11E, except that the conveyor 1302 is provided with a latch 1370 engageable with the wall 1324 and/or bottom 1322 of the tote 1308. The latch 1370 includes a support bar 1372*a*, a catch 1372*b*, and a pivot 1372*c*. The support bar 1372*a* may be a linear member connected to the conveyor 1302. The catch 1372*b* may be an L-shaped member pivotally connected to the conveyor 1302 by the pivot 1372*c* as schematically shown.

As shown in FIG. 13C, the support bar 1372*a* may be axially moved to engage and rotate the catch 1372*b*. Upon rotation of the catch 1372*b*, a leading tip of the catch 1372*b* moves to a position above the conveyor 1302 for engagement with the tote 1308. As the tote 1308 passes along the conveyor 1302, the tote 1308 may be stopped by the catch 1372*b*. Rotation of the rollers 1164*b* of the conveyor 1302 may urge the items 111 in the tote 1308 to continue advancing along the conveyor 1302 while the tote 1308 is prevented from advancing by the catch 1372*b*. As the item 111 continues to advance, the item 111 pushes the conveyor door 1368 open. The item 111 continues along the conveyor 1302 apart from the tote 1308.

Figure 14A:
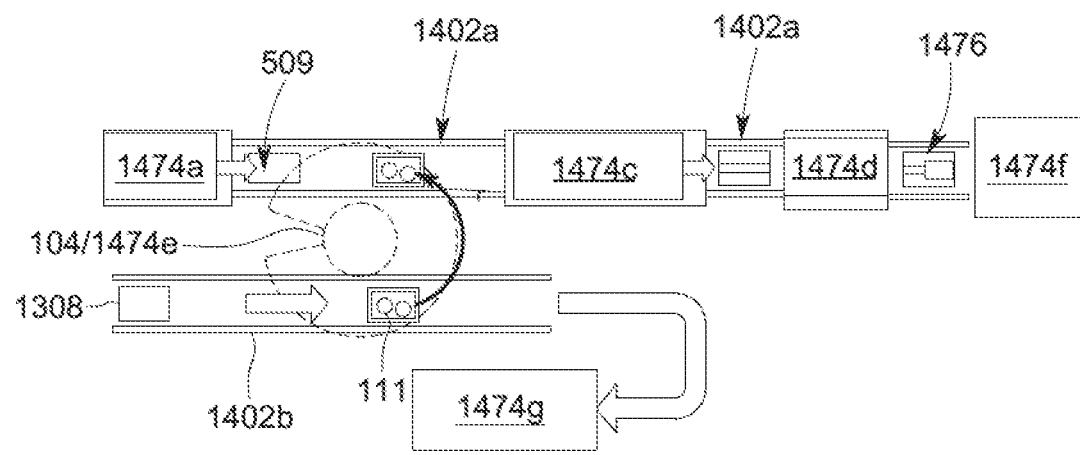
FIG. 14A-14C are schematic diagrams depicting example layouts of tote handling system operations.
Figure 14B:
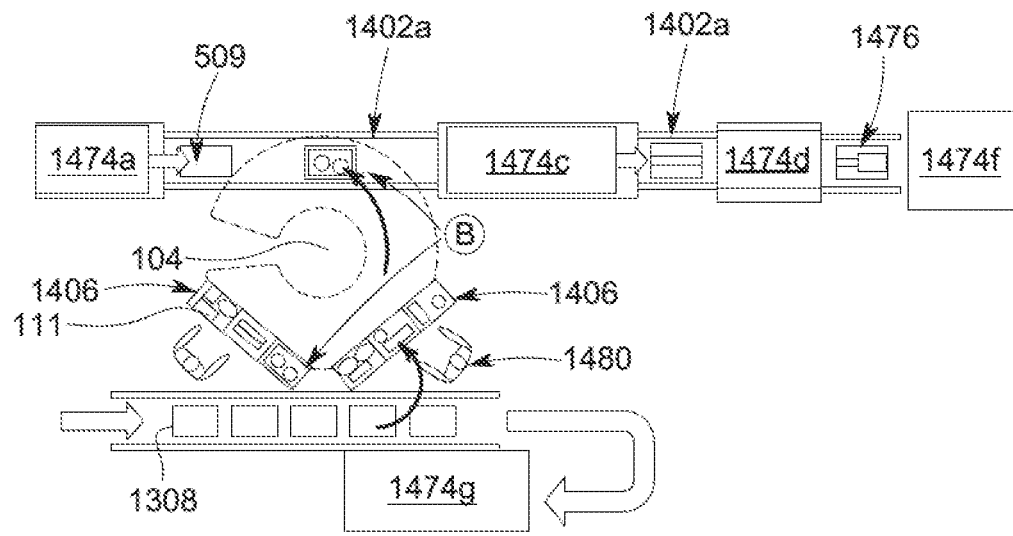
Figure 14C:
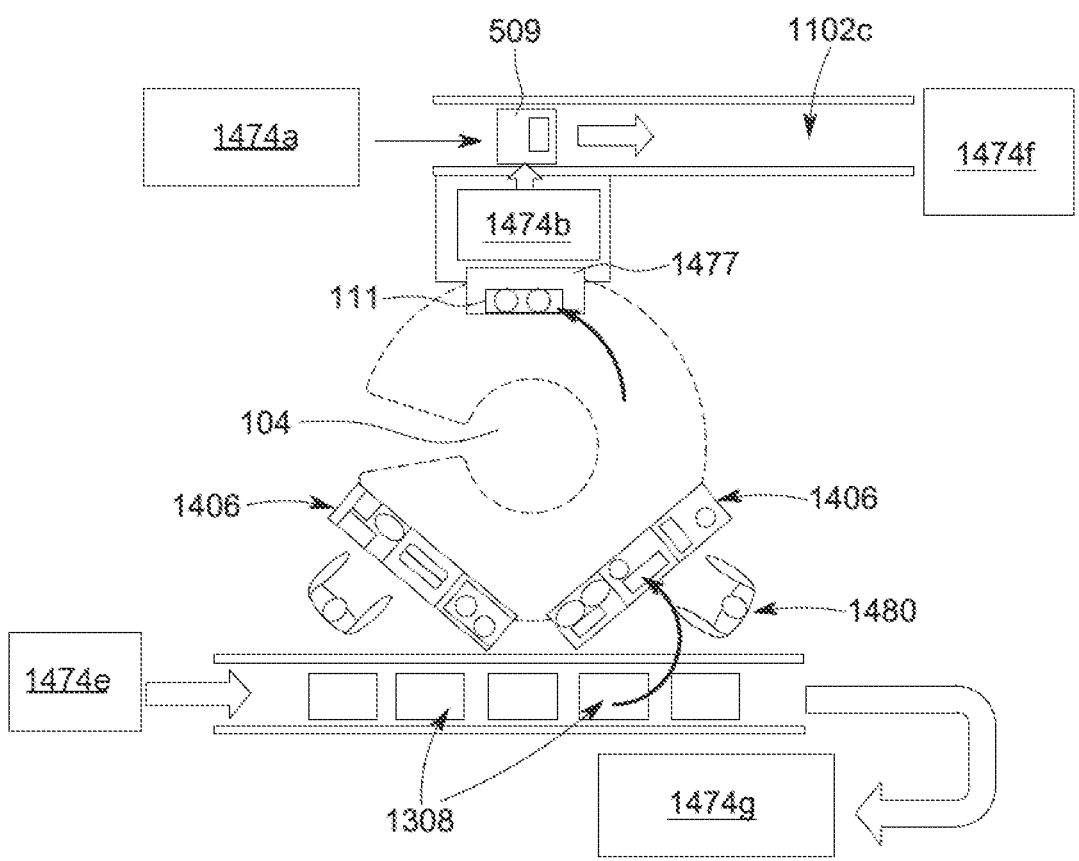

FIG. 14A-14C are schematic diagrams depicting various tote conveyor operations. As shown in these figures, the totes 1308 and items 111 may be selectively moved about the conveyors 1402a, 1402b to cycle to various handling equipment, such as a carton erector 1474a, packager 1474b (e.g., automatic bagging machine or bagger), sealer 1474c, labeler 1474d, loader (e.g., handling robot 114) 1474e, sorter 1474f, picker 1474g, and packer 1474h. While specific configurations are depicted, it will be appreciated that the tote handler 104 may be positioned about one or more forms of the handling equipment 1474a-h and/or conveyors 1402a, 1402b.

FIG. 14A shows the tote conveyor operation for loading items 111. In this example, the tote 1408 (which may be any tote described herein) advances along the conveyor 1402b. The tote 1408 may be loaded with items 111 as described in FIGS. 7A1-7C. The tote handler 104 may transfer the items 111 from the tote 1408 on the conveyor 1402b to the shipping container 509 on the conveyor 1402a in a manner as described in FIG. 8A. The tote 1408 continues along the conveyor 1402b to return to the picker 1474g to pick up more items 111. The shipping container 509 is formed at the carton erector 1474a, and receives the items 111 from the tote 1408 via the tote handler 104. The shipping container 509 with the items 111 therein advances to the sealer 1474c and is sealed closed. The shipping container 509 then continues to the labeler 1474d to receive the label 1476. The carton 1409 is then sorted using the sorter 1474f in preparation for transport to its final destination.

FIG. 14B shows the tote conveyor operation for loading the items 111 using a manual put wall operation. This version is similar to the tote conveyor operation of FIG. 14A, except that the totes 1308 have batches of items 111 that are first manually transferred to a put wall 1406 by operators 1480, and then transferred from the put wall 1406 to the shipping container 509 using the tote handler 104. The items 111 in the put walls 1406 may be transferred by the tote handler 104 in a similar manner as described in FIGS. 7A1-7B and 8A. While a manual operator 1480 is shown moving items from the totes 1308 to the put wall 1406, a second tote handler 104 may be used to move the items 111 and/or the totes 1308 to the put wall 1406 as described in FIGS. 1A-1D.

FIG. 14C shows the tote conveyor operation for loading the items 111 using the manual put wall operation and an automated packaging operation. This version is similar to the tote conveyor operation of FIG. 14B, except that the conveyor 1402a has been replaced with a polybag conveyor 1402c and an automatic bagger 1474b has been provided in place of the carton erector 1474a, sealer 1474c, and labeler 1474d to perform all of the packaging functions performed thereby. In this version, the items 111 from the totes 1308 are placed in the put wall 1406 as in FIG. 14B, and then passed by the tote handler 104 to the packager 1474b for placement in a polybag 1477. Optionally, a loader 1474e is provided to load the totes 1308 onto the conveyor 1402b. The packager 1474b may be a packaging machine similar to the packaging machine 1060 of FIGS. 10A1-10B for receiving the items 111 from the grip hand 116, and then bagging, sealing, and labeling the items 111 for shipment.

FIG. 14D is a flowchart depicting a method 1400 of handling items. The method 1400 involves 1479—providing a tote handler comprising a grip hand with fingers; 1481—providing a tote comprising a tote frame with a chamber for receiving the items therein, the tote frame having tool reliefs therethrough with tool receptacles therebetween; and 1482—removing the items from the tote by passing the fingers of the grip hand through the tool receptacles and lifting the items with the fingers while retracting the grip hand from the tote.

The method 1400 may also involve 1483—selectively inserting the fingers into reliefs in one or more chambers in the tote, 1484—maintaining the items in a pre-determined configuration while moving the items with the grip hand, 1485—stacking the items in pre-determined configurations with the tote handler, 1486—selectively gripping and releasing the items by selectively moving sets of the fingers between and open and closed position, 1487—selectively releasing the items into the tote by selectively extending the fingers a distance into the tote and then moving the fingers apart, 1488—tilting the tote with the grip hand while releasing the items from the grip hand into the tote, 1489—forming a tote wall by stacking the totes, and/or 1490—loading groups of the items into each of the totes on a first side of the tote wall and unloading the groups of the items from each of the totes with the tote handler on a second side of the tote wall.

Part or all of the method may be performed. The method may be performed in any order. Part or all of the method may be repeated as desired.

Tote Handling System—Tote Handler with Adjustable Grip Hand and Capture Table

The present disclosure also relates to another tote handling system in an adjustable handling configuration. This tote handling system may be part of the tote handling system described herein, or separate therefrom, and includes features and capabilities thereof. This tote handling system may include the tote handler, the tote conveyor, and the tote as described herein. This version includes an adjustable grip hand capable of selectively extending selective portions (or all) of the fingers for engaging the items. This version also includes a capture table for receiving the items from the shipping containers, for maintaining the packing configuration of the items, and positioning the items for transfer by the adjustable grip hand (or other components of the tote handling system described herein).

The present disclosure also relates to a tote packing and decanting (pack-decant) system. The pack-decant system may be part of the tote handling system, and may include a pack-decanter (tote handler) with a pack-decant tool (adjustable grip hand) used to pack and decant (or manipulate) the contents of the shipping containers and the totes. The pack-decanter is configured to automatically pack and decant one or more of the items from the shipping containers into the totes and sub-chambers (compartments or sub-compartments) of totes.

The totes may be used to hold inventory of items in goods to person or goods to robot order fulfillment or order picking. This continuation of the packing technology automates the process of transferring items from the original shipping containers into the tote or compartment(s) of the tote. The totes may include a unitary chamber (compartment) or sub-chambers (sub-compartments) within the tote. In addition to the intended capabilities of the handling and decanting described above, the combined packing and decanting may also be provided with one or more of the following capabilities: used to increase storage density and/or allow more item part numbers to be stored in a smaller volume or space, automatically change processing and tooling configurations, provide the flexibility to handle diversity of the shipping containers and the items, adaptability to various shipping and/or handling equipment, a control scheme to simplify handling of thousands of the shipping package (e.g., various shapes, sizes and products), measures and evaluates incoming shipping containers and automatically reprograms downstream processes to decant that shipping container and its items in the most suitable method, item orientation to facilitate processing (e.g., for fit, storage and picking), automatically selected tote sub-chamber for volumetric efficiency, reprogrammed cut pattern suitable for shipping containers, digital control over key processes to allow for adjustments to be made for the purposes of optimizing the decant function, various types of adjustment (e.g., by manual, automatic, machine learning, and/or artificial intelligence (AI)), capable of scanning shipping containers and items to collect data on decant results allowing AI to make adjustments specific to the package stock keeping unit (SKU) or the cube classification, automation drivable by data base or specific to various configurations (e.g., the shipping containers, the items, and/or facilities), simplified control scheme capable of handling tens of thousands of items or SKUs without need of a data base (DB) and/or DB management, adaptable to constantly changing packaging and product packing, decanting with fewer chances of drops and breakage, complete (or extensive) digital and programmable operability, high decanting rate, flexibility to accommodate various compartment arrangements, etc.

FIGS. 15-24 show another version of the tote handling system 1500 for manipulating the items 111, the totes 108, and the shipping containers 509. Part or all of the tote handling system 1500 may be used or combined with other tote handling systems described herein. This version of the tote handling system 1500 may be used to selectively manipulate the items 111 between the totes 108 and the shipping containers 509 (and/or the chambers and/or sub-chambers there) in pre-determined arrangements. The tote handling system 1500 may also be used to selectively manipulate the items in sub-chambers within the totes 108 and/or the shipping containers 509 (and/or sub-chambers therein). Such manipulation may involve selectively manipulating the items in various orientations (e.g., at angles, inverted, etc.), order (e.g., stacked, aligned, etc.), sub-chambers (e.g., split between sub-chambers of the same or different totes and/or shipping containers), etc.

Figure 15:
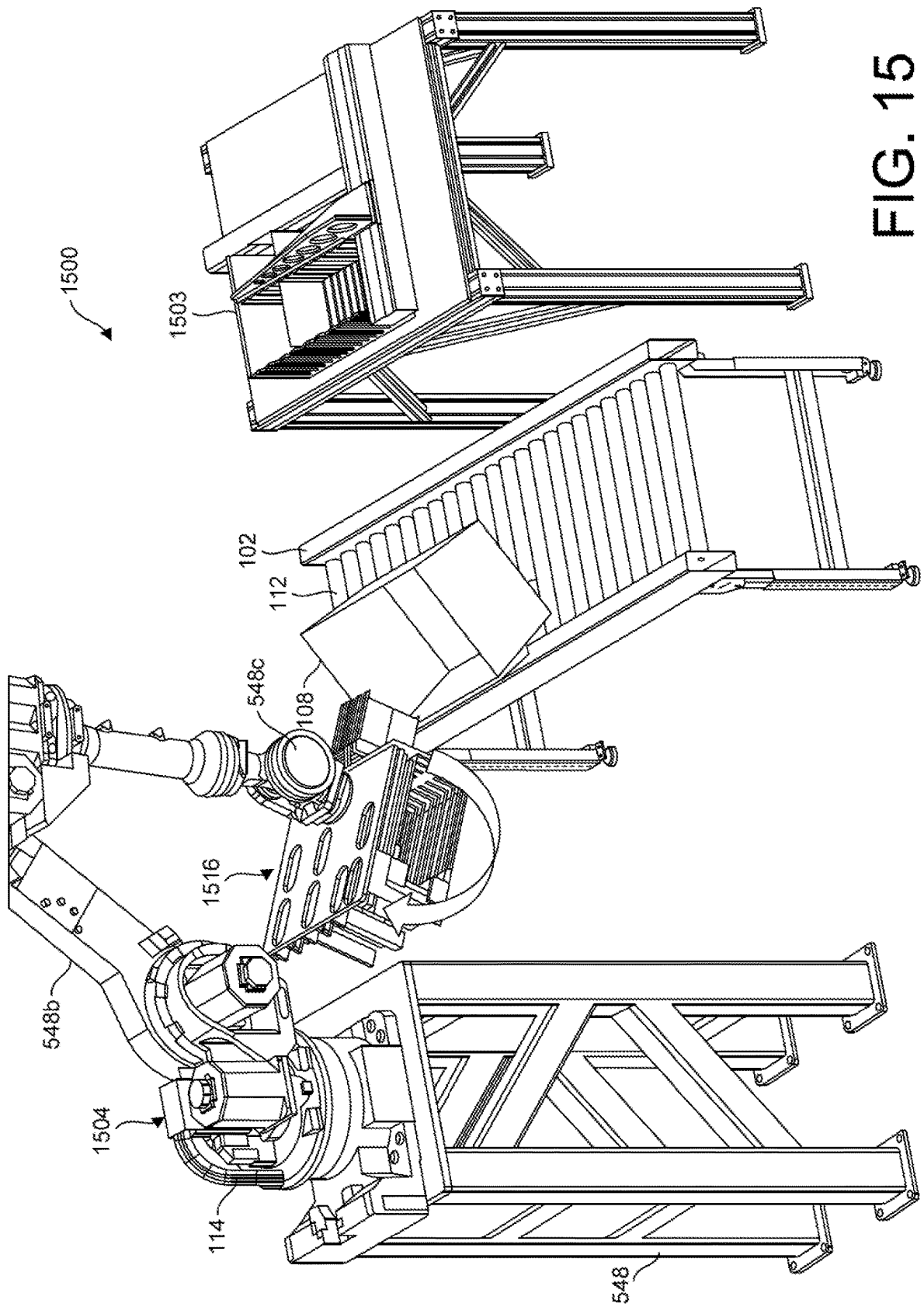
FIG. 15 is a schematic diagram of the tote handling system including the tote conveyor, a tote handler with an adjustable grip hand, a tote, and a capture table.

FIG. 15 is a schematic diagram of the tote handling system 1500 in a pack-decant configuration, the tote handling system 1500 including the tote conveyor 102 with rollers 112 thereon, a tote handler (e.g., a pack-decanter) 1504 with a pack-decant grip hand (pack-decant tool) 1516, the tote 108, and a capture (carriage) table 1503. The tote handling system 1500 may be used for performing various operations, such as loading, unloading, picking, packing, transferring, and/or otherwise manipulating the items 111, the totes 108, and/or the shipping containers 509.

The tote handler 1504 may include the robot 114 including the foot 548a, the arm 548b, and the connection 548c as described herein with respect to FIGS. 5A-5C. This tote handler 1504 may be used with any of the tote hands (tools) described herein. This tote handler 1504 is provided with the grip hand 1516 in a pack-decant configuration for decanting the items 111 into the tote 108 and/or the capture table 1503 as described further herein.

Figure 16A:
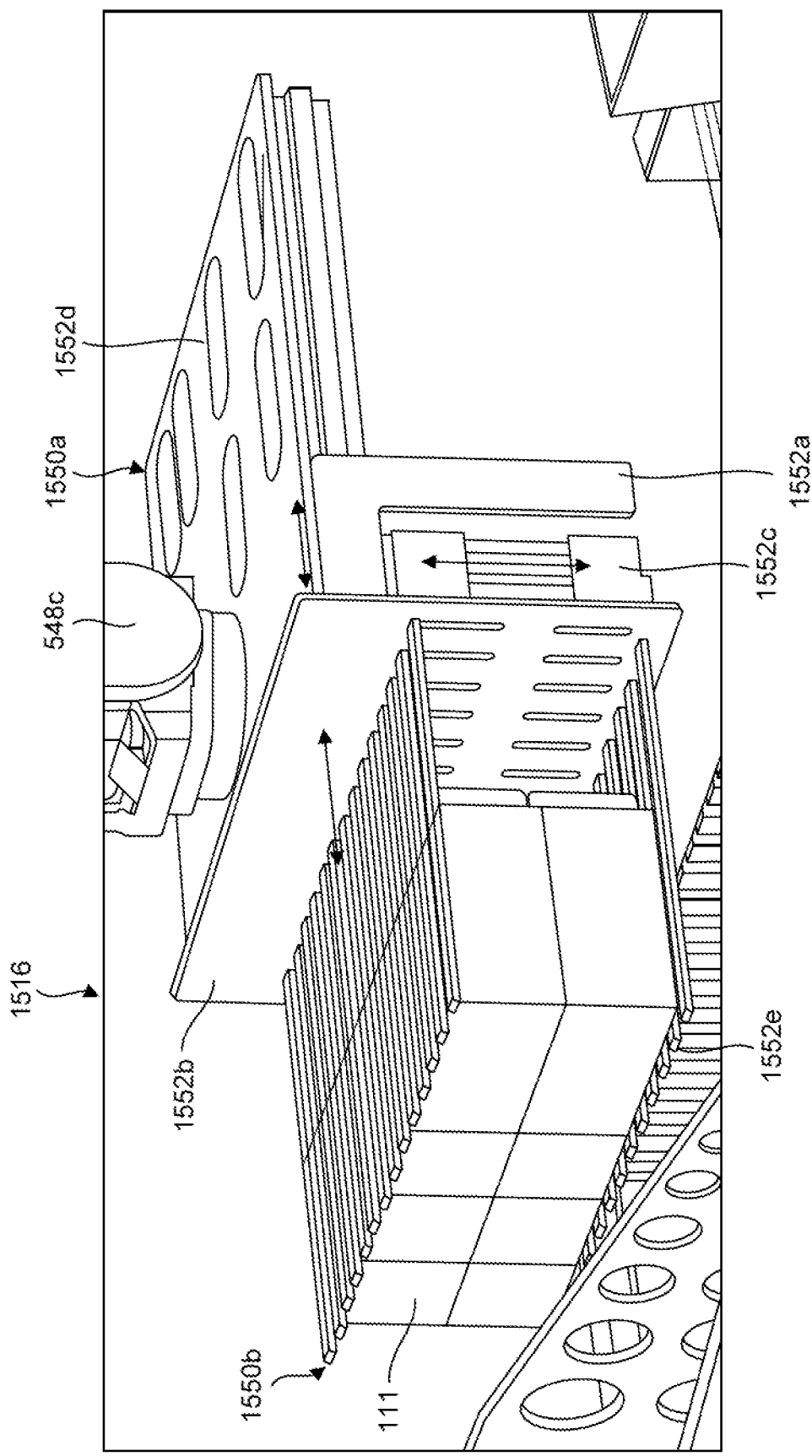
FIGS. 16A and 16B are schematic diagrams depicting the adjustable grip hand in various positions.
Figure 16B:
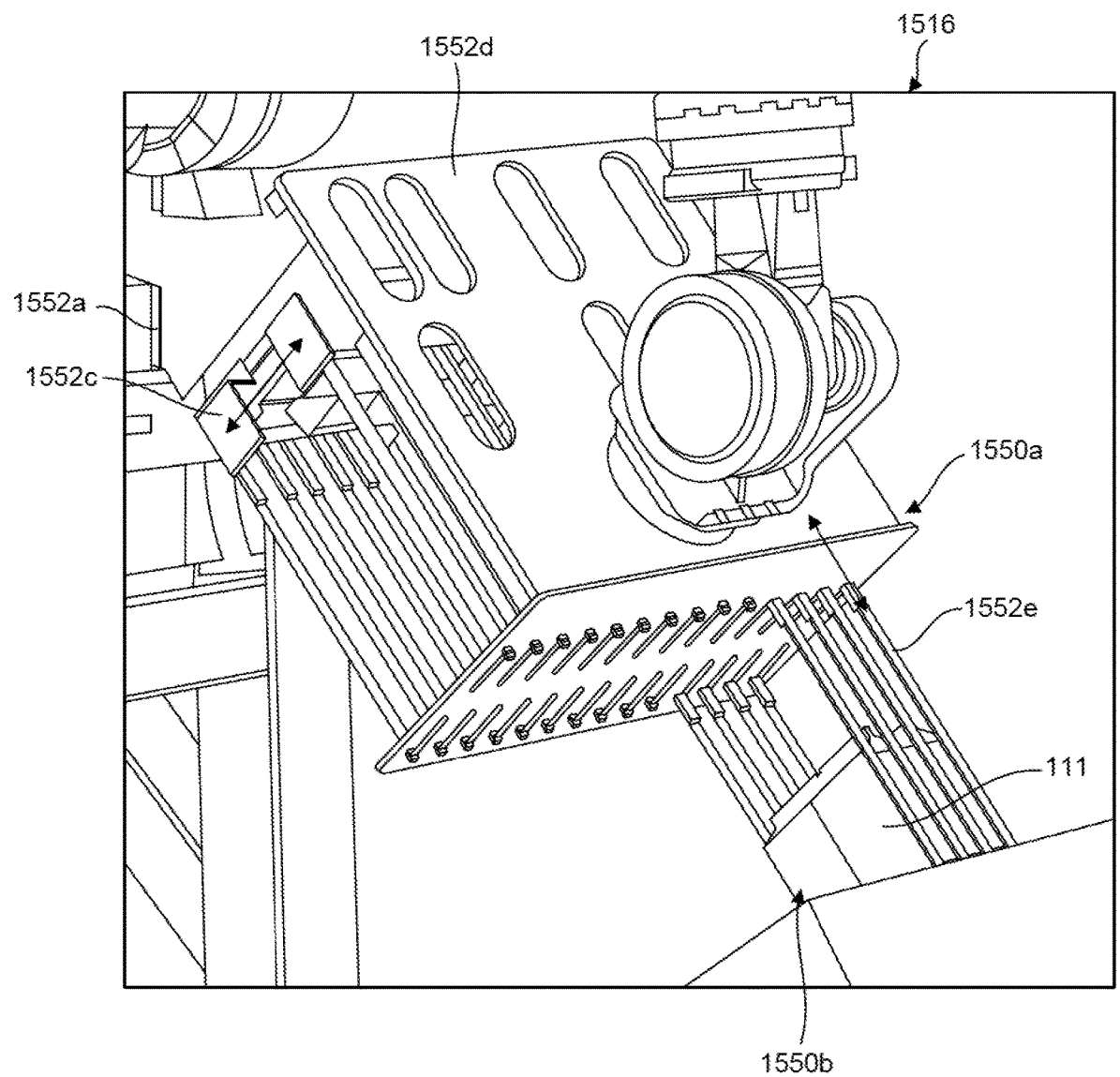

FIGS. 16A and 16B are schematic diagrams depicting the grip hand 1516 in various positions while gripping the items 111. The grip hand 1516 may be similar to the grip hand 116 (e.g., FIGS. 5A-5D) described herein for manipulating the items 111. This grip hand 1516 may be used with any of the tote handlers described herein.

In this version, the grip hand 1516 includes a palm 1550a and finger assembly 1550b. The palm 1550a includes base 1552a, a backing plate 1552b, and a bearing plate 1552d. The backing plate 1552b is secured to an end of the bearing plate 1552d. The bearing plate 1552d is secured to the connection 548c. The base 1552a is slidably connected to the bearing plate 1552d. The base 1552a may include one or more portions that are selectively movable along the bearing plate 1552d between a retracted and an extended position.

The finger assembly 1550b includes actuators 1552c with fingers 1552e extending therefrom. The actuators 1552c are slidably movable along the base 1552a with the fingers 1552e thereon for gripping the items 111. Each of the actuators 1552c includes a row of parallel fingers 1552e that are movable with the actuators 1552c between an open position and a closed position to selectively grip and release the items 111. The fingers 1552e extend through the backing plate 1552b for engagement with the items 111.

The finger assembly 1550b may be selectively moved between the extended and retracted position as the base 1552a slidingly moves along the bearing plate 1552. One or more portions of the finger assemblies 1550b may be secured to one or more portions of the base 1552a for movement therewith. Each of the portions of the base 1552a may be selectively activated to extend and/or retract, thereby extending and retracting the corresponding actuators 1552c and fingers 1552e thereon. In this manner, the fingers 1552e may extend through the backing plate 1552b to engage the items 111 as shown in FIG. 16A.

In this version of the adjustable grip hand 1516, the fingers 1552e may be selectively extended by the actuators 1552c about the bearing plate 1552d to provide adjustability to the grip hand 1516. As shown in FIG. 16B only a portion of the fingers 1552e may be extended through the backing plate 1552b to engage the items 111. The fingers 1552e may also be shaped to correspond to voids in the capture table 1503 to pass therethrough during pack-decant operations (e.g., where the capture table 1503 is loaded by the grip hand 1516) as is described further herein.

Figure 17A:
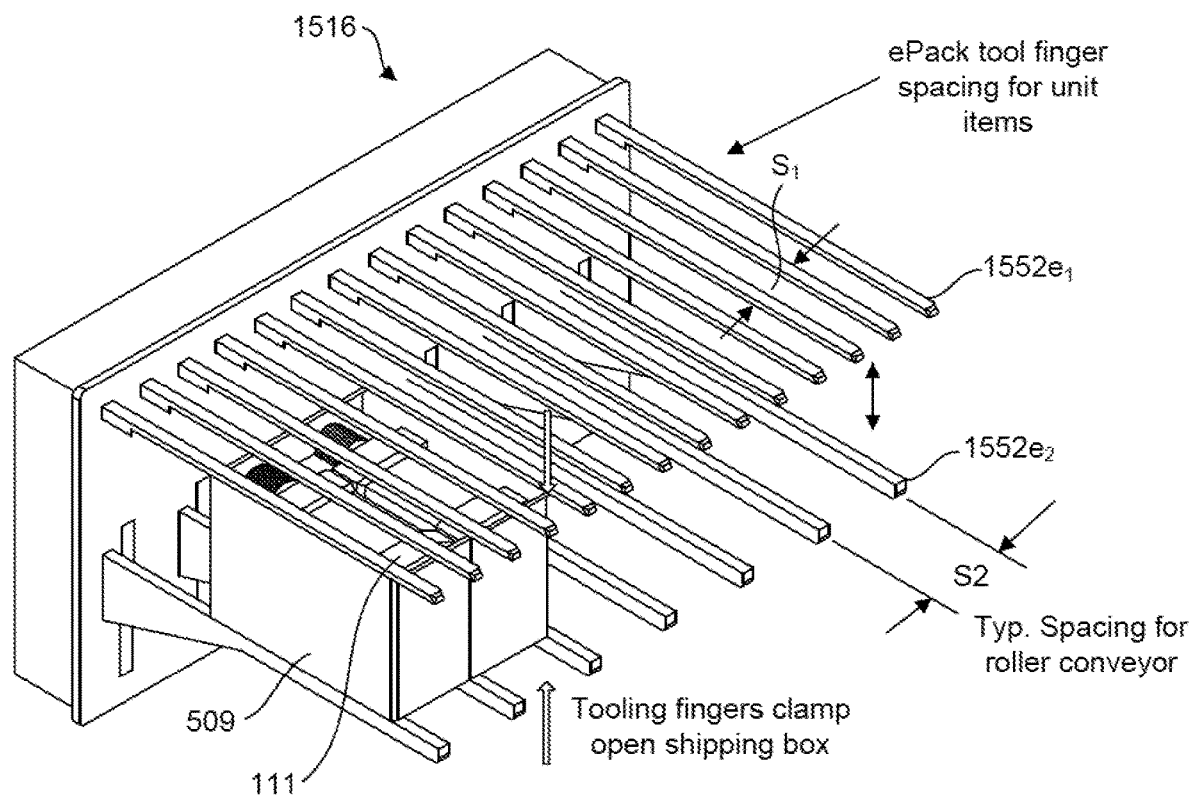
FIGS. 17A and 17B are schematic diagrams depicting a portion of the adjustable grip hand in a uninverted and an inverted position, respectively.
Figure 17B:
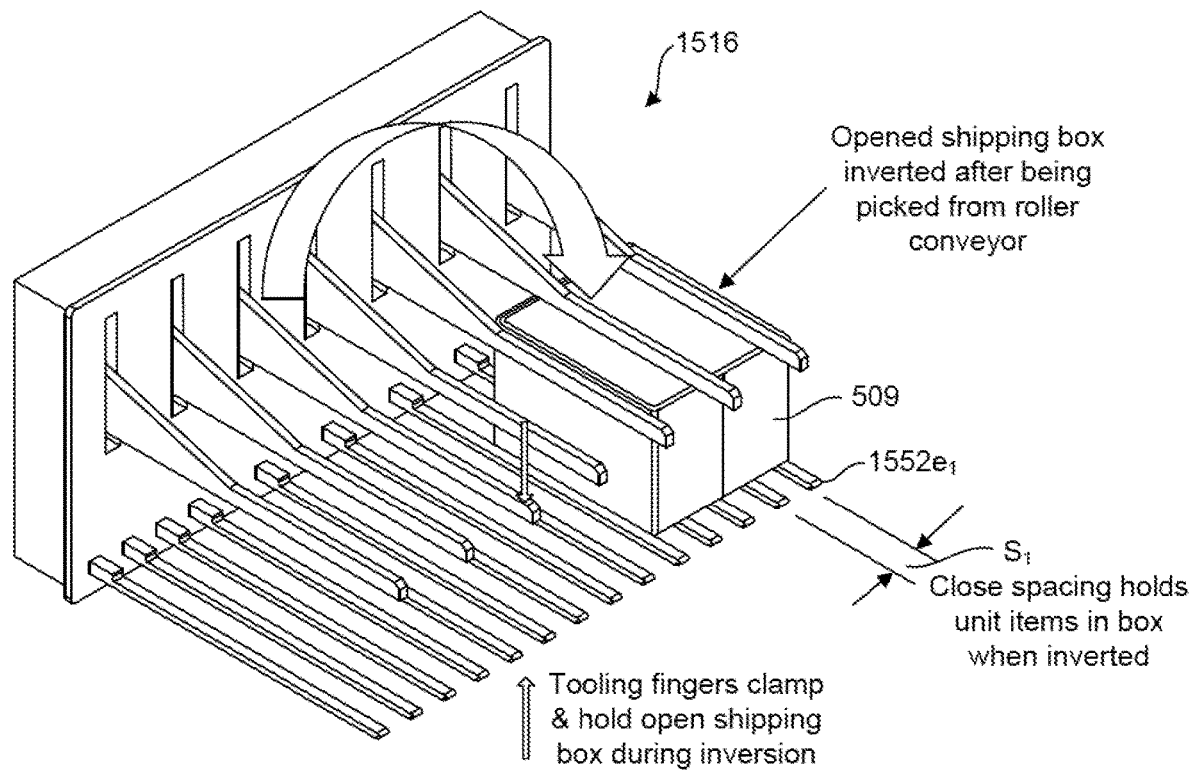

FIGS. 17A and 17B are schematic diagrams depicting a portion of the grip hand 1516 in a uninverted and an inverted position, respectively. These figures show an example decant operation for removing the items 111 from the shipping container 509. In this example, the grip hand 1516 has two sets of opposing fingers 1552e1,e2 extending therefrom for engaging the shipping container 509.

The fingers 1552e1, e2 extend linearly from the backing plate 1552b in a parallel configuration with spacing S1, S2 defined therebetween. The spacing S1, S2 may be defined to prevent the shipping container 509 and/or the items 111 therein from passing between the fingers 1552e1, e2. The stationary set of the fingers 1552e1 has a spacing S1 therebetween, and the movable set of the fingers 1552e2 has a spacing S2 therebetween (S2>S1). The spacing S2 of the movable set of the fingers 1552e2 may match the pitch of the rollers 105 of the tote conveyor 102 from which the shipping containers 509 is picked (FIG. 15). The stationary set of the fingers 1552e1 may have a finer pitch (smaller width) with spacing S1 for holding the items 111 and keep the items 111 from spilling out of the shipping container 509 during inversion.

The fingers 1552e1,e2 may be configured for engagement of the shipping container 509, the items 111, the tote conveyor 102, and/or the capture table 1503. Each of the set of the fingers 1552e1, e2 may define a flat surface for engaging the shipping container 509 and/or the items 111. The movable set of the fingers 1552e2 may be selectively engaged to clamp the shipping container 509 for inversion and capture onto the capture table 1503 (FIG. 1) as is described further herein. The grip hand 1516 may grip the opened shipping containers 509 on the top and bottom with the fingers 1552e1,e2, respectively. This example also shows one set of the fingers 1552e1 in a stationary position, and another set of the fingers 1552e2 movable relative to the stationary set of the fingers 1552e1. The opposing sets of the fingers 1552e1, e2 may squeeze together in parallel or squeeze from one side only.

As shown in FIG. 17A, the grip hand 1516 picks the opened shipping container 509 from the tote conveyor 102 by the tote handler 1504 (FIG. 15). The shipping container 509 is inverted (e.g., rotated 180 degrees) by the tote handler 1504. The opened side of the shipping container 509 now faces down as shown in FIG. 17B. The items 111 are held in the shipping container 509 by the fingers 1552e1 with the spacing (fine pitch tooling) S1 that fits into the capture table 1503.

Figure 18A:
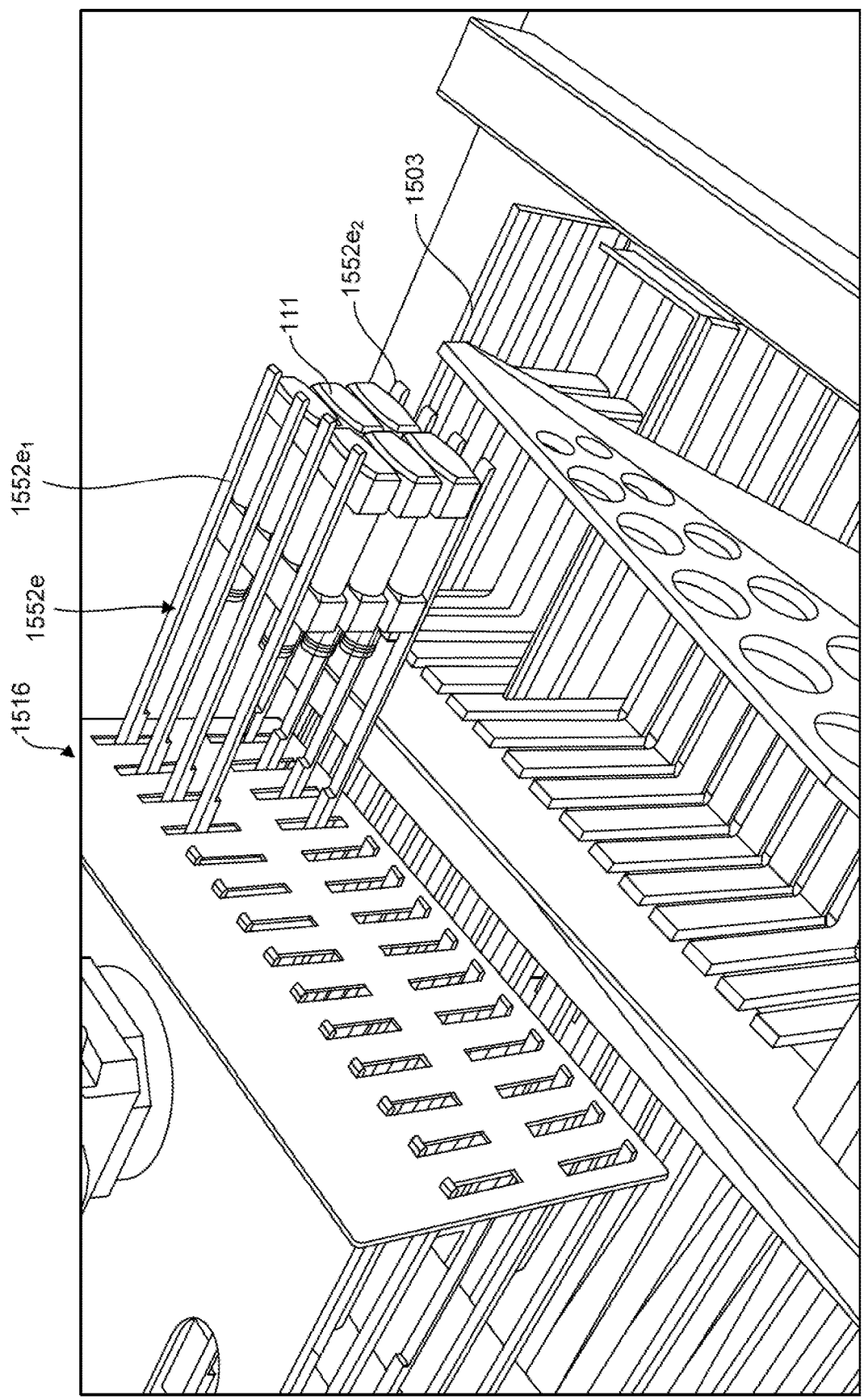
FIGS. 18A and 18B show the tote handler moving items between the tote and the capture table.
Figure 18B:
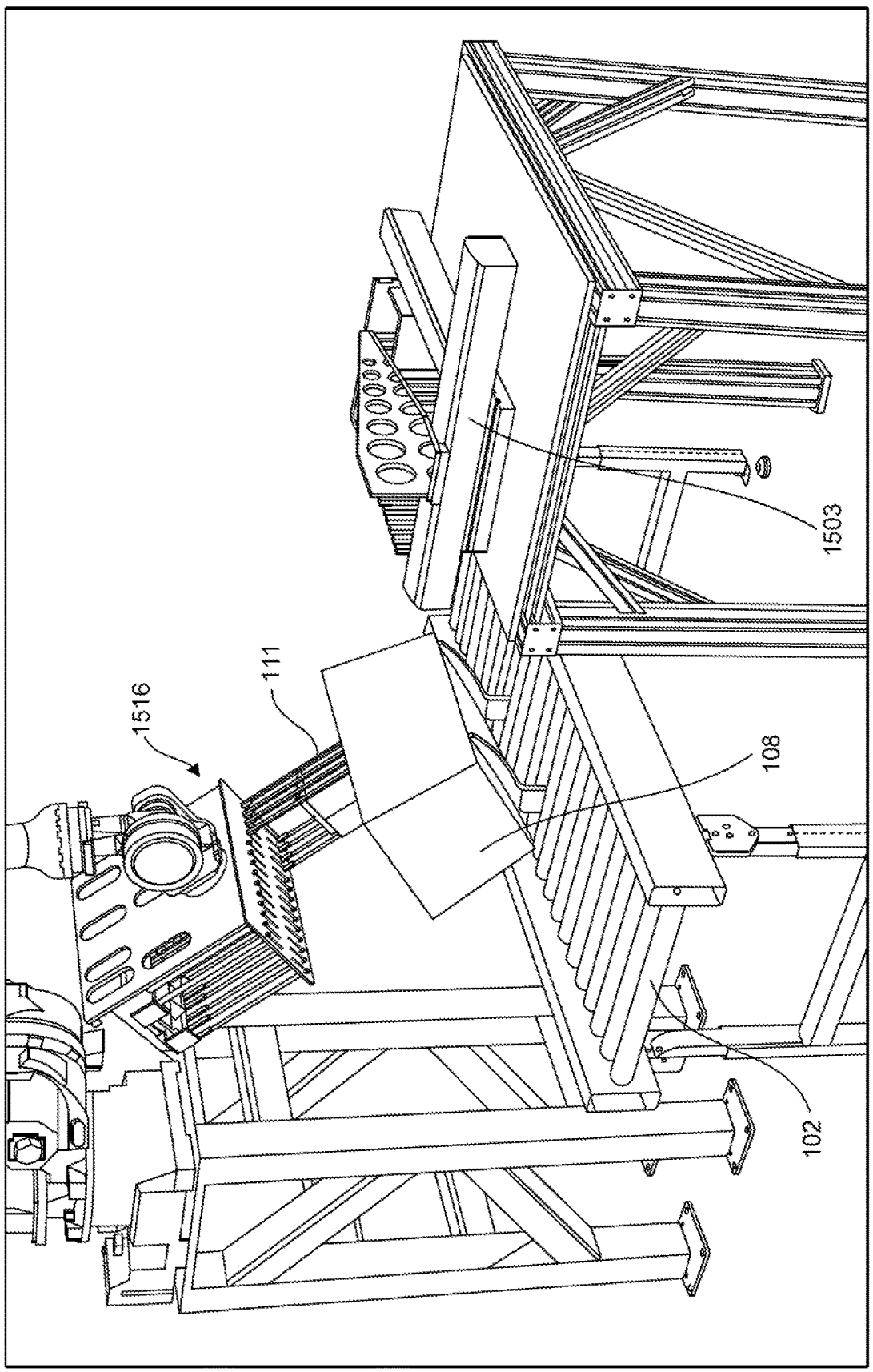

FIGS. 18A and 18B show the tote handler moving items between the tote 108 and the capture table 1503. FIG. 18A shows the tote handler removing the items 111 from the capture table 1503. The items 111 may have been loaded into the capture table 1503 in a certain arrangement. FIG. 18B shows the grip hand 1516 loading the items 111 from the capture table 1503 and into the tote 108. The grip hand 1516 may load the items 111 into the tote 108 in the same arrangement as the items 111 were loaded into the capture table 1503, thereby maintaining positioning of the items 111 during the manipulation thereof.

As shown in FIG. 18A, the grip hand 1516 may extend certain of the fingers 1552e to grip selected items 111 in the capture table 1503. As described in FIG. 16B, groups of the fingers 1552e matching with a given sub-chamber size may be extended to engage the items 111. The grip hand 1516 can now insert the open fingers 1552e into the capture table 1503 to grip the items 111 from the shipping containers 509. As the items 111 are gripped, they are maintained in the same position as the items 111 were packed in the shipping container 509.

To secure the items 111, the grip hand 1516 with the items 111 therein may be rotated 180 degrees and unloaded from the capture table 1503 so the items 111 can be supported along the top and bottom during movement. This movement from the capture table 1503 to the tote 108 may be accomplished keeping the items 111 stack horizontally. In this position, the stationary fingers 1552e1 may support the items 111 from the bottom and the movable fingers 1522e2 may compress and clamp the items 111 from the top to support and grip the items 111.

As shown in FIG. 18B, the grip hand 1516 is loading the items 111 from the capture table 1503 and into the tote 111. The tote 108 is positioned on the tote conveyor 102 and the grip hand 1516 is extended into the tote 108 for inverted loading of the items 111 into the tote 108. The fingers 1552e grip the items 111 in a manner similar to the gripping of items as described in FIG. 17A. The items 111 may be lifted clear of the capture table 1503 by the grip hand 1516, and moved to the tote 108 for transfer into a sub-chamber of the tote 108 as is described further herein.

Figure 19:
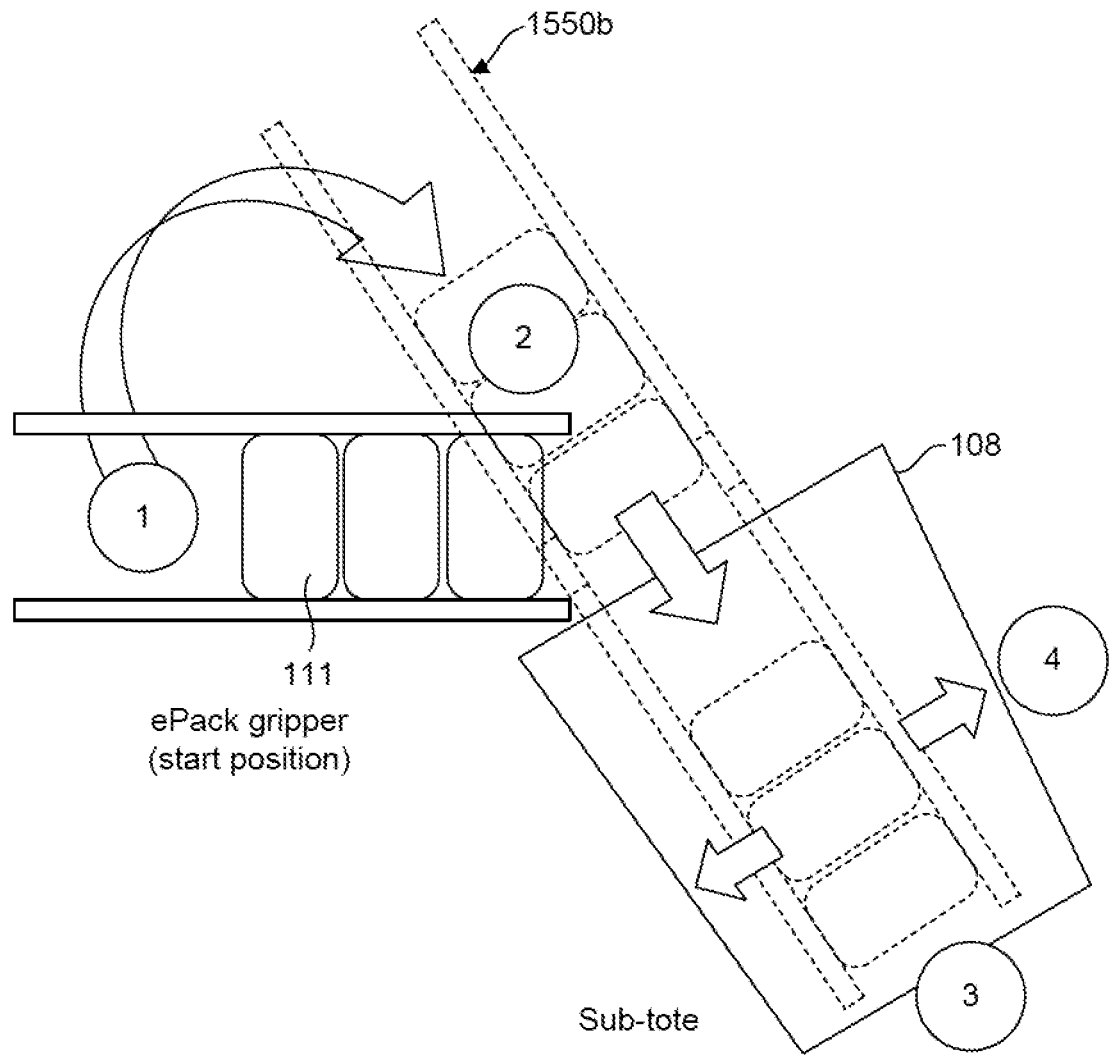
FIG. 19 is a schematic diagram of the finger assembly of the adjustable grip hand as it moves from a horizontal to an angled position to tilt the tote.

FIG. 19 is a schematic diagram of the finger assembly 1550b as it moves from a horizontal to an angled position to tilt the tote 108 while decanting the items 111 into the tote 108. As shown by this figure, the tote 108 may be tilted or lifted on angle by the finger assembly 1550b (and/or the grip hand 1516) to facilitate loading. The finger assembly 1550b clamps the items 111 between the sets of fingers 1552e during the decant operation. Initially, the fingers 1552e are in a horizontal position 1.

Next, at position 2, the tote 108 is tilted at an angle towards the grip hand 1516, and the finger assembly 1550b is rotated by the grip hand 1516 at an angle aligned with the tilt of the tote 108 (e.g., about 45 degrees). The finger assembly 1550b may engage the tote 108 and then rotate the tote 108 about its corner, thereby tilting the tote 108 for easier access to the chamber(s) 1530 therein. The tote 108 may be tilted towards the grip hand 1516 to receive the items 111 therefrom. Rotating the grip hand 1516 at position 2 where the fingers 1552e keeps the items 111 over the chamber (or sub-chamber) within the tote 108 as gravity pulls the items 111 from the fingers 1552e.

The items 111 are held in the fingers 1552e at position 2 until aligned with the chamber(s) in the tote 108 and moved into the bottom or floor of the tote 108 at position 3. The fingers 1552e may extend into the tote to position 3, and then expand to position 4 to release the items 111 into the tote 108. At the point 4, the fingers 1552e open and release the items 111 into the tote 108 (or specific sub-chambers within the tote 108). The open position of the fingers 1552e clears the walls of the tote 108 and allows the fingers 1552e to be withdrawn leaving the items 111 in the tote 108.

This angled loading may be used to prevent gravity from pulling loosely held items 111 from the open end of the grip hand 1516. This seeks to assure that any of the items 111 that drop from the grip hand 1516 fall into the chamber of the tote 108. This method may be used to prevent drops or item falls which potentially risk product damage.

Figure 20:
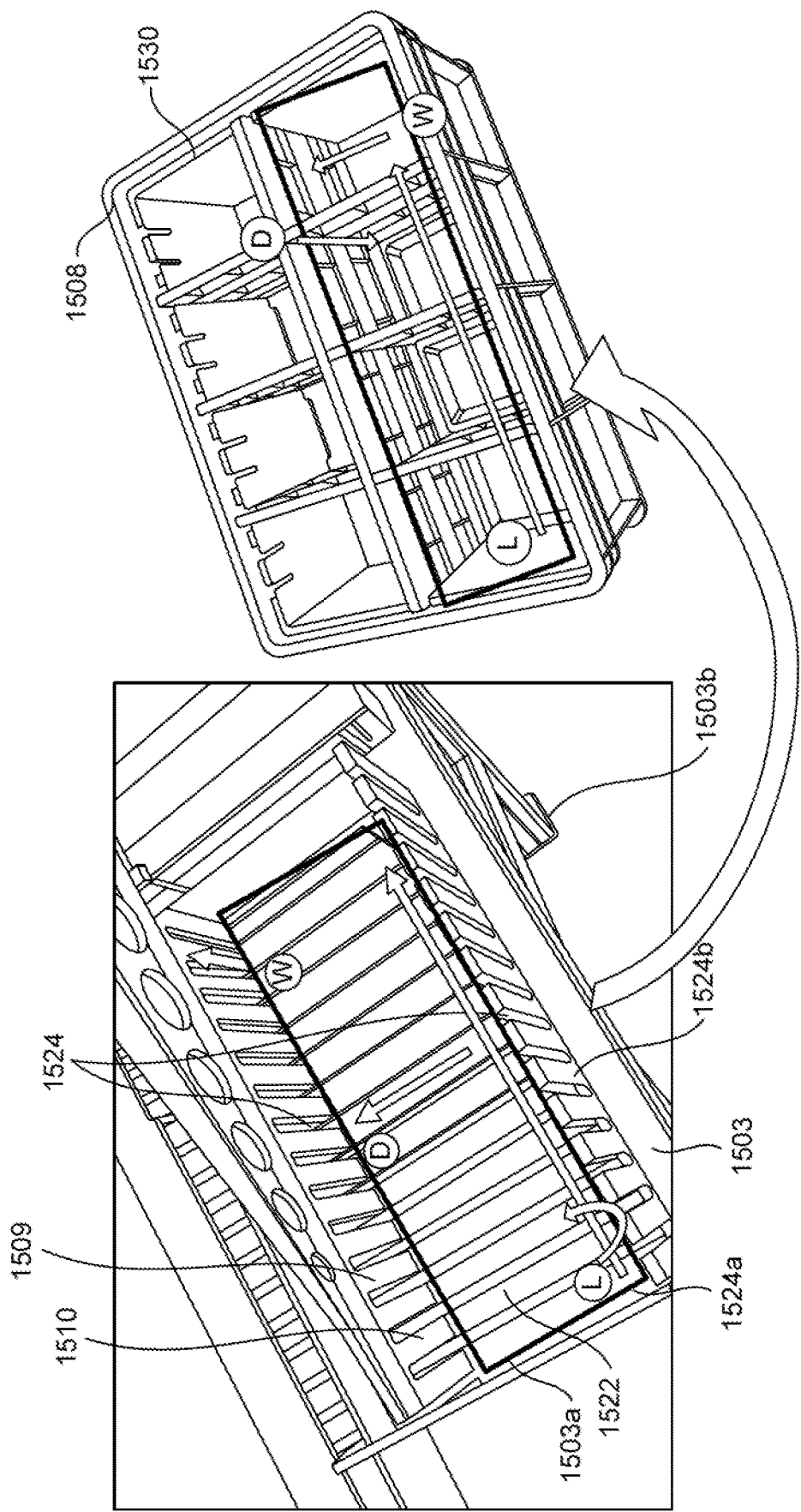
FIG. 20 is a schematic diagram of the capture table and an example tote with sub-chambers used therewith.

FIG. 20 is a schematic diagram of the capture table 1503 and an example tote 1508 with sub-chambers 1530 therein. The capture table 1503 is usable with, or as part of, any of the tote handling systems described herein. As shown in FIGS. 15 and 20, the capture table 1503 includes a capture assembly 1503a and a capture platform 1503b. The capture platform 1503b may be any platform or other structure capable of supporting the capture assembly 1503a, such as a conventional table, a frame with a surface, etc.

The capture assembly 1503a includes a bottom 1522 with vertical walls 1524 extending therefrom. The bottom 1522 is positionable on the capture table 1503 and may optionally be incorporated therein. This capture table 1503 has table reliefs 1510 and table receptacles 1509 similar to those of the totes 108 described herein.

The vertical walls 1524 may include stationary walls 1524a and one or more movable walls 1524b. The movable walls 1524b may be slidably movable about the bottom 1522 to adjust to dimensions of the shipping container 509 used therewith. The movable vertical wall(s) 1524b may configure to, for example, the size of the items 111 in the shipping container 509 and/or the sub-chambers 1530 in the tote 1508 used therewith as is described further herein.

FIG. 20 also shows dimensions of the capture table 1503 and the corresponding tote 108. The capture table 1503 may have a dimension (e.g., length L, depth D, and width W) adjustable by movement of the movable walls 1524b to correspond with the dimensions of the shipping container 509 or the tote 108 to receive the items 111 and maintain arrangement thereof. The length L and the width W of the capture table 1503 and the chamber 1530 of the tote 108 may be selected to receive the items 111 from the shipping containers 509.

The length L and/or the width W of the capture table 1503 may be adjusted to match the shipping containers 509 and/or the items 111 therein to prevent scattering of the items 111. The tote 108 with a chamber 1530 having dimensions (e.g., length L and width W) may be selected to correspond to the dimensions of the items 111 in the shipping containers 509.

The depth (or D) of the capture table 1503 may be adjusted and the depth D of the tote 108 selected to match the size (e.g., height/depth) of the shipping containers 509. The sub-chambers 1530 may share common dimensions with the master tote (e.g., depth D).

The capture table 1503 may be used to maintain the original stacking of the items 111 in the same arrangement (e.g., placement in the chamber, cube or sub-compartment) as they were contained in the shipping containers 509. Maintaining this arrangement keeps the unit date and the control scheme of the item 111 manageable. The process of matching dimensions of the shipping container 509 and/or the items 111 with the dimensions of the capture table 1503 and the tote 108 (and/or sub-chambers 1530) is simplified. The tote 108 and the shipping container 509 dimensions may be known from previous processing in automated shipping containers opening and/or sensor measurements performed prior to handling by the tote handling system 1500 (FIG. 1), or may be determined in process.

The items 111 may be measured during processing to maintain in their original arrangement during handling. Upon receipt of the shipping container 509, the shipping container 509 and the items 111 may be measured. The dimensional data for the shipping container 509 may be matched with a comparably sized tote 108 and the chamber 1530. The capture table 1503 may be used to keeps the items 111 in the same form and arrangement as the items 111 were positioned in the shipping container 509. The items 111 can then be transferred from the capture table 1503 to the sub-chamber 1530 of the tote 108 in a single pick and place move.

This capture table 1503 may be used for automating pack out operations for ecommerce order fulfillment. The capture table 1503 may act as an intermediate tote for receiving and storing the items 111, while maintaining their original placement configuration. For automated pack-decant, the operation may be virtually the same (with the exception of using a configurable "capture table" in place of the tote 108 with tooling reliefs) as described in the tote handling systems of FIGS. 1-14B.

Figure 21:
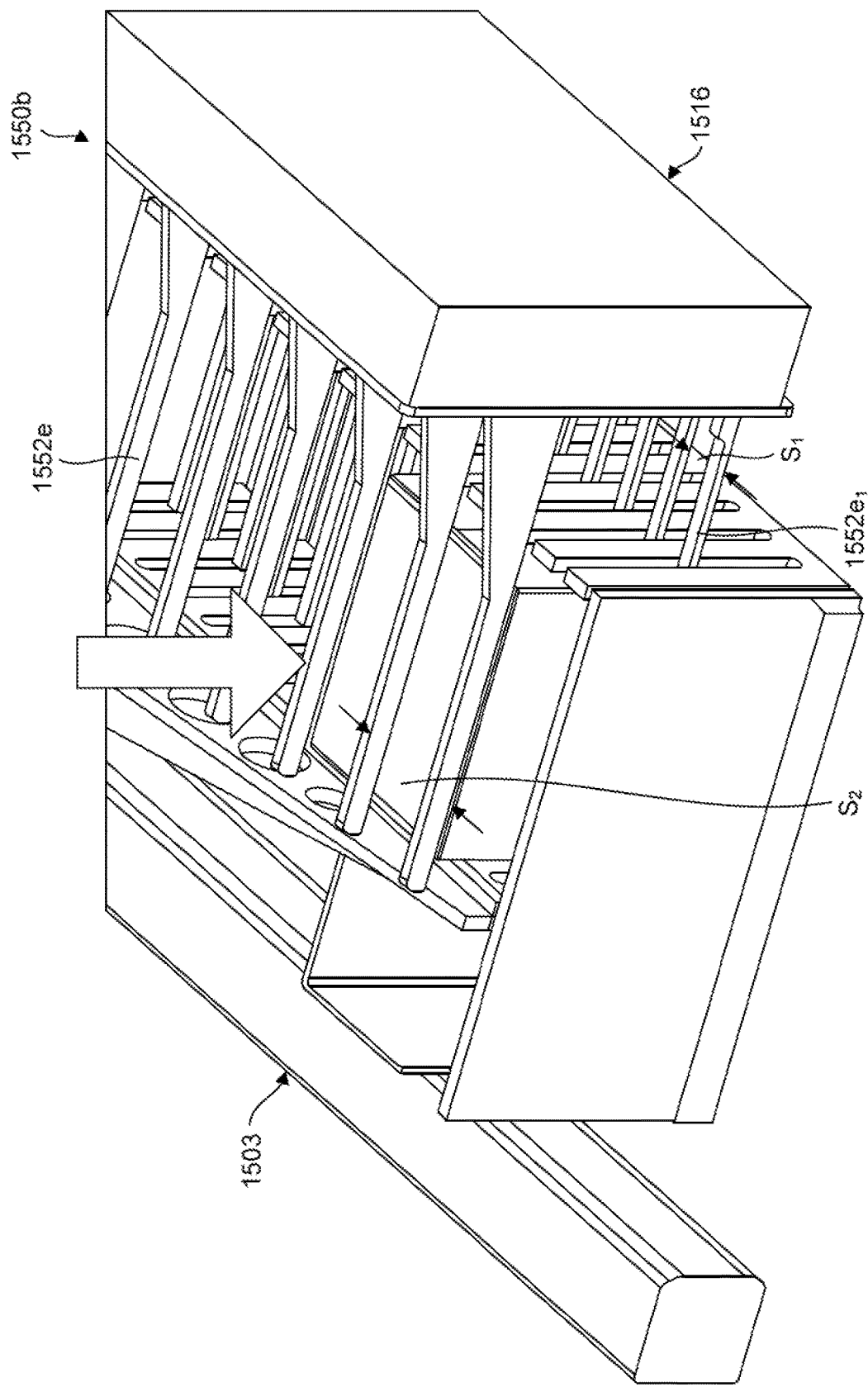
FIG. 21 is a schematic diagram of the finger assembly of the grip handloading the capture table.

FIG. 21 is a schematic diagram of the finger assembly 1550b of the adjustable grip hand 1516 positioned in the capture table 1503. The grip hand 1516 may be used to load and/or unload the items 111 on the capture table 1503. The items 111 may be loaded onto the capture table 1503 by individual placement or by loading the shipping container 509 onto the capture table 1503.

Before the opened shipping container 509 may be placed into the capture table 1503 for loading, the walls 1524a,b of the capture table 1503 may be adjusted to a shape similar in size to the outside of the shipping containers 509 to be placed. The size of the shipping containers 509 may be known from measurements taken upstream in other processes like automated shipping containers opening.

As also shown in FIG. 21, the table reliefs 1510 and table receptacles 1509 of the capture table 1503 may be sized and shaped to correspond to the fingers 1552e1 of the grip hand 1516. The fingers 1552e1 are positioned in a parallel arrangement with the spacing S1 therebetween corresponding to the shape and spacing of the table reliefs 1510 and the table receptacles 1509. The fingers 1552e1 are configured to selectively pass through the table receptacles 1509.

The shipping container 509 with the items 111 therein may be placed onto the capture table 1503 by the grip hand 1516, and the shipping container 509 around the items 111 removed (e.g., by box cutting). The shipping container 509 with the items 111 therein may be lowered into the bottom 1522 of the capture table 1503. The grip hand 1516 may be lowered into the capture table 1503 by extending the fingers 1552e through the vertical walls 1524 and the bottom 1522 of the capture table 1503. The fingers 1552e may then be withdrawn through the table receptacles 1509 leaving the items in contact with the bottom 1522 of the capture table 1503.

The shipping containers 509 may then be removed by, for example, an automatic case extraction (ACE) tool as described further herein (e.g., FIGS. 34A-35D). The shipping container 509 may be lifted leaving the items 111 within the confines of the capture table 1503. The items 111 may be may be maintained in their original space efficient stacking of as originally packed in the shipping container 509. This process allows the grip hand 1516 to make use of the space efficient unit stacking of the items 111 in the shipping containers 509 (FIG. 20). The items 111 may be moved as a complete group to save time and increase throughput.

Once loaded, the items 111 may then be unloaded into the totes 108 by transfer from the capture table 1503 by the adjustable grip hand 1516. As shown in FIG. 21, the fingers 1552e may be extended into the capture table 1503 through the table receptacles 1509 to engage and lift the items 111. The fingers 1552e may pass through the table receptacles 1509 as the items 111 are removed for transfer to the tote 108 (see, e.g., FIG. 18B).

Figure 22:
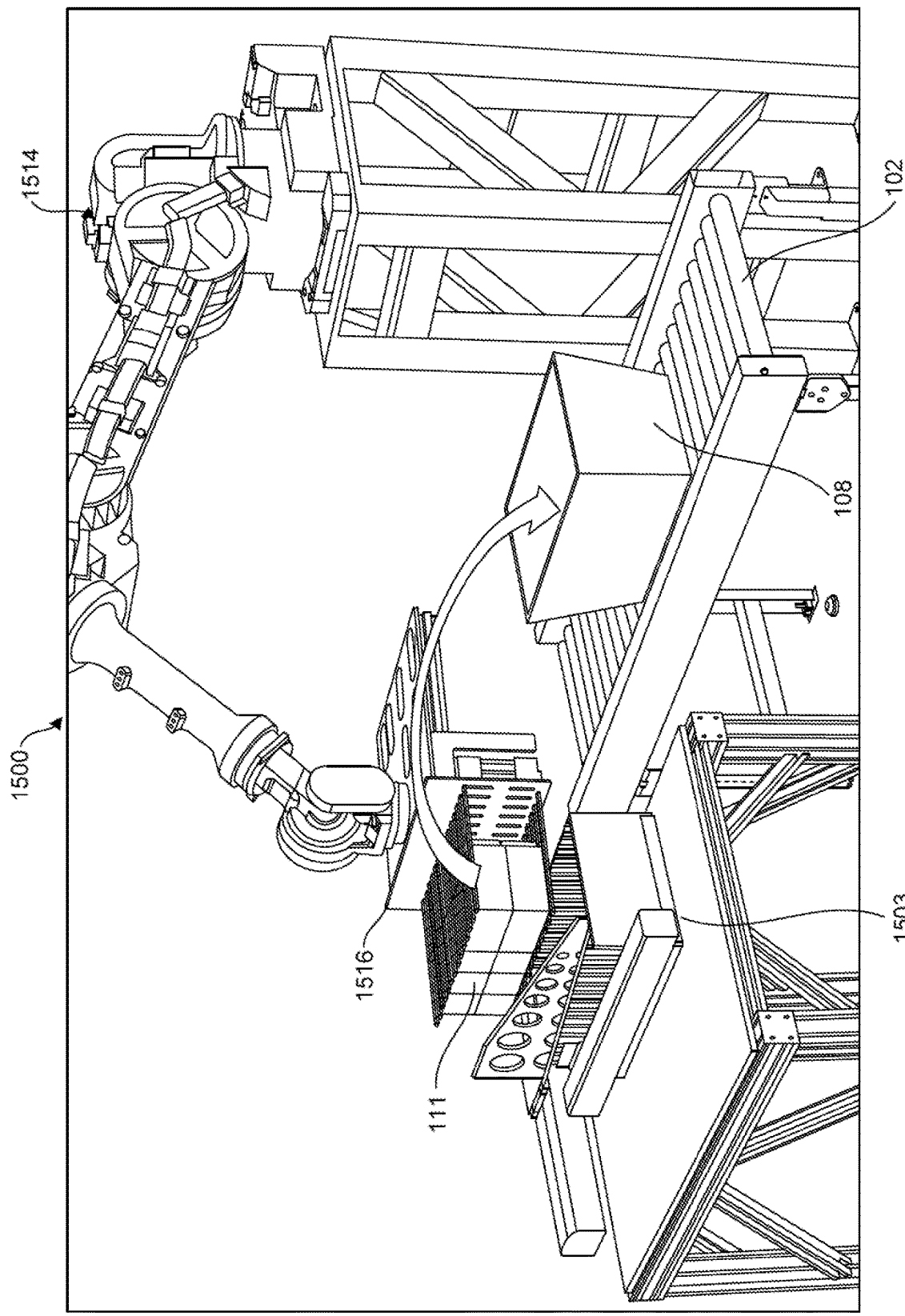
FIG. 22 is a schematic diagram of the tote handler transferring items from the capture table to the tote.
Figure 23A:
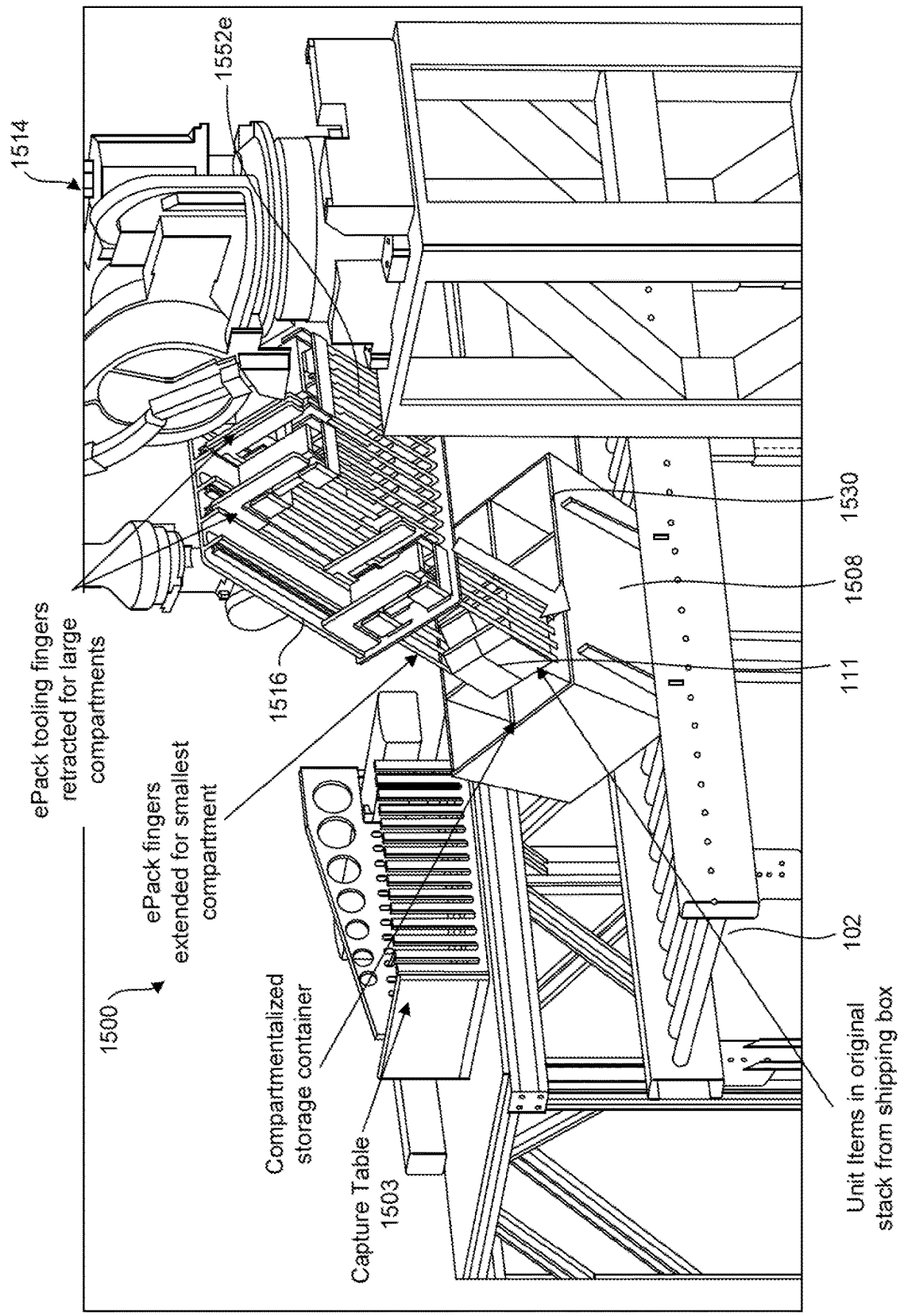
FIGS. 23A and 23B are schematic diagrams the tote handler transferring items from the capture table to sub-chambers of the tote.
Figure 23B:
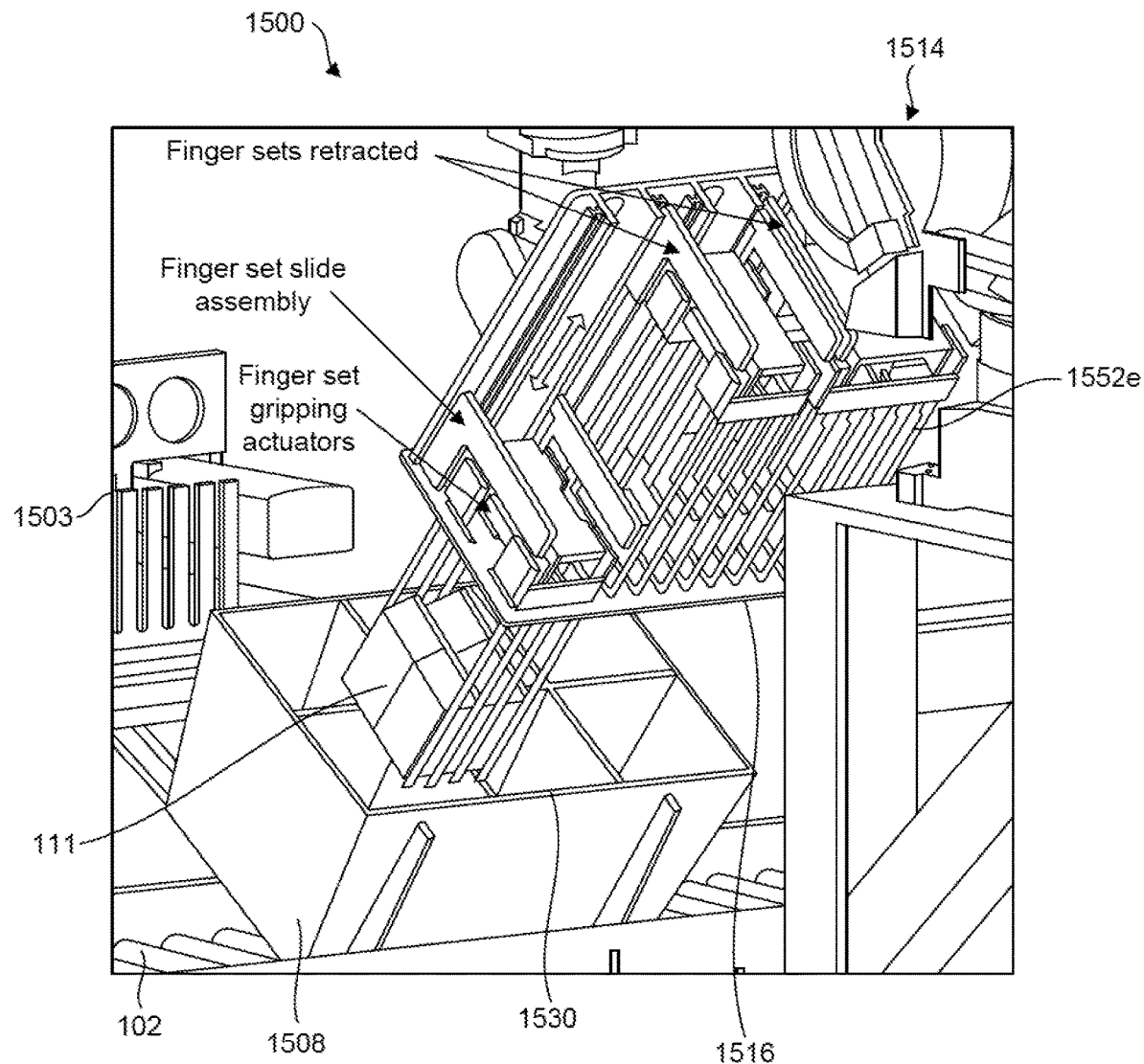

FIGS. 22, 23A and 23B show various views of the tote handler 1514 moving the items 111 from the capture table 1503 to the tote 108. These views show an example of the tote handling system 1500 performing a pack-decant (unloading) operation. The tote handler 1514 carries the items 111 with the grip hand 1516 to the tote 108 for unloading therein.

FIG. 22 is a schematic diagram of the tote handler 1514 transferring the items 111 from the capture table 1503 to the tote 108 on the conveyor 102. The items 111 are lifted from the capture table 1503 by the grip hand 1516. The fingers 1552e may support the items 111 thereon as the items 111 are moved from the capture table 1503 to the tote 108 on the conveyor 102 as indicated by the arrow. The items 111 may be moved by the grip hand 1516 in a horizontal orientation to prevent drops. To further prevent dropping of items (e.g., particularly fragile items made of glass of brittle material), the items 111 may be secured during the picking and placing of stacks of the items 111. The items 111 may be secured in open boxes, for example, by clamping and supporting the items 111 with the fingers 1522e as they are transferred (see, e.g., FIGS. 17A and 17B).

Once the items 111 are retrieved from the capture table 1503 (FIG. 22), the tote handler 1514 may position the fingers 1152e to load the items 111 into the sub-chamber 1530 of the tote 1508 (FIGS. 23A-23B). FIGS. 23A and 23B are schematic diagrams depicting the grip hand 1516 loading the items 111 from the capture table 1503 into the tote 1508. As shown in these views, the grip hand 1516 inserts the items 111 received from the capture table 1503 into the tote 108. The tote 1508 has sub-chambers 1530 shaped and sized to receive the items 111 therein as described in FIG. 20.

As shown in FIGS. 23A and 23B, the pack-decant tool may automatically adjust to the configuration of the tote 1508 and its sub-chambers 1530. A select portion of the fingers 1152e corresponding to the size of the sub-chamber 1530 and/or the items 111 may be extended from the grip hand 1516 (as described in FIG. 16B) to engage the items 111 in the capture 1503 and to fit within the sub-chambers 1530. The grip hand 1516 may extend select groups of one or more of the fingers 1552e corresponding to the dimensions of the items 111 and/or the tote 108 (and/or the sub-chambers therein). The base 1552a may selectively extend one or more of the fingers 1552e a given distance as described in FIG. 16B. The grip hand 1516 may adjust for the different tote dimensions sizes by extending and retracting different sets of the fingers 1552e along different distances as needed.

The number of fingers 1552e that extend may correspond to the dimensions of the tote 1508. For example, a small group of the fingers 1552e may extend for smaller chambers 1530, and a larger group or a combination of sets of groups of the fingers 1552e may extend for larger chambers 1530. In another example, the fingers 1552e may extend a shorter distance for shallower chambers 1530, and a longer distance for deeper chambers 1530. The grouping and number of the fingers 1552e may vary as required by the range of dimensions.

The fingers 1552e may open and close as well as slide in an out of the sub-chamber of the tote 1508 to insert/remove the items 111 (see, e.g., FIG. 17A-17B). The grip hand 1516 may also optionally tilt the tote 1508 to facilitate loading/unloading as described herein (see, e.g., FIG. 19).

Figure 24:
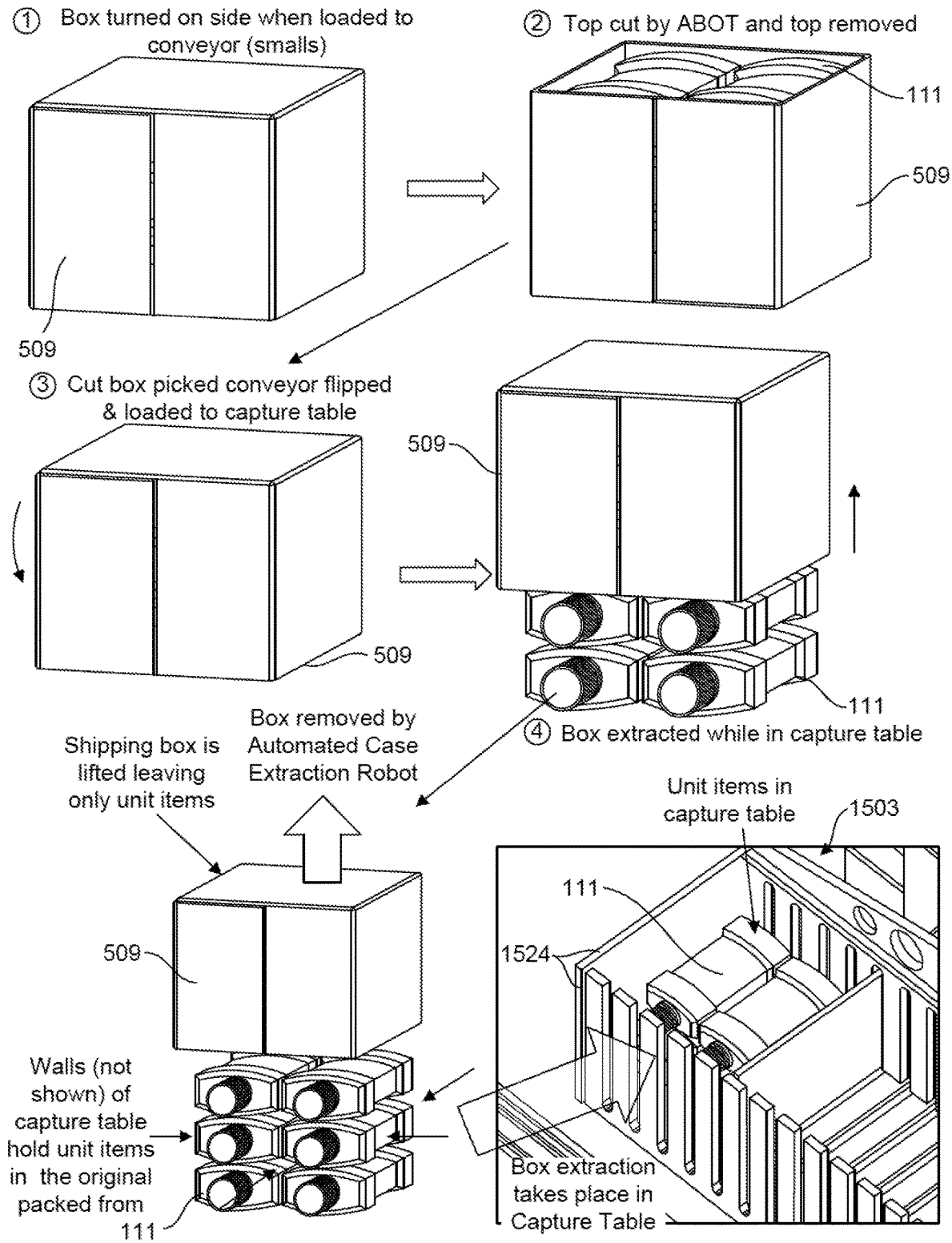
FIG. 24 is a schematic diagram depicting unloading items of items into the capture table.

FIG. 24 is a schematic diagram showing processing of the shipping container 509 for use in the capture table 1503. As shown in these views, the shipping container 509 may be opened manually or using an automatic box cutter (not shown) for removing the items 111. Initially, at event 1, the shipping container 509 may be placed on its side for cutting by the box cutter (not shown). Next, the shipping container 509 may be cut to expose the items 111 as shown at event 2. The shipping containers 509 may be cut locally, or upstream or the process, by manual or automatic box cutter (e.g., an automated shipping container opening technology (ABOT) not shown). Example box cutters are described in US Patent Application Nos. 20160031580 and 20160016684, the entire contents of which is hereby incorporated by reference herein. The lids of the shipping containers 509 may be extracted and opened, and conveyed to an intermediate pack-decanter (not shown). The unloading process for placing items 111 in the capture table 1503 may be performed using automated processes and optional conveyor/handling equipment as is described further herein (see, e.g., FIGS. 38A-39B).

At event 3, the shipping container 509 may be inverted as indicated by the arrow, and placed on the capture table 1503. At event 4, the shipping container 509 may be lifted off of the items 111. At event 5, the items 111 remain in position on the capture table 1503 when the shipping container 509 is removed. For descriptive purposes, the capture table 1503 is not shown at events 3-5. Event 6 shows the items 111 positioned in the capture table 1503 after the shipping container 509 is removed. As shown at event 6, the items 111 are supported in position by the walls 1524 of the capture table 1503. The walls 1524 may be adjusted to fit the items 111 as described in FIG. 20.

Tote Handling System—Tote Handler with Merger Grip Hand

The present disclosure also relates to yet another tote handling system in an item handling configuration. This tote handling system may be part of the tote handling system described herein, or separate therefrom, and includes features and capabilities thereof. The tote handling system may include the tote handler, the tote conveyor, and the tote as described herein. This version includes a merger grip hand capable of gripping the tote and the items in the tote for inversion and removal. The merger grip hand may be operated using the tote handler described herein. The merger grip hand may be used for lifting and placing the tote onto the shipping container on the tote conveyor. The merger grip hand may be configured to pass through the tote conveyor to engage the shipping container. The merger grip hand may then rotate the totes with the shipping container therein to a storage position.

The tote handling systems may use the merger grip hand (alone or with other components of the tote handling system) as a decanter used to decant (or manipulate) the contents of the shipping containers and the totes. The merger grip hand is configured to place opened shipping containers (e.g., boxes) filled with the items into the tote without dumping or dropping the items. This may be accomplished by inverting the tote and placing it onto the open shipping container, thereby merging the two together. The merged (mated) tote and shipping container are then inverted together. Now upside down the shipping container may be removed from the tote. The merger grip hand may have a multi-axis manipulator (e.g., a robot) used to facilitate the decanting process. The merger grip hand may also be operated using a conveyor handler or a frame handler. The merger grip hand may also be designed to transfer the totes and the opened shipping containers onto one or more conveyor lines.

"Decanting" as used herein refers to the manipulating (e.g., engaging, handling, lifting, merging, rotating, inverting, and separating, transferring and/or moving) of items in a handling system. Such decanting may be used when removing items from packaging, such as a shipping container. Such decanting may include, for example, merging of contents (e.g., one or more items) in shipping containers and totes, and/or transferring such contents between the shipping containers and the totes. "Shipping to tote" (STT) is a form of decanting referring to the movement (e.g., merging or transfer) of the items from shipping containers to the tote. This decanting may be part of an overall more comprehensive material handling process in ecommerce fulfillment. The totes used in decanting may be any of the totes used herein. For decanting, the totes may be in the form of uniform shipping containers, or a type of similar totes having a common shape for use in an automatic storage and retrieval systems (ASRS). The ASRS stores the items in the totes until retrieved to fulfill orders placed online that need to be filled.

The tote handling (decanting) system may be intended to provide one or more of the capabilities of the material handling system describe herein, as well as: facilitating movement of items from shipping containers, facilitating movement of items into totes, reducing missed transfers and/or dropping of items, facilitating safe transfers of items, reducing unintentional dumping of items and/or totes, merging (mating) of totes with shipping containers, enabling multiple transfers using a common decanter and/or decanting operation, facilitating automatic transfers of the items and/or reducing manual handling during transfer of the items, transferring the items from the shipping containers to uniform containers usable in handling systems (e.g., ASRS), facilitating movement of the items from the shipping containers and into the uniform containers without dropping the items and potentially causing damage to the merchandise, etc.

FIGS. 25A-26C show the tote handling (decanting) system 2500 in an item handling configuration. These figures show an example tote handling (decanter) system that may be used for decanting the items 111 from the shipping containers 509. These figures show an example of the tote handling system 2500 used for manipulating (e.g., decanting) the shipping container 509, the tote 108, and the items 111. The tote handling system 2500 may be used to decant the items 111 from the shipping container 509 into the tote 108 using a merger operation as is described further herein.

Figure 25A:
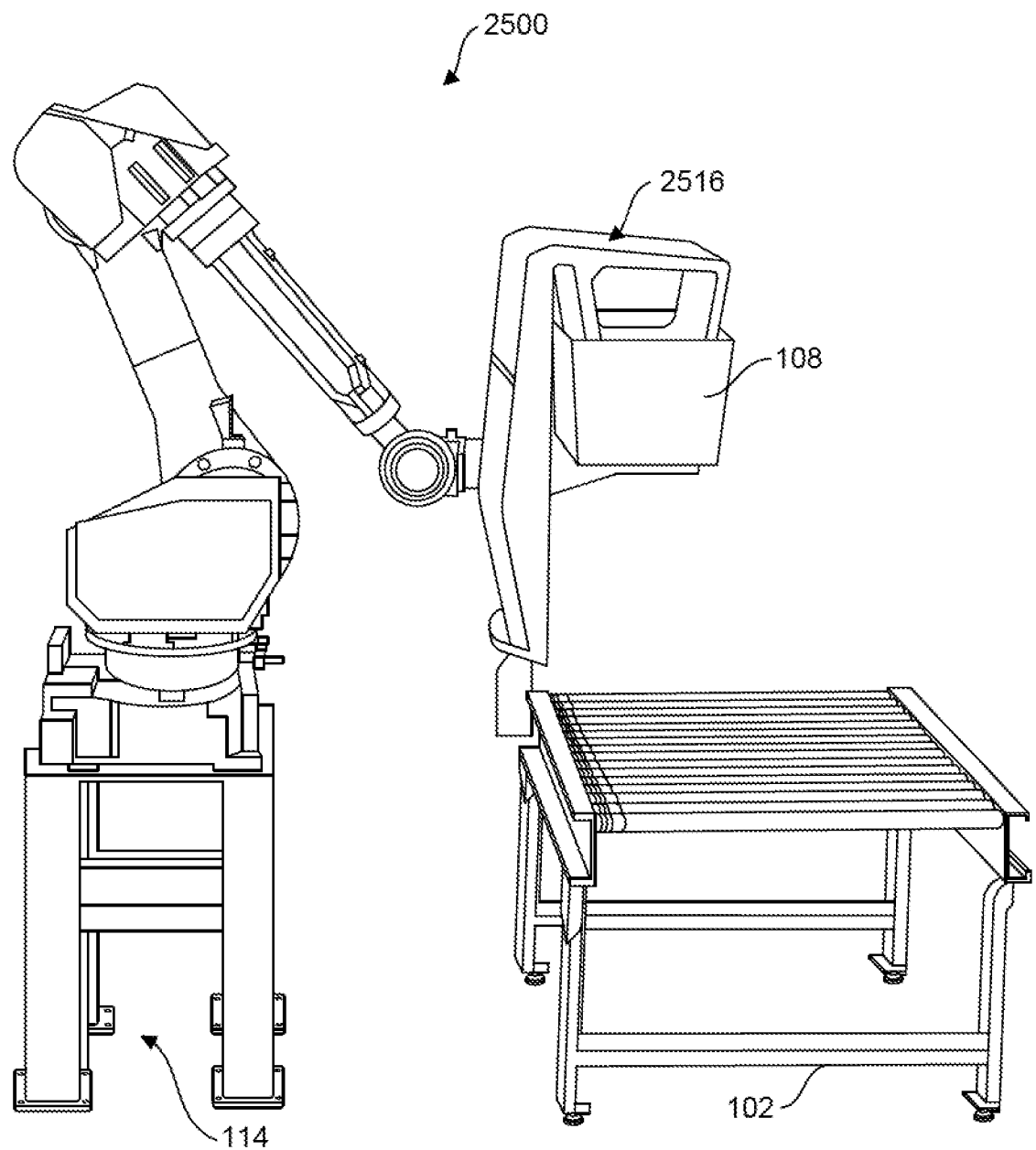
FIGS. 25A-25C are schematic diagrams of yet another tote handling system, the tote handling system including the tote conveyor, the tote handler with a merger grip hand, and the tote.
Figure 25B:
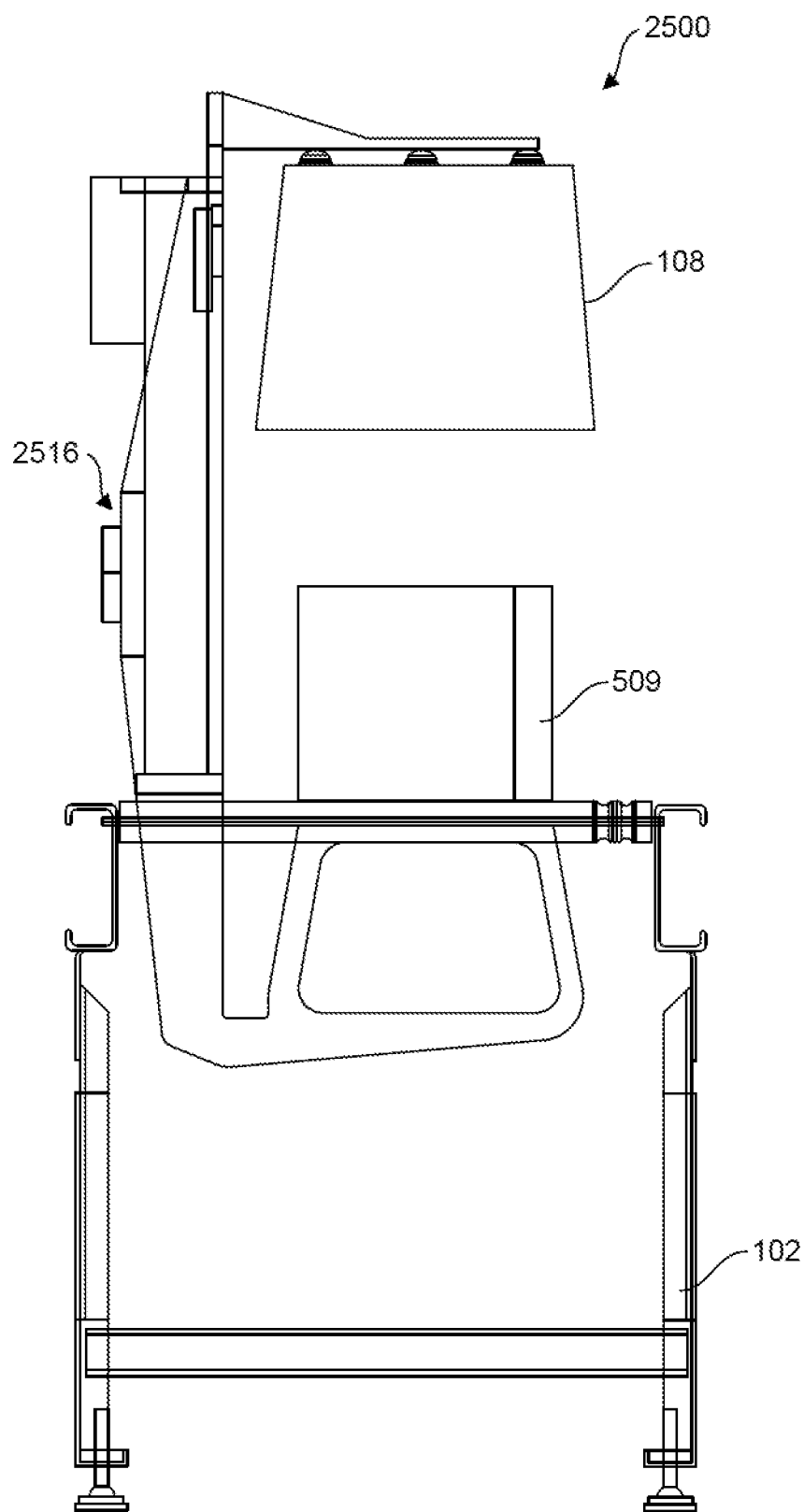
Figure 25C:
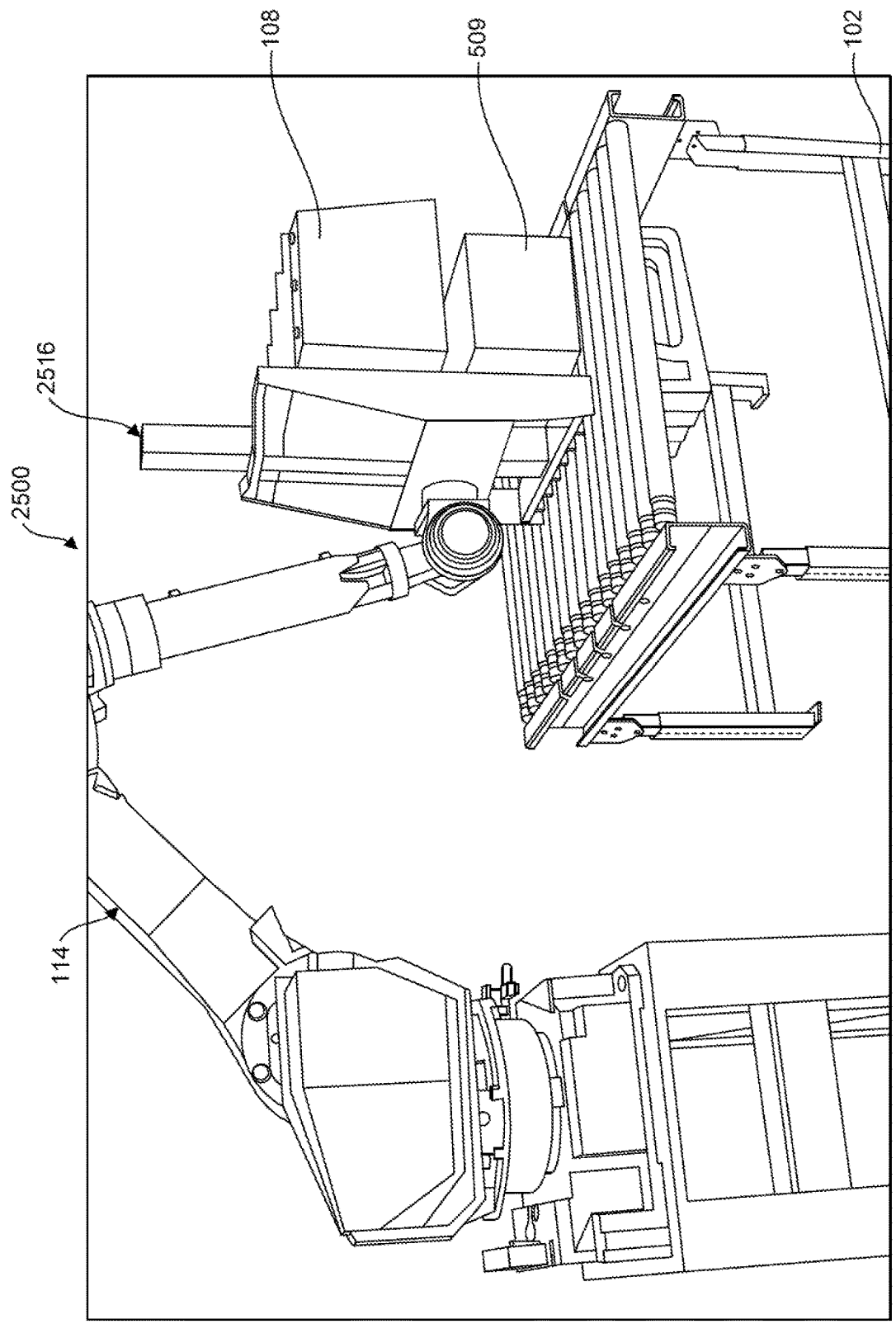

FIGS. 25A-25C are schematic diagrams of the tote handling system 2500, the tote handling system 2500 including the tote conveyor 102, the tote handler (decanter) 104 with a merger grip hand 2516, and the tote 108. The tote 108 and the tote conveyor 102 may be similar to those described herein (e.g., FIGS. 1-14C). The tote handler 104 may include a decanter robot 114 similar to the robot 114 of FIGS. 5A-5B. In this version, the robot 114 is provided with the merger grip hand (decant tool) 2516 for engaging the shipping container 509 and the tote 108.

In the example of FIGS. 25A-25C, the tote handler 114 is shown manipulating the shipping container 509 and the tote 108 using the tote handler 114 and the merger grip hand 2516. The merger grip hand 2516 may be used to engage, invert, and support the tote 108 for placement onto a shipping container 509 and receipt of the items 111 from the shipping container as is described further herein.

Figure 26A:
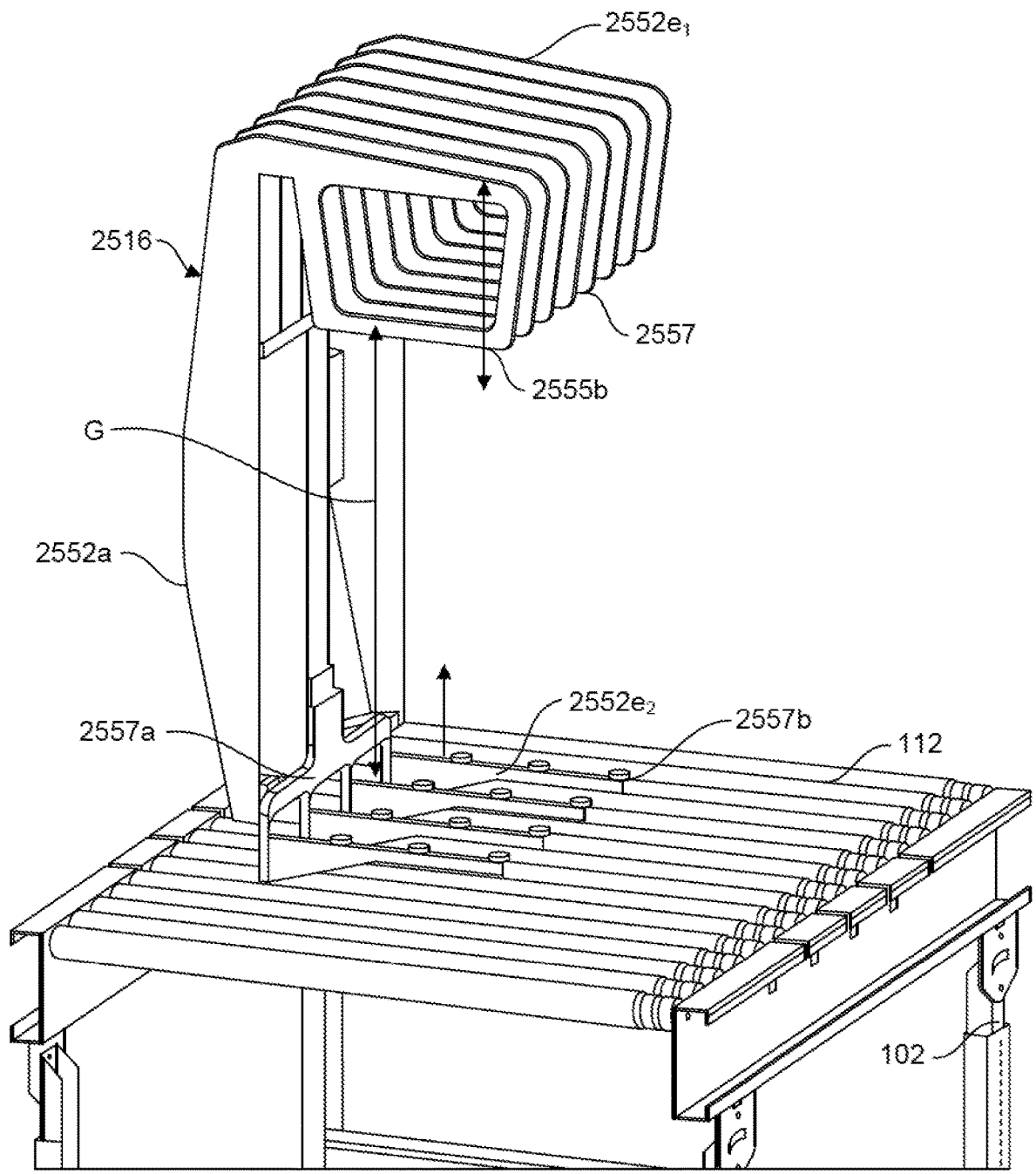
FIGS. 26A-26C are schematic diagrams of showing the merger grip hand in greater detail.
Figure 26B:
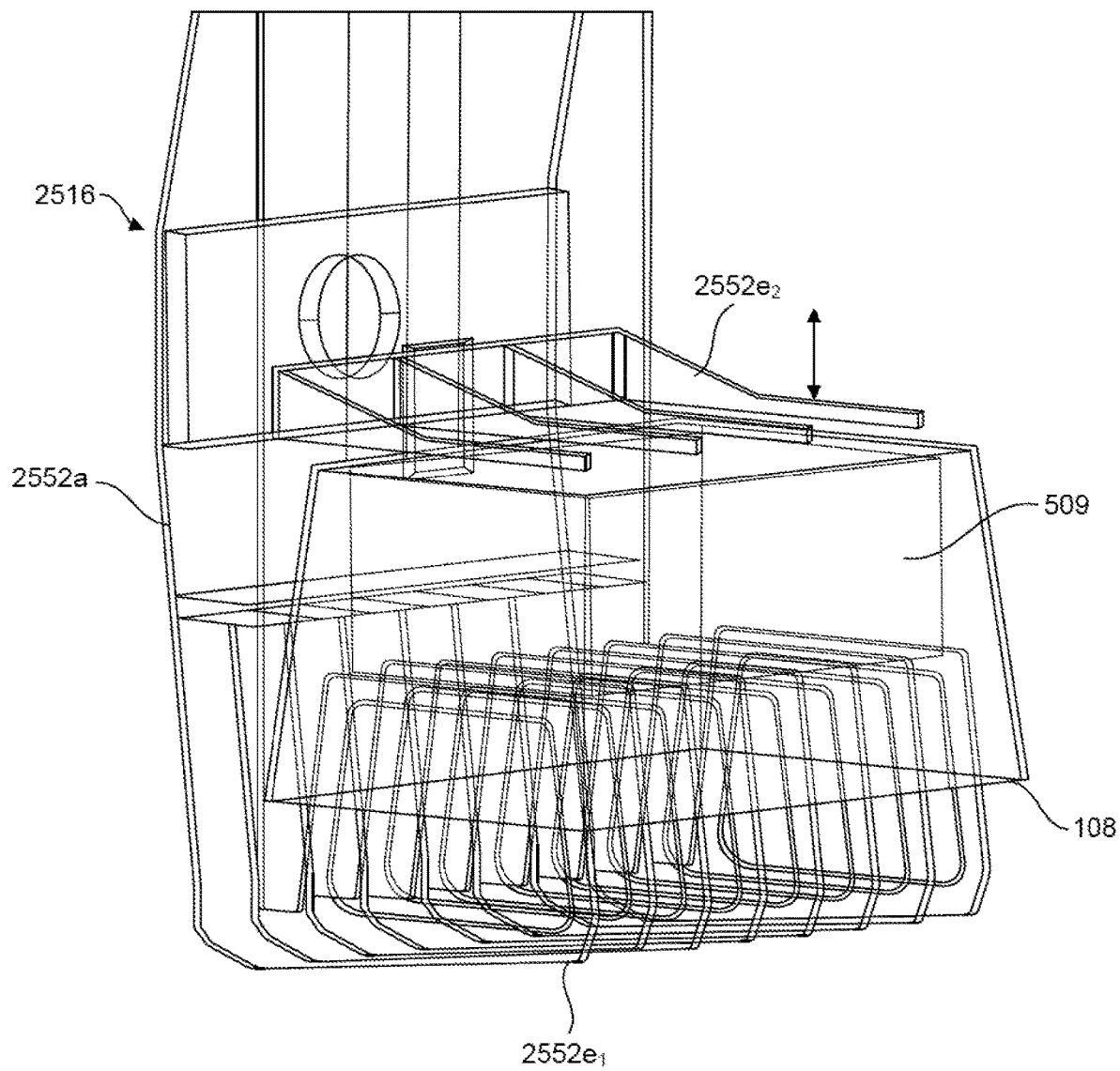
Figure 26C:
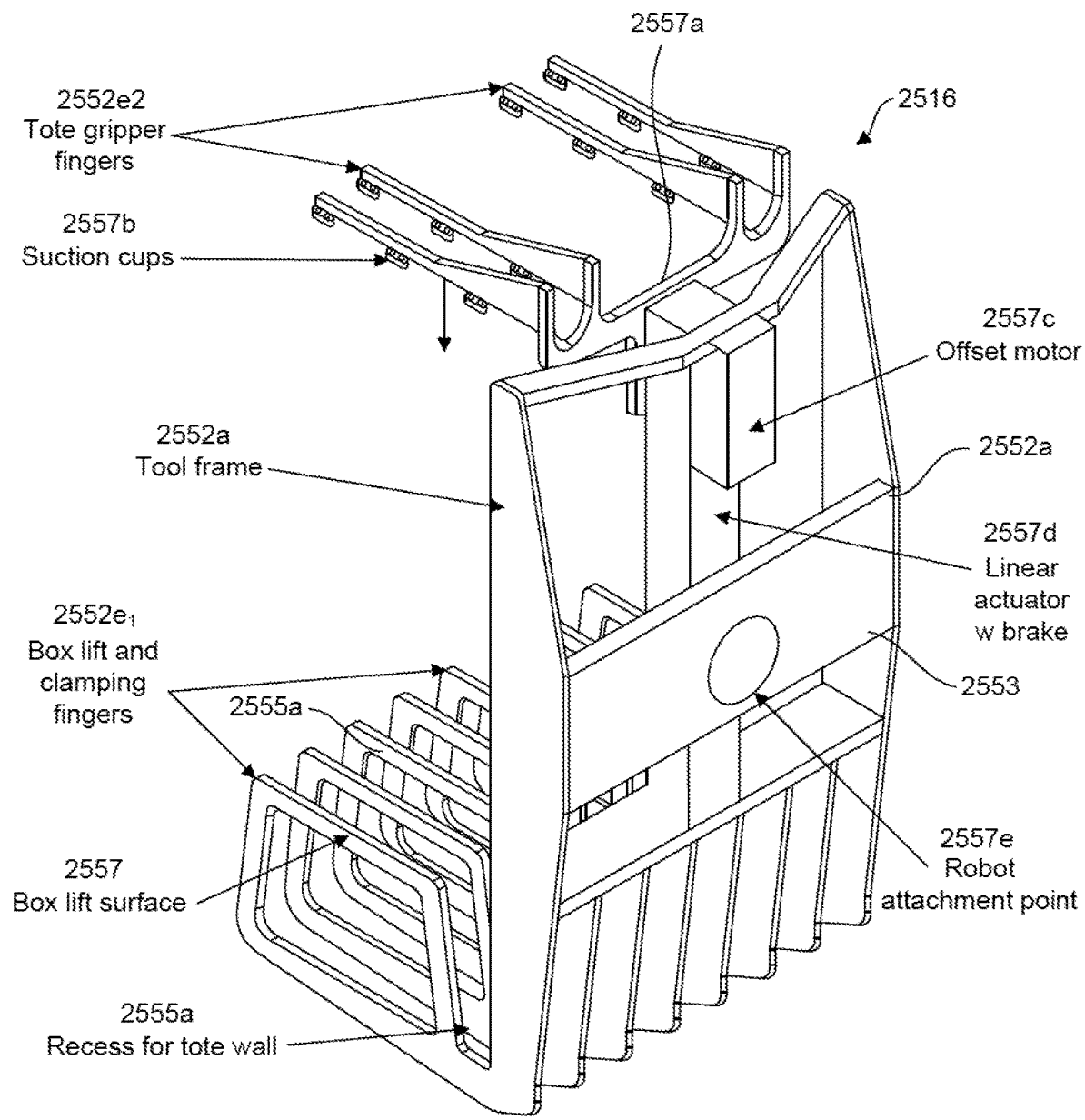

FIGS. 26A-26C are schematic diagrams of showing the merger grip hand 2516 in greater detail. As shown in FIG. 26A, the merger grip hand 2516 is a detachable structure positionable about the tote conveyor 102 for engaging the shipping container 509 and the tote 108. The merger grip hand 2516 includes a base (decant frame) 2552a and merger (decant) fingers 2552e1,e2 extending from the base 2552a. The base 2552a may include a rectangular structure with a crossbar 2553 connectable to the robot 114 (e.g., by the connection 548c of FIG. 5B). The base 2552a is positioned vertically about the tote conveyor 102 with the insert fingers 2552e1 and suction fingers 2552e2 extending from opposite ends thereof.

The fingers 2552e1,e2 may include insert (clamp) fingers 2552e1 and suction (gripper) fingers 2552e2. Multiple of the insert fingers 2552e1 and the suction fingers 2552e2 extend along their respective ends of the base 2552a. The insert fingers 2552e1 extend from one end of the base 2552a with a recess 2555a therebetween. The insert fingers 2552e1 include a flat, polygonally shaped member having a flat engagement surface 2555b affixed to the base 2552a adjacent the recess 2555a. The polygonally shaped fingers 2552e1 have a periphery shaped to conform to an inner surface of the tote 108. The engagement surface of the insert fingers 2551e1 are aligned along the end of the base 2552a to define an engagement surface 2557 across the respective insert fingers 2552e1 for engaging a surface of the shipping container 509. The base 2552a includes multiple slats aligned with and connected to the polygonally shaped insert fingers 2552e1 for providing support thereto.

The suction fingers 2552e2 extend from the other end of the base 2552a opposite the insert fingers 2552e1. The suction fingers 2552e2 are rigid rods joined together by a grip support 2557a. The suction fingers 2552e2 are provided with suction cups 2557b for engaging and supporting the tote 108 when lifted and rotated. The grip support 2557a is slidably connected to the base 2552a and drivable by an offset motor 2557c and linear actuator 2557d with brake. The suction fingers 2552e2 may be moved to a desired position relative to the insert fingers 2552e1 to engage the tote 108 and/or the shipping container 509 to perform a merger (or other) operation as described further herein (see, e.g., FIG. 26B).

While a specific number of fingers 2552e1,e2 and associated components (e.g., suction cups 2557b) are shown, any number capable of performing the necessary operations described herein may be used. Also, while the suction fingers 2552e2 are shown as being movable and the insert fingers 2552e1 as being stationary, one or both of the suction and insert fingers 2552e1,e2 may optionally be movable. The merger grip hand 2516 and/or the fingers 2552e1,e2 may be configured to work with any portion of the handling systems described herein (e.g., the tote handler, tote conveyor, and/or totes).

The insert fingers 2552e1 and suction fingers 2552e2 are spaced apart to pass between the rollers 112 of the tote conveyor 102 as the merger grip hand 2516 moves vertically about the conveyor 102. As shown in FIG. 26A, the fingers 2552e1, e2 are spaced apart and shaped to pass between the tote conveyor 102 or any other conveyor (e.g., as an industry standard roller conveyor with rollers having a 3 inch (7.92 cm) diameter). The fingers 2552e1,e2 may be sized to fit between the rollers 112 from the side or directly overhead of the tote conveyor 102.

The fingers 2552e1, e2 may be inserted under the shipping container 509 or the tote 108 while in position about the conveyor, or the shipping container 509 or the tote 108 may be conveyed by the tote conveyor 102 to a position over the fingers 2552e1, e2 for use therewith. Compact multi-functional design allows the decanter to fit and function in tight space with a single section of conveyor. The insert fingers 2552e1 may fit between rollers 112 and when combined, support the shipping containers 509 and align the totes 108. The insert fingers 2552e1 are designed to move well up into the interior of the tote 108 to hold small and/or short shipping containers 509 in place against an interior surface of the tote 108.

As shown in FIG. 26B, the suction fingers 2552e2 may be axially movable along the base 2552a and the insert fingers 2552e1 are affixed to the base. The suction fingers 2552e2 may be slidably movable along the base 2552a relative to the insert fingers 2552e1 to selectively adjust a grip distance G for receiving the shipping container 509 and the tote 108 therebetween. The insert fingers 2552e1 may act as an elevator for lifting the tote 108 and/or shipping container 509 and pressing it against the suction fingers 2552e2. Once gripped as shown in FIG. 26B, the merger grip hand 2516 may be rotated with the tote 108, items 111, and/or the shipping container 509 secured therebetween as is described further herein.

FIG. 26C shows another view of the base 2552a depicting additional features of the merger grip hand 2516. As shown in this view, the base 2552a is a rectangular member capable of supporting the insert fingers 2552e1 and movably supporting the suction fingers 2552e2 thereon. The base 2552a houses the offset motor 2557c and the linear actuator with linear brake 2557d thereon used to selectively move portions of the merger grip hand 2516, and for attachment of the base 2552a to the robot (or tool handler) by the crossbar 2553 at attachment point 2557e.

Figure 27A:
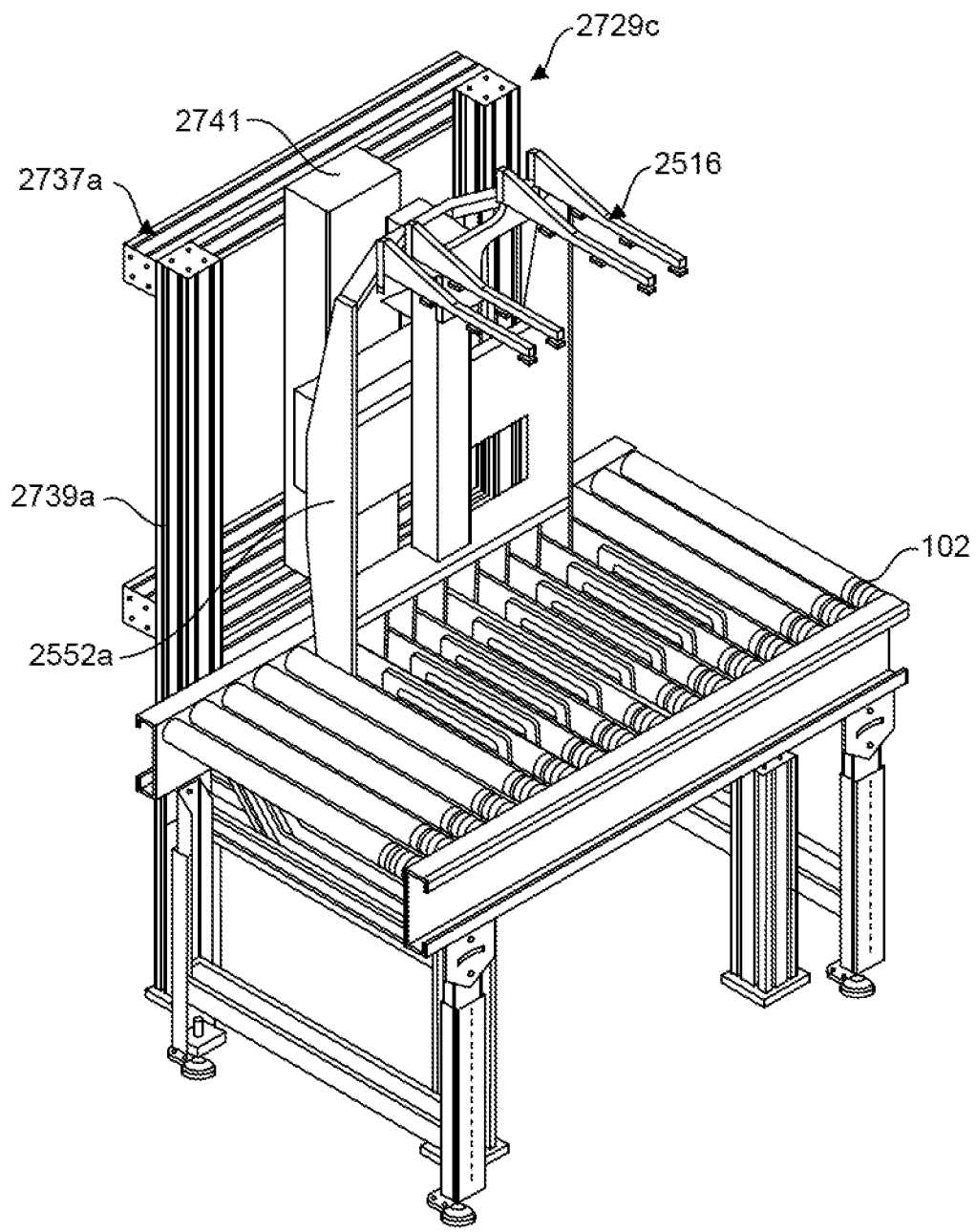
FIGS. 27A and 27B are schematic diagrams of a tote handler in a conveyor and a frame configuration, respectively.
Figure 27B:
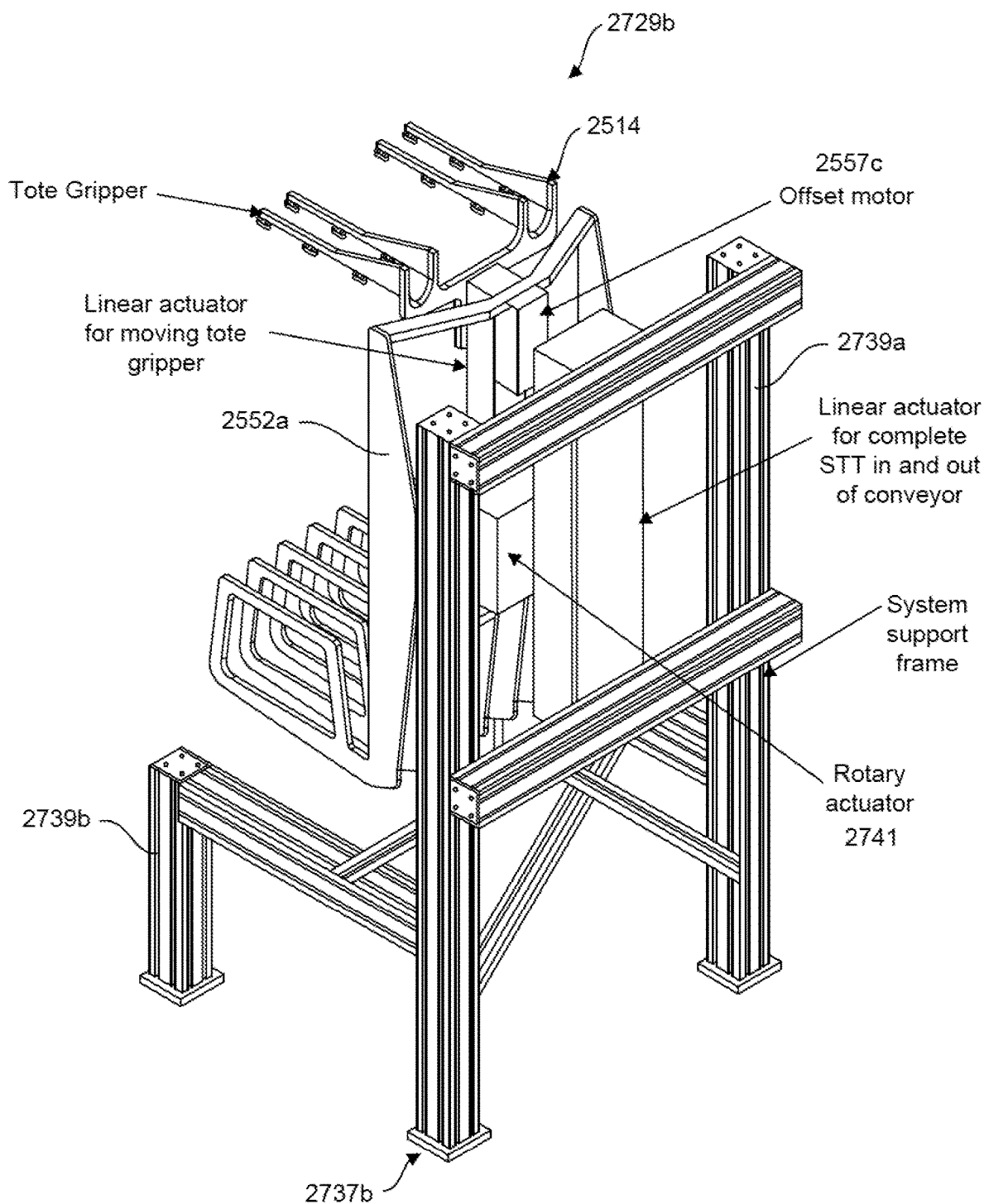

FIGS. 27A and 27B are schematic diagrams of a tote handler 2729a,b in a conveyor and a frame configuration, respectively. As shown by this example, the merger grip hand 2516 may be used with various devices in addition to the robot version of the tote handler 104 of FIGS. 25A and 25C. The tote handler 2729a,b may include a conveyor support 2737a and/or a frame support 2737b, respectively. As shown by these figures, the supports 2737a,b may also be made integral with the tote conveyor 102 or be made for positioning about portions of the handling system 100 (see, e.g., adjacent the tote conveyor 102 of FIGS. 18A and 18B).

The conveyor tote handler 2729a of FIG. 27A includes the conveyor support 2737a with the merger grip hand 2516 movably secured thereto. The conveyor support 2737*a* includes the conveyor 102 and a vertical support 2739*a*. The conveyor 102 may have wheels (not shown) to facilitate mobility. The conveyor 102 may be positioned about the conveyor support 2737*a* for alignment with other tote conveyors 102, transfers 1103, or other conveyor components (see, e.g., FIGS. 11A-11D).

The vertical support 2739*a* may be a vertical frame connected to or extending above the legs of the conveyor 102. The vertical support 2739*a* is structured to extend a distance above the conveyor 102. The vertical support 2739*a* may include beams with cross-bars capable of movably supporting the merger grip hand 2516 about the conveyor 102. The merger grip hand 2516 may be connectable to the vertical support 2739*a* by a connector 2741. The connector 2741 may be a vertical beam connectable to the base 2552*a*. The fingers 2552*e*1,*e*2 may extend through the conveyor 102 for engagement with the tote 108, the shipping container 509, and/or the items 111 as described further herein.

The frame tote handler 2729*b* of FIG. 27B is similar to the conveyor tote handler 2729*a*, except that the conveyor 102 has been removed. Instead, this version has a horizontal support 2739*b* may include cross beams connected to the vertical support 2739*a*, and legs to support the cross beams about the floor. The horizontal support 2739*b* may be shaped for insertion about a separate conveyor 102 or other conveyor components (e.g., transfer 1103) for use therewith. The merger grip hand 2516 may move about the horizontal and vertical supports 2739*a,b* as previously described. In this version, the grip hand 1516 may extend about the horizontal support 2739*b* to pass through the tote conveyors 102 or other components positioned thereabout. As also shown in FIG. 27*b*, the merger grip hand 2516 may include a rotary actuator 2745 drivable by the offset motor 2557*c* for rotating the merger grip hand 2516.

FIGS. 28A-28L are schematic diagrams depicting a handling operation 2800 using the merger grip hand 2516. FIGS. 28A-28D show a tote loading operation 2800*a* using the merger grip hand 2516. FIGS. 28E-28H are schematic diagrams of the shipping container 509 in a merging operation 2800*b* using the merger grip hand 2516. FIGS. 28I-28L are schematic diagrams of an inversion (separation or unloading) operation 2800*c* using the merger grip hand 2516. One or more of these operations (and/or portions thereof) may be performed in various orders and repeated as desired.

During the tote loading operation 2800*a* of FIGS. 28A-28D, the tote 108 is loaded onto the merger grip hand 2516 and the merger grip hand 2516 is positioned about the tote conveyor 102 in preparation for the part of the merger operation 2800*b*. The tote loading operation 2800*a* involves the following: At position 1 (FIG. 28A), merger grip hand 2516 moves into position to pick the empty tote 108 to be filled from the tote conveyor 102. At position 2 (FIG. 28B), the tote 108 is gripped by the suction fingers 2552*e*2 and lifted from the tote conveyor 102 to allow rotation of the tote 108 without dropping the tote 108. At position 3 (FIG. 28C), the merger grip hand 2516 moves clear of the tote conveyor 102 and is rotated 180 degrees. While the tote is inverted, the suction fingers 2552*e*2 hold the empty tote 108. At position 4 (FIG. 28D), the merger grip hand 2516 moves downward toward the tote conveyor 102 until the insert fingers 2552*e*1 pass between the rollers 112 and below the tote conveyor 102.

During the merger operation 2800*b* of FIGS. 28E-28H, the shipping container 509 is merged with the tote 108. As shown in these figures, merging involves the following: At position 5 (FIG. 28E), the insert fingers 2552*e*1 move below a top of the tote conveyor 102. At position 6 (FIG. 28F), an open shipping container 509 is conveyed by the conveyor 102 to a position below the suction fingers 2552*e*2. At position 7 (FIG. 28G), the merger grip hand 2516 is lifted vertically so that the insert fingers 2552*e*1 engage the shipping container 509, and the merger grip hand 2516 with the tote 108 and the shipping container 509 thereon is raised above the tote conveyor 102. At position 8 (FIG. 28H), the gripped tote 108 moves down onto the open shipping container 509 until their respective surfaces meet.

As shown in FIGS. 28E-28H, the merger grip hand 2516 may be positioned at position 5 (FIG. 28E) to merge the tote 108 and the shipping container 509 in the merger operation. After the insert fingers 2552*e*1 are aligned with a bottom of the shipping container 509 at position 6 (FIG. 28F), and the merger grip hand 2516 lifts the shipping container off the tote conveyor at position 7 (FIG. 28G). As also shown at position 6, the shipping container 509 is positioned on the tote conveyor 102 adjacent the merger grip hand 2516. At position 7 (FIG. 28G), the opened shipping container 509 is filled with the items 111 and moved by the conveyor 102 to a position adjacent the merger grip hand 2516 and/or under the tote 108, or the merger grip hand 2516 (with the shipping container 509) may be moved to a position under the shipping container 509 that is already in place on the tote conveyor 102. After the insert fingers 2552*e*1 clear a top of the tote conveyor 102 at position 7 (FIG. 28G), the tote 108 is moved downward over the shipping container 509 as shown at position 8 (FIG. 28H). The inside horizontal surface of the tote 108 meets with the opened horizontal top of the shipping container 509 at position 8 (FIG. 28H). The top of the shipping container 509 and the items 111 therein may be near or in contact with a bottom inside surface of the tote 108.

As shown in FIG. 28I-28L, after the merger operation 2800*b* is completed, the merger grip hand 2516 may reinvert to its original position during the inversion operation 2800*c*. As shown in the inversion operation 2800*c* of FIGS. 28I-28L, the inversion involves the following: At 9 (FIG. 28I), the tote 108 and the merged open shipping container 509 lift clear of the tote conveyor 102. At 10 (FIG. 28J), the merger grip hand 2516 is rotated 180 degrees while the tote 108 and the open shipping container 509 are held firmly together. At 11 (FIG. 28K), the merger grip hand 2516 lowers to position the suction fingers 2552*e*2 between the rollers 112 of the tote conveyor 102. At 12 (FIG. 28L), the item suction fingers 2552*e*2 release the tote 108 and the merger grip hand 2516 moves away from the tote conveyor 102. While at 12 (FIG. 28L), the merger grip hand 2516 may be lowered to the tote conveyor 102, thereby placing the tote 108 now right side up on the tote conveyor 102. The suction fingers 2552*e*2 drop between the rollers 112 and the tote 108 is released from the suction cups 2557*b* of the suction fingers 2552*e*2. The tote 108 now contains the inverted and the opened shipping container 509 in the tote 108. The shipping container 509 can be removed leaving only the contents or items 111 in the tote 108 as is described further herein.

While the merger grip hand 2516 is shown in FIGS. 28A-28L moving the tote 108 in a horizontal and parallel orientation about the floor and a top of the tote 108, such devices may be in any orientation. For example, the robot 114 may optionally rotate the merger grip hand 2516 along an axis to various angles as needed to change orientation relative to such devices. The tote 108 and the shipping container 509 in these examples may be of any size.

Figure 29A:
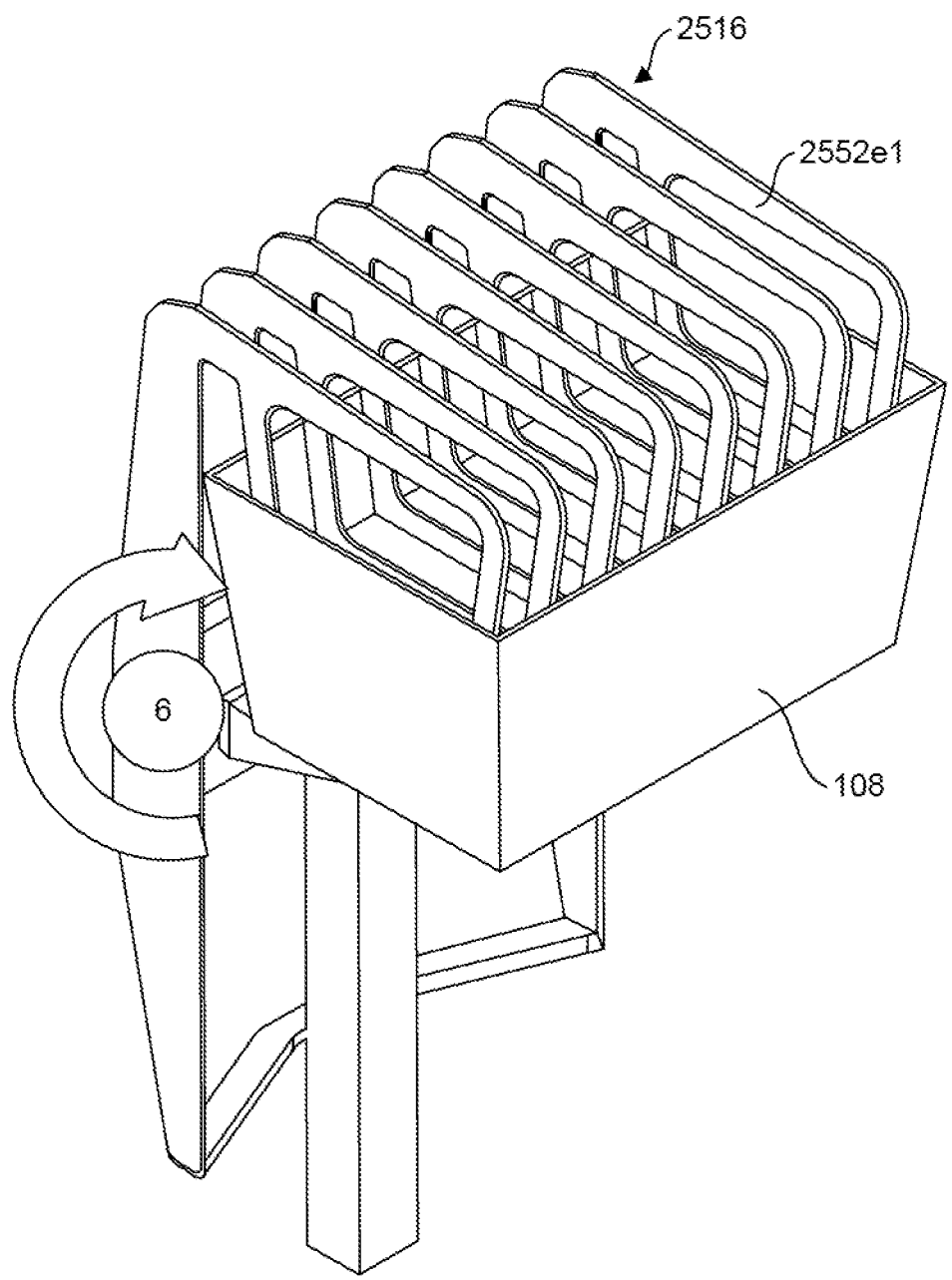
FIGS. 29A-29C are schematic diagrams depicting another view of the handling operation using the item tote hand.
Figure 29B:
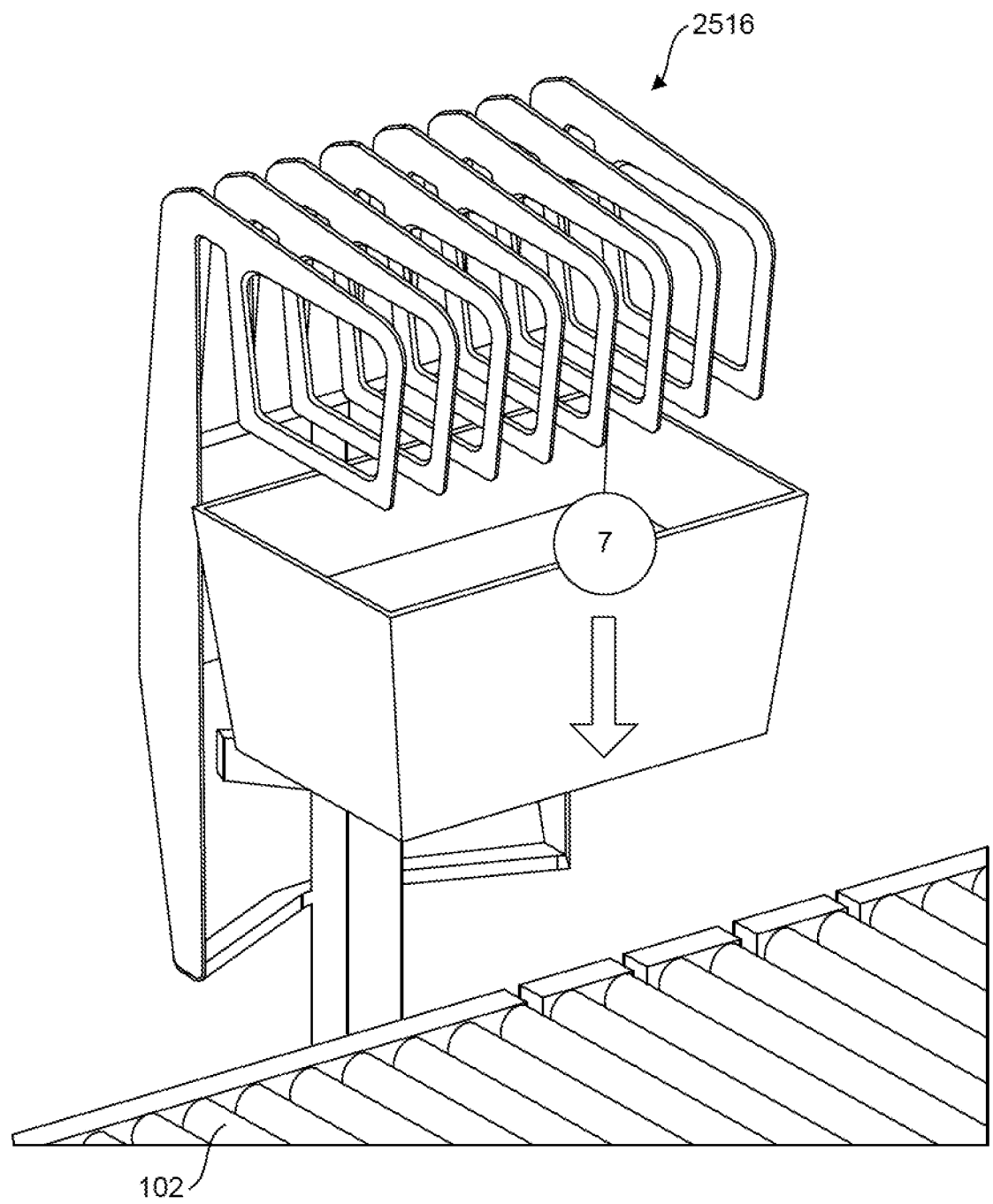
Figure 29C:
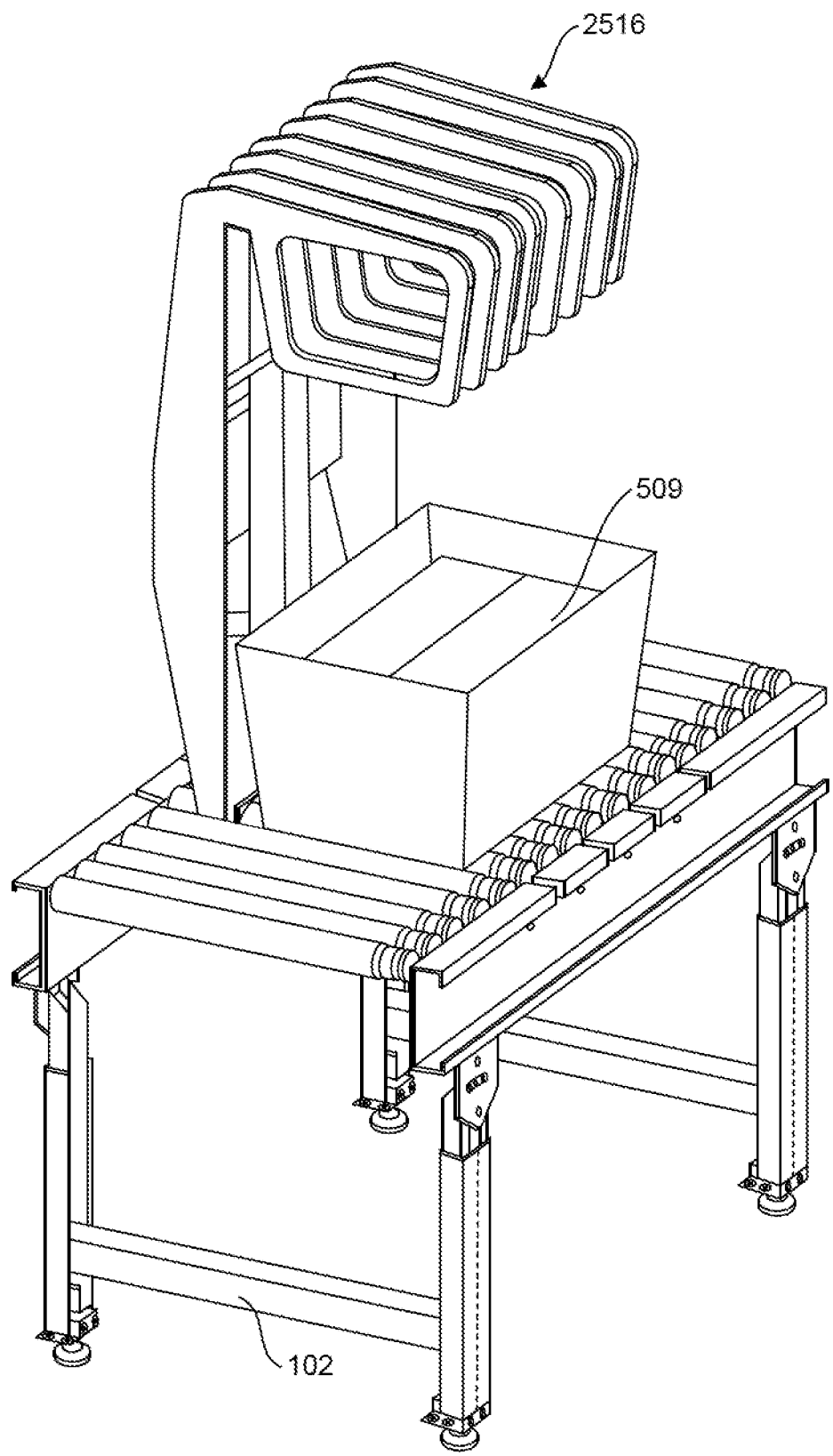

FIGS. 29A-31C are schematic diagrams depicting various views of portions of the merger grip hand 2516. FIGS. 29A-29C are schematic diagrams of the merger grip hand 2516 in an inverted position about the tote conveyor 102 after merger of the tote 108 and the shipping container 509. FIGS. 29A and 29B show the linear actuator 2557*d* activated to hold the tote 108 and the shipping container 509 together before and after release, respectively. FIG. 29C shows the merger grip hand 2516 positioned over the rotated tote 108 and the tote 108 released onto the tote conveyor 102. These figures show another view of the inversion operation 2800*c* and the merged and inverted tote 108 of FIGS. 28J-28L, respectively. As shown in these figures, after rotation, the insert fingers 2552*e*1 of the merger grip hand 2516 is released from the inverted tote 108, and the inverted tote 108 with the shipping container 509 there is positioned on the conveyor 102. These figures also show the insert fingers 2552*e*1 as they engage the shipping container 509 in the tote 108. During this process, the linear actuator is engaged to hold the tote 108 and the shipping container 509 for rotation.

Figure 30A:
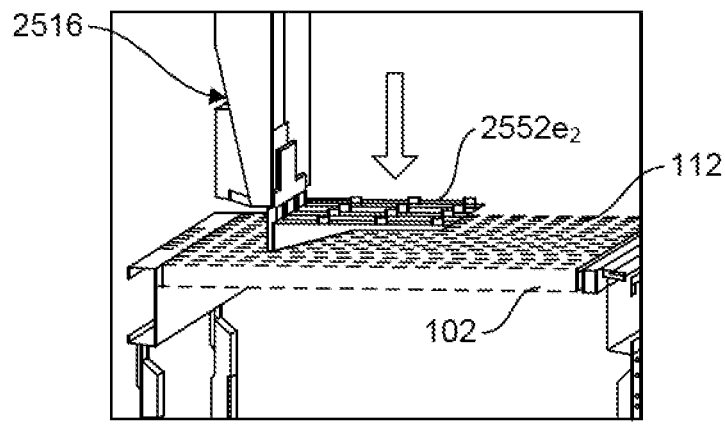
FIGS. 30A-30C are schematic diagrams of various sized shipping containers in use with the merger grip hand.
Figure 30B:
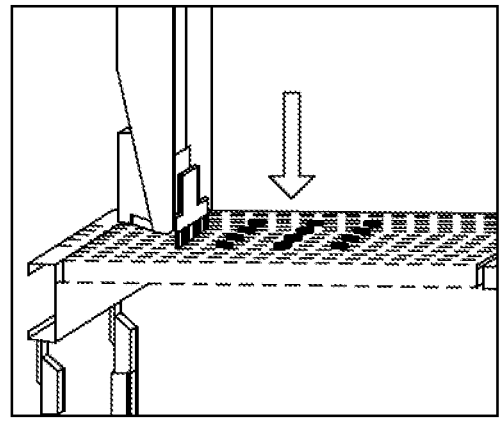
Figure 30C:
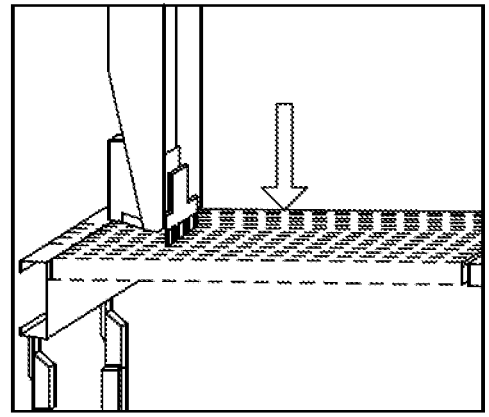

FIGS. 30A-30C are schematic diagrams of a portion of the merger grip hand 2516 with the suction fingers 2552*e*2 in various positions about the tote conveyor 102. These figures show another view of the suction fingers 2552*e*2 as they pass through the conveyor 102 as shown in FIG. 28L. These figures also show the suction fingers 2552*e*2 as they move from a position above, flush with, and below the top surface of the tote conveyor 102. The suction fingers 2552*e*2 pass between the rollers 112 of the tote conveyor 102 as they pass from above to below the tote conveyor 102.

Figure 31A:
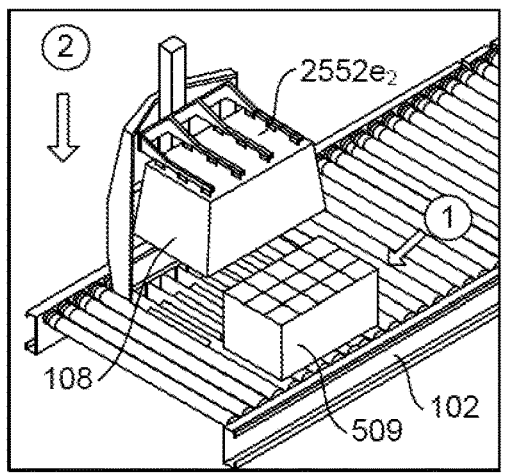
FIGS. 31A-31C are schematic diagrams of various sized shipping containers in use with the merger grip hand.
Figure 31B:
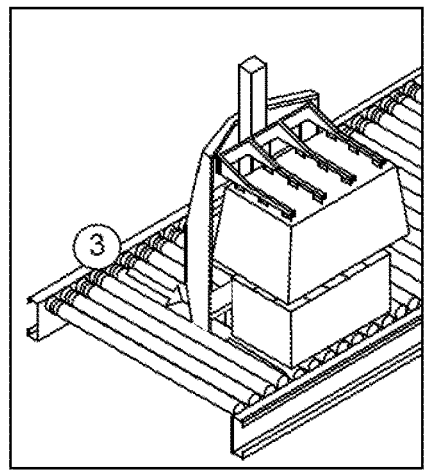
Figure 31C:
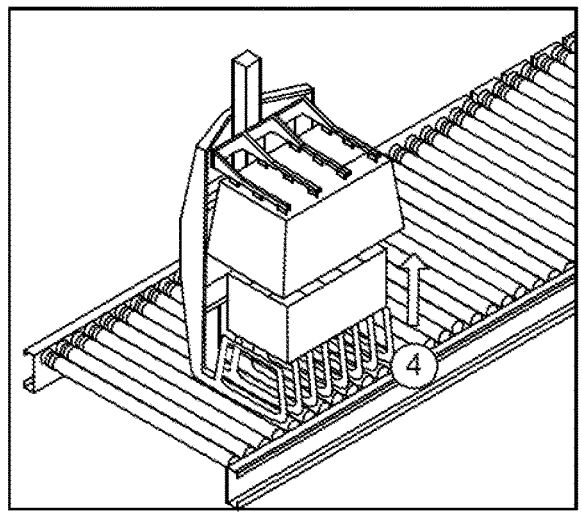

FIGS. 31A-31C show the suction fingers 2552*e*2 moving the tote 108 into various positions. These figures show another view of the merger grip hand 2516 in the merger operation 2800*b* as shown in FIGS. 28F and 28G. As shown in FIG. 31A, the suction fingers 2552*e*2 are engaged with and secured by suction to a bottom surface of the tote 108 and the tote 108 is lifted above the tote conveyor 102 at event 1 as the shipping container 509 is moved into position by the tote conveyor 102 at event 2. As shown in FIG. 31B, at event 3, the merger grip hand 2516 is moved about the tote conveyor 102 to advance the tote 108 above the shipping container 509. As shown in FIG. 31B, at event 4, the tote 108 is then raised by the suction fingers 2552*e*2 onto the open shipping container 509.

Figure 32:
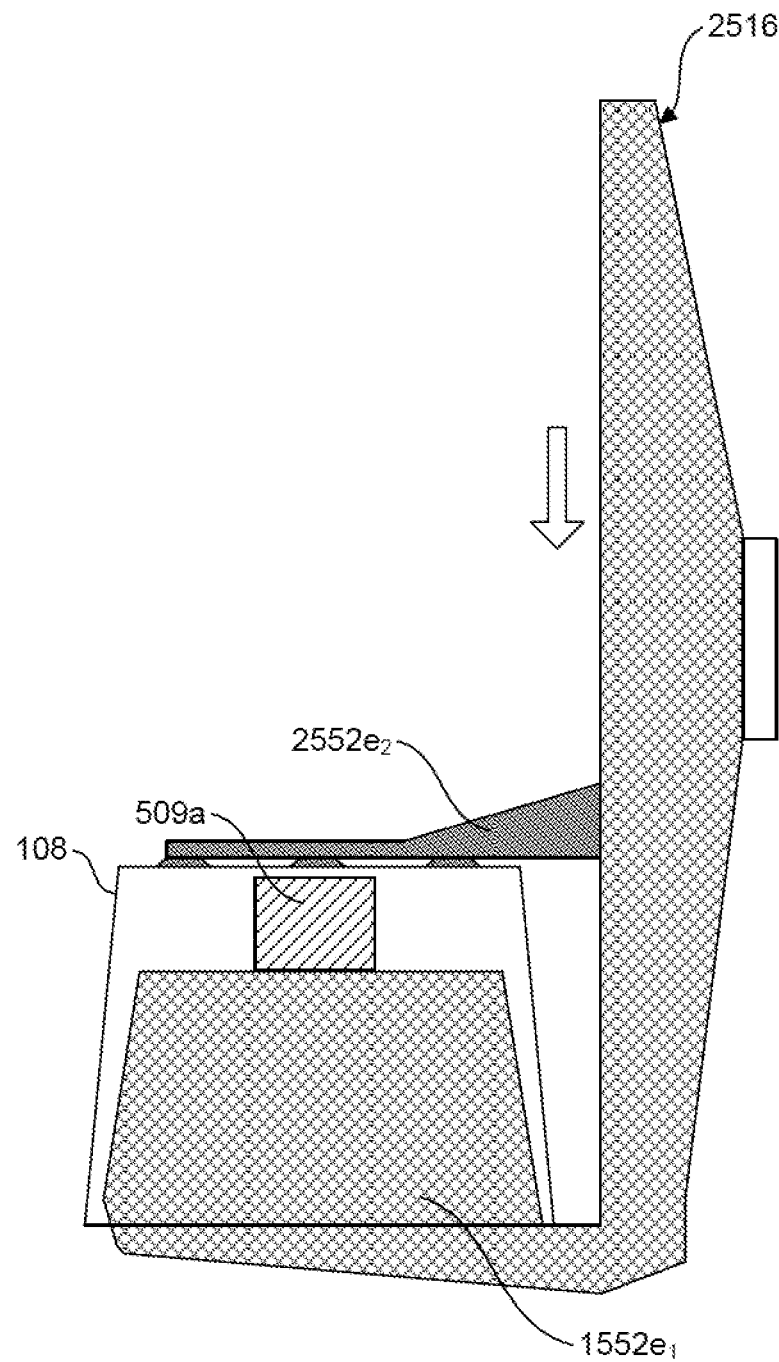
FIGS. 32 and 33A-33B are schematic diagrams of various sized shipping containers in use with the merger grip hand.

FIGS. 32-37 show additional features and options of the tote handling systems described herein. FIGS. 32 and 33A-33B are schematic diagrams depicting various sized shipping containers 509*a,b* in use with the merger grip hand 2516. These figures demonstrate that a decanting tool (e.g., the merger grip hand 2516) can be in use with various sized shipping containers 509*a,b*.

The insert fingers 2552*e*1 may be shaped to conform to the inside of the tote 108. The side view (periphery) of the insert fingers 2552*e*1 conform to the inside of the tote 108 to guide the tote 108 onto the insert fingers 2552*e*1. This shape may be used to guides the tote 108 onto the merger grip hand 2516 and capture small or large shipping containers 509*a,b* in the tote 108 during the inversion. The insert fingers 2552*e*1 may fill the tote 108 and trap the opened shipping containers 509*a,b* against the inside surfaces of the tote 108.

Figure 33A:
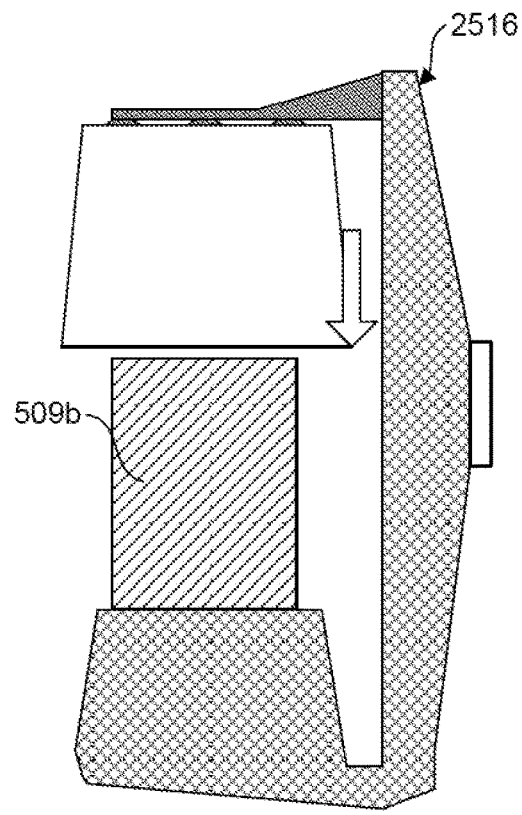
Figure 33B:
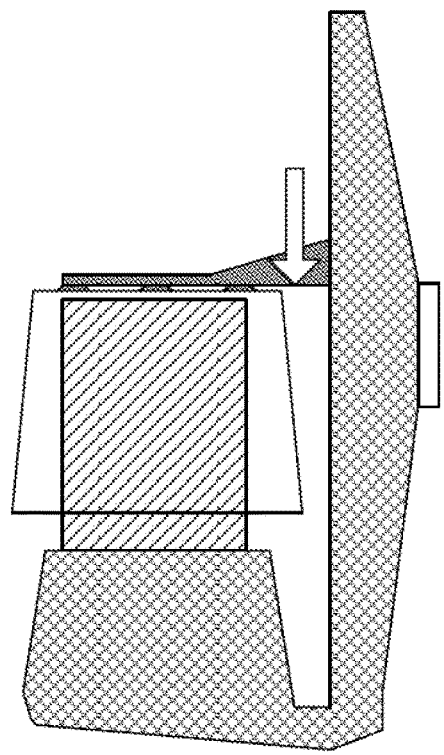
Figure 34A:
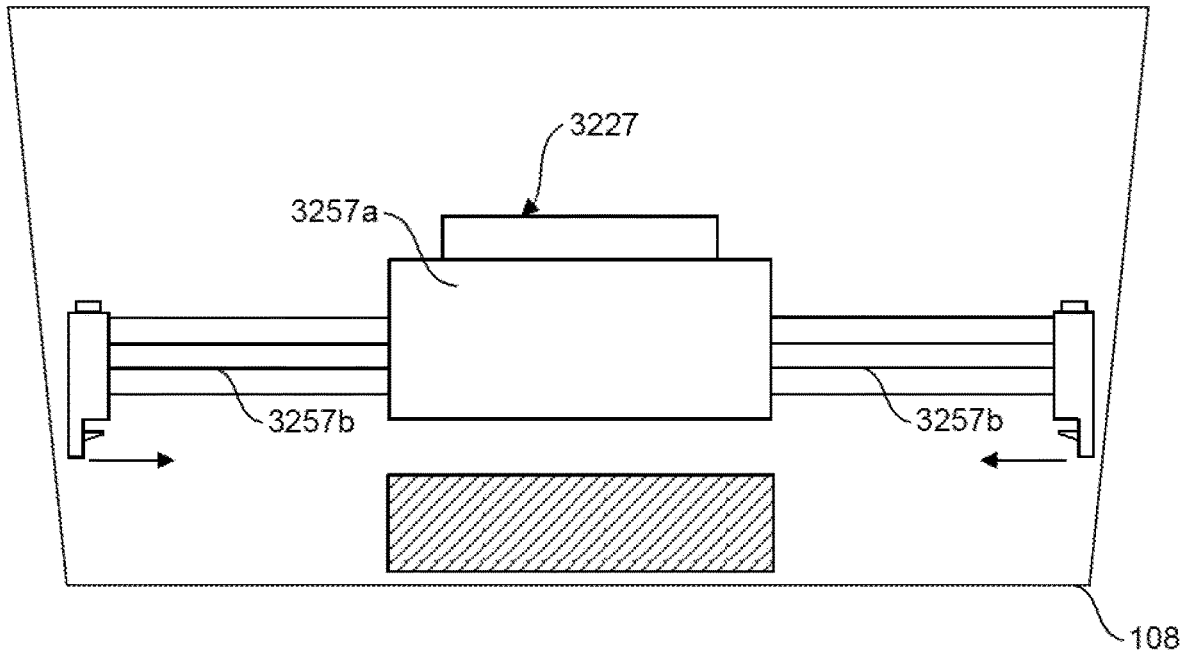
FIGS. 34A-34B are schematic diagrams of an Automatic Case Extraction (ACE) extractor engaging items within the tote.
Figure 34B:
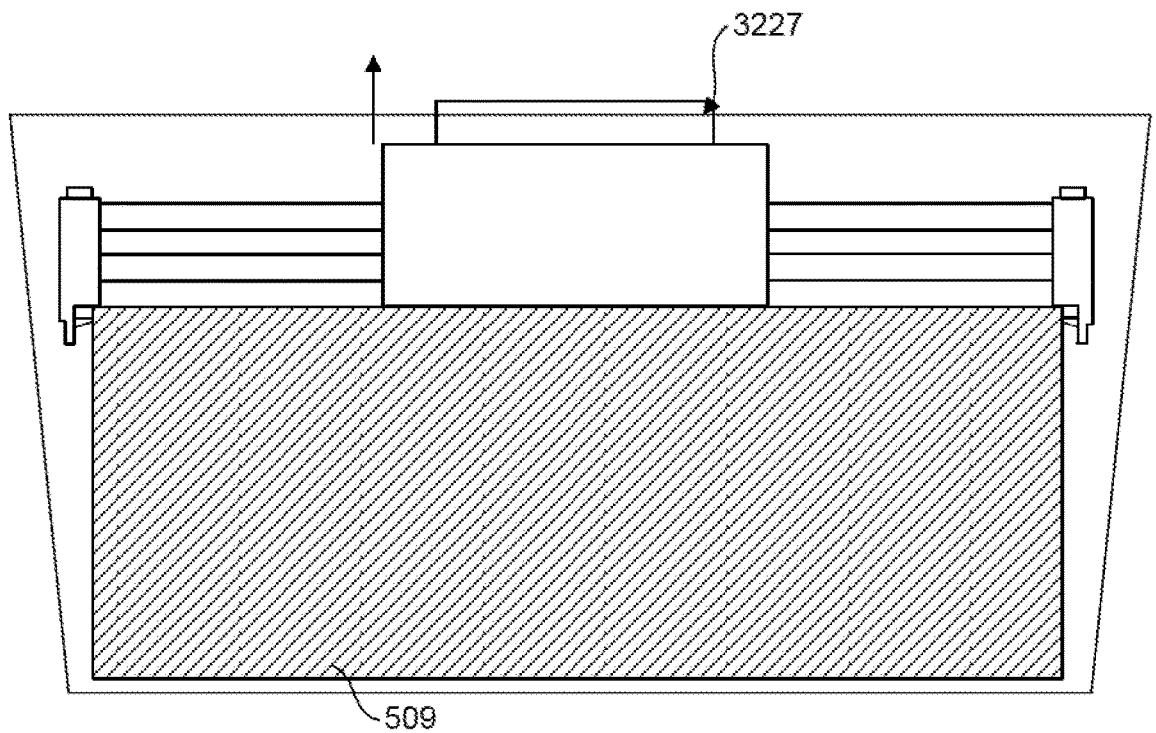

As shown in FIG. 32, a small shipping container 509*a* may be captured and held between the tote 108 and the merger grip hand 2516 during rotation and inversion. The insert fingers 2552*e*1 advance further into the tote 108 to engage the smaller shipping container 509*a*. As shown in FIGS. 33A-33B, a large shipping container 509*a* may be captured and held between the tote 108 and the merger grip hand 2516 during rotation and inversion. In some situations, the height of the shipping container 509 may not allow the tote 108 to fit over the insert fingers 2552*e*1. Once merged with the tote 108 by the merger grip hand 2516, the shipping containers 509 remain firmly held supported over its full length. As shown in these figures, the merger grip hand 2516 may be used to merge the tote 108 with shipping containers 509 that are taller than an inner height of the tote 108.

In examples where a merger operation is performed (e.g., FIGS. 28A-28L), the tote 108 may be sized to have an opening large enough to receive at least a portion of the shipping container 509, and potentially most or all of the shipping container 509. The tote 108 may be larger than the shipping container 509 and/or the items 111 to provide space therebetween to facilitate merger and/or decant therebetween.

FIGS. 34-37 show optional features that may be used with one or more of the handling systems described herein. FIGS. 34A-34B are schematic diagrams of an Automatic Case Extraction (ACE) tool 3227 engaging the shipping container 509 within the tote 108. The ACE 3227 may be connected to, and extended by, any of the tote handlers herein for insertion into the tote 108 to grip and remove the shipping container 509 and/or items 111 therefrom.

The ACE tool 3227 include a mobile table 3257*a* connectable to the tote handler (e.g., tote handler 114), and grip arms 3257*b* laterally extending from the mobile table. The ACE tool 3227 may be inserted into the tote 108 with the grip arms 3257*b* retracted, and then the grip arms 3257*b* extended a distance wider than the shipping container 509. Next, the ACE tool 3227 may be lowered to a position within the tote 108 with each of the grip arms 3257*b* positioned adjacent the shipping container 509, and then the grip arms 3257*b* are retracted together to grip the shipping container 509 and removing it from the tote 108. The ACE tool 3227 may then be raised to lift the shipping container 509 and leave the items 111 behind in the tote 108. As demonstrated by these figures, the shipping container 509 may be maintained in its orientation after the shipping container 509 is removed.

FIGS. 35A-35D show examples of case extraction 3500 using the ACE tool 3227. The ACE operation is the process of removing the inverted shipping container 509 from the tote 108. The ACE tool 3227 may be extended into the tote 108 by the tote handler (robot) 114. As shown in this view, an ACE tool 3227 may be extended into the tote 108 to grip and remove the shipping container 509 from the tote 108. As shown in FIG. 35D, the inverted shipping container 509 may be lifted off of the items 111 such that the items 111 remain in the tote 108 in their original orientation.

The extraction operations 3500 and the ACE tool 3227 may be used for extracting a shipping container 509 from items in the capture table 1503 (see, e.g., FIGS. 20-21). The items 111 may be maintained in their orientation after the shipping container 509 is removed. The extraction operation 3500 may use the capture table 1503 in place of the tote 108 of FIGS. 35A-35B. As shown in FIGS. 35C-35D the shipping container 509 may be removed from the items 111 while in the capture table 1503 maintain the original stacking of the items 111. FIG. 35B shows the extracted items 111 on the capture table 1053 after the shipping container 509 is removed by the ACE tool 3227.

Figure 36:
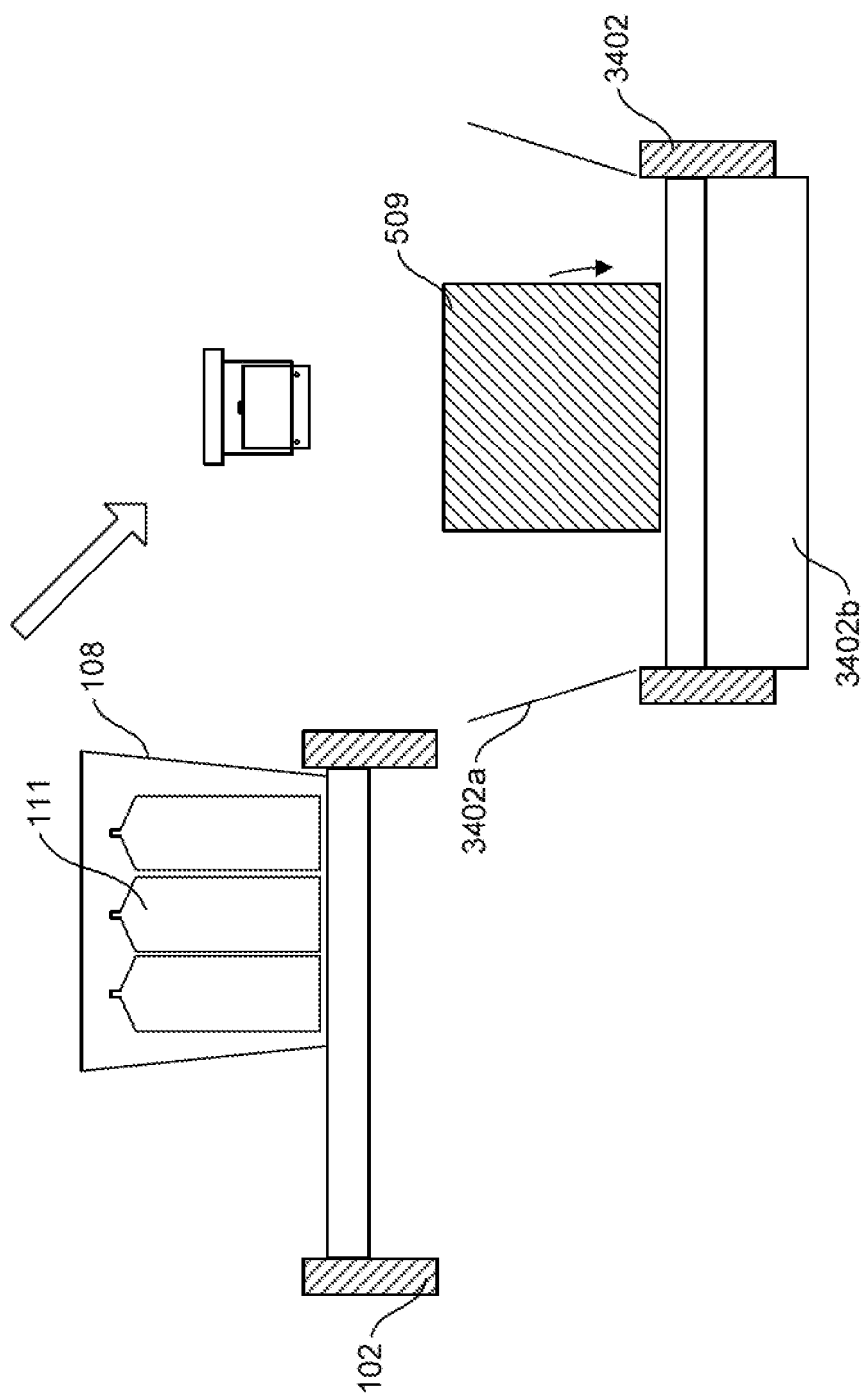
FIG. 36 is a schematic diagram of a disposal operation using a trash conveyor.

FIG. 36 is a schematic diagram of a disposal operation 3600 using a trash conveyor 3402. This disposal operation 3600 involves for removing the shipping container 509 from the tote 108 and the items 111, and placing the shipping container 509 into a trash conveyor 3402. As shown by this figure, the ACE tool 3227 may be used to remove the shipping container 509 and then transport the shipping container 509 to the trash conveyor 3402. Once in position, the ACE tool 3227 may release the shipping container 509 into a trash receptacle 3402b within the trash conveyor 3402.

The trash conveyor 3402 may be a conveyor with trash doors 3402a positioned on a portion of a tote conveyor 102. The trash doors 3402a pivot open and allow access to a trash receptacle 3402b therebelow. In the example shown, the trash receptacle 3402b is a box position about the trash conveyor 3402. The trash receptacle 3402b may be shaped to receive the shipping container 509. Once the shipping container 509 is placed in the trash receptacle 3402b, the trash doors 3402a may be shut to enclose the trash receptacle 3402b.

Figure 37:
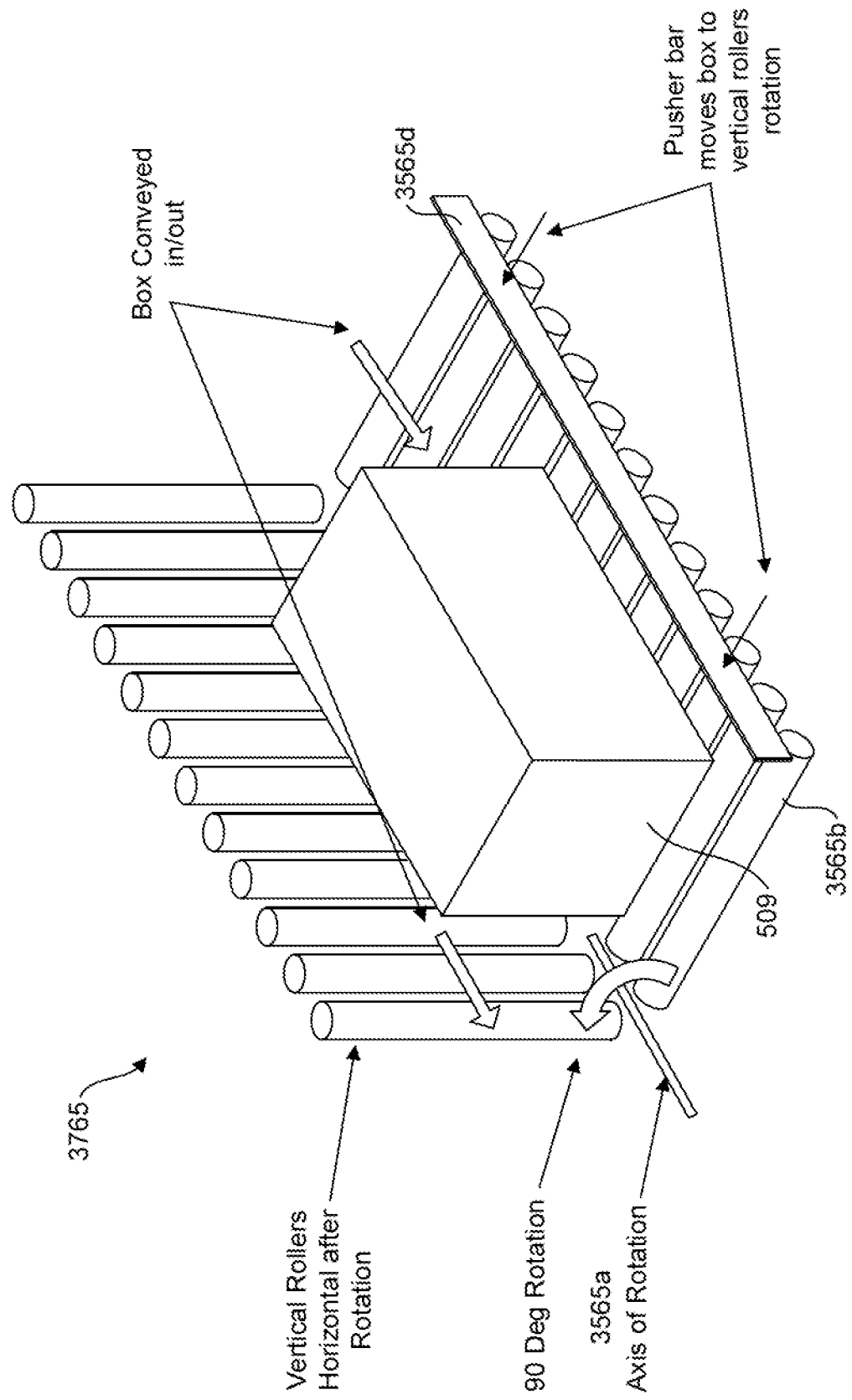
FIG. 37 is a schematic diagram of an example item rotator.

FIG. 37 is a schematic diagram of an example item rotator 3765. This item rotator 3765 may be positioned about the tote conveyor 102 for selectively rotating the shipping container 509, the tote 108, and/or the items 111 about the tote conveyor 102. The item rotator 3565 includes an axis 3565a, a set of rotational rollers 3565b, and a pusher bar 3565d. The rollers 3565b extend from the axis 3565a and rotate about the axis 3565a. The rollers 3565b may be aligned with or form part of the tote conveyor 102. The axis 3565a may be positioned along one end of the horizontal rollers 3565b perpendicular thereto. The pusher bar 3565d may be positioned along an opposite end of the rollers 3565b parallel to the axis 3565a. The rollers 3565b may passively or actively allow the shipping container 509 to pass therealong as indicated by the arrows.

The shipping container 509 may be positioned on the rollers 3565b and rotated by the rotator 3565 as the rollers 3565b move from a horizontal position to a vertical position. The pusher bar 3565d may be used to engage a side of the shipping container 509 and drive the shipping container 509 onto the rollers 3565b towards axis. The shipping container 509 may be rotated onto its side and placed on another tote conveyor 102. Once on its side, the shipping container 509 may be oriented for handling operations, such as cutting for removal of the items 111 as shown in FIG. 24 or positioning for merging as shown in FIGS. 28F-28L.

The rotator 3565 may be used, for example, as a pack-decant rotator. The pack decant rotator may be positioned along one or more conveyors in the pack-decant system (see, e.g., FIG. 2C). In this example, the pack-decanter rotator is a 90 degree flip station including the rollers 3565b rotated from 0 degrees (horizontally) to a position at a 90 degree angle (vertically). The rollers 3565b may be supported on a frame (not shown) and rotated along the axis of rotation. The rollers and/or a pusher bar 3565d may be provided to push the shipping container (box) into position about portions of the handling systems described herein.

The shipping container 509 may be rotated based on programmed commands to provide the desired orientation for the pack-decant operation(s). The orientation rules are created based on the relationship between the tote 108 dimensions and the shipping container 509 dimensions. Also taken into account are the items 111 and the orientation to be stored. The desired orientation rules may be derived from knowing the contents by identifying the shipping containers 509 and classify the items 111 (i.e., such as liquid shipping containers requiring right side up storage).

Figure 38A:
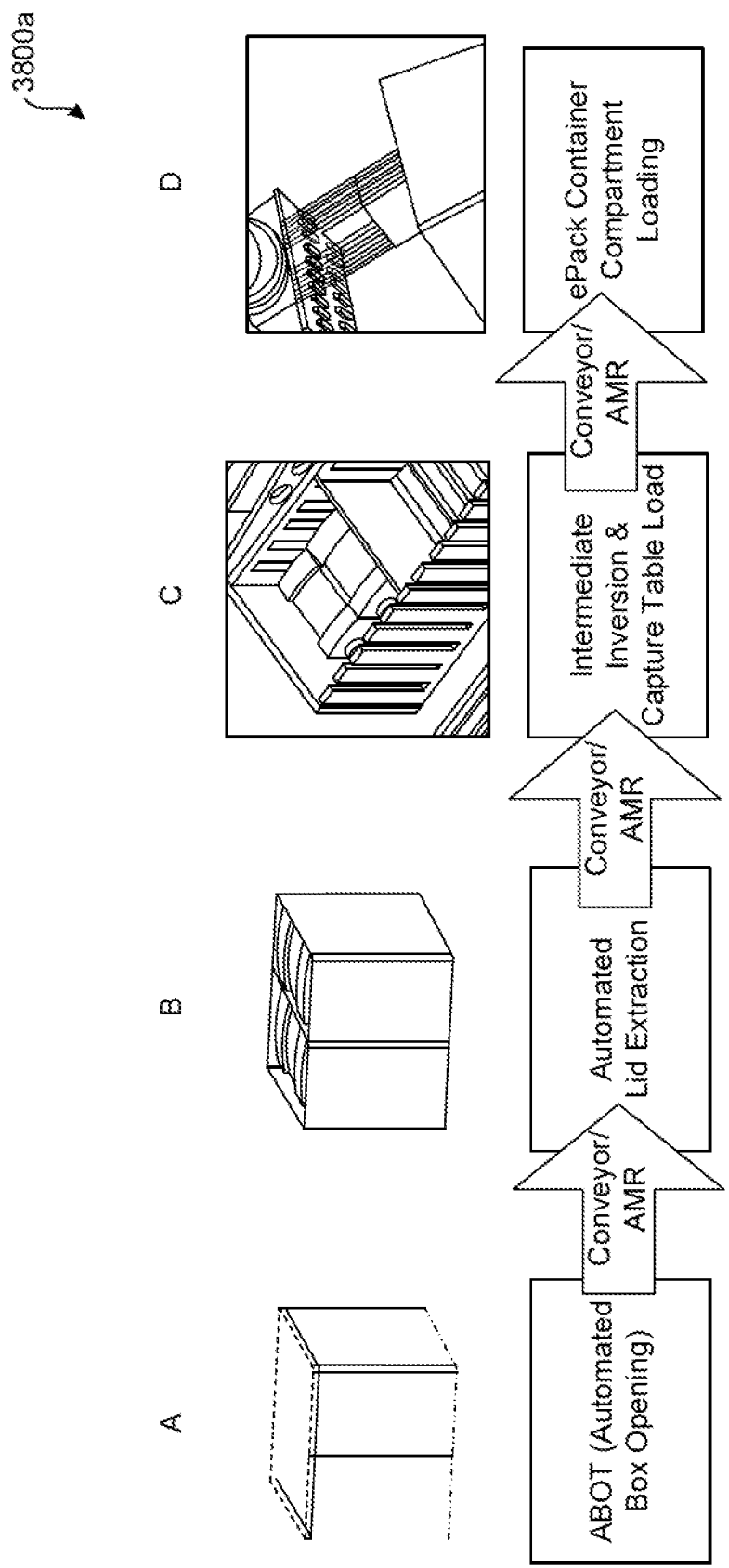
FIGS. 38A and 38B are example automated handling operations.
Figure 38B:
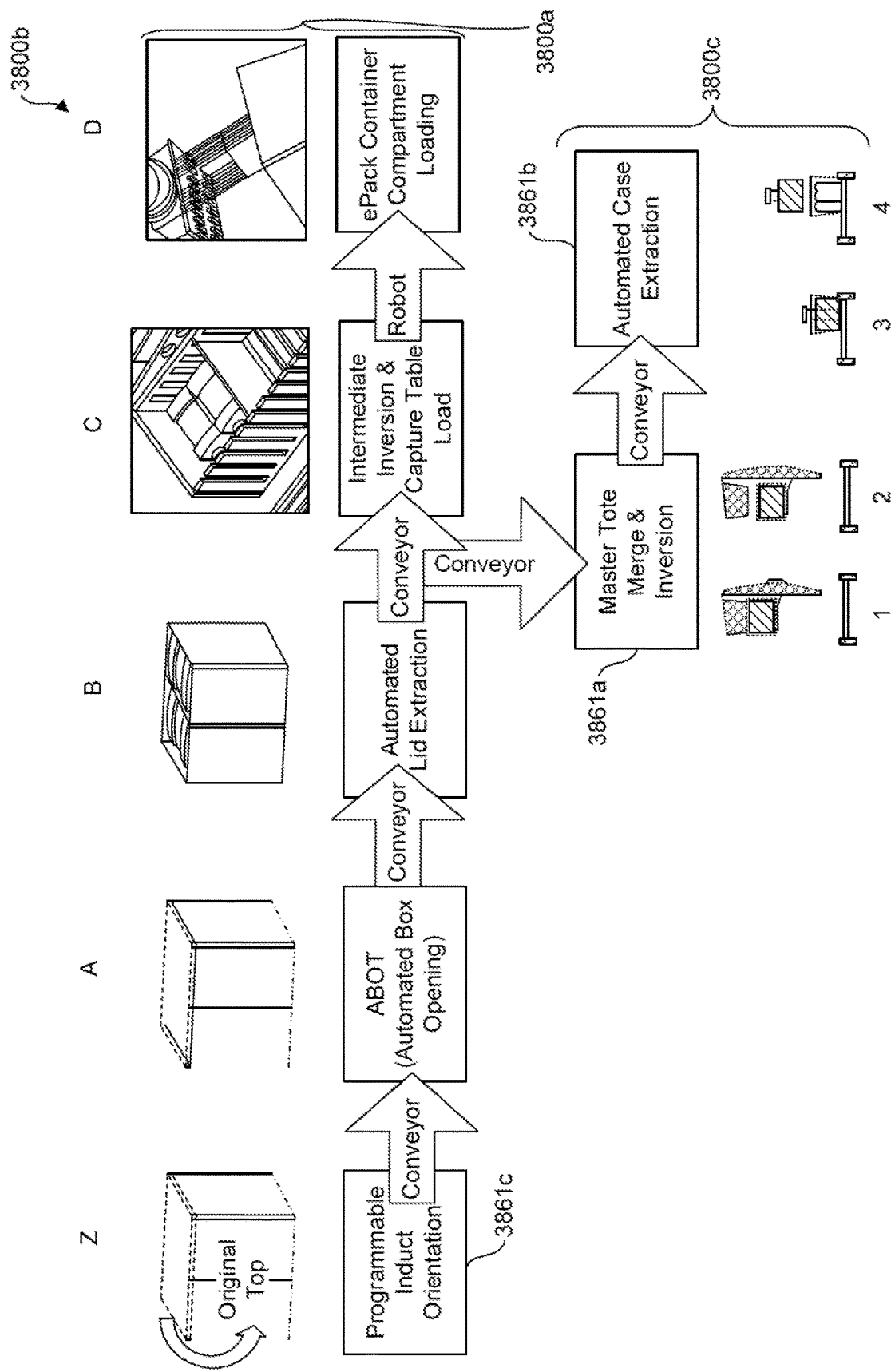

FIGS. 38A and 38B are example automated handling operations 3800a, 3800b. The programming may be used with any of the handling systems described herein. FIG. 38A shows an example programming of the automated handling operation 3800a in a pack-decant configuration. FIG. 38B shows another example automated handling operation 3800b including the automated handling operation 3800a with additional optional operations including rotation 3861c and the handling operation 3800c. The handling operation 3800c includes tote merger and inversion 3861a and case extraction 3861b. This programming may be used to manipulate the merger grip hand 2516, the tote 108, and/or the tote conveyor 102 to facilitate handling thereof.

FIG. 38A shows the shipping container 509 on its side when loaded onto the automatic box cutter. At station A, the shipping container 509 may be opened by cutting four sides of the top side of the shipping container 509. At station B, the top of the shipping container 509 is removed. Station B shows the shipping container 509 after being cut and the top removed. At station C, the grip hand 1516 grips the opened shipping container 509 from the conveyor 102, inverts the shipping container 509, places into the shipping container 509 on the capture table 1503 and extracts the shipping container 509 leaving items 111 in the capture table 1503. At station D, the fingers 2552e move under and over the items 111 in the capture table 1503 by means of the table receptacles 1509. The fingers 2552e grip the item 111 and then lift the items 111 from the capture table 10503 and transfer the items 111 to the sub-chamber 1530 of the tote 1508 for loading.

FIG. 38B is a schematic diagram of the pack-decant process 3800b with an additional optional master tote process 3400c. that may be performed using the tote handling system of FIGS. 25A-28L. As shown in this figure, the pack-decant process 3400b may include multiple processes at the same time (e.g., operating merging in parallel for master shipping containers). This process 3800b,c involves the following: At Z, the shipping container 509 may be rotated by programmable induct orientation (e.g., shipping containers induction and orientation) using, for example, the rotator 3765 of FIG. 37. At A, the shipping container may be opened by the Automated Box Opening (ABOT) (shipping container opening). At B, the items 111 may be removed from the shipping container 509 by automated lid (top) extraction. The process 3400b may continue with placement of the items 111 in the capture table at C using the Intermediate Inversion & Capture Table Load and compartment loading by the grip hand at D using the ePack Shipping container Compartment Loading (pick items from capture).

For shipping containers of individual totes, the process 3800c may be used instead of the programming C and D. In such cases, the open shipping container 509 may be passed via conveyor to an alternate processing. This alternate processing may involve: at E, performing a master tote merge & inversion (shipping container invert) operation using the handling operation 2800a of FIGS. 28A-28D; and at F, performing extraction 3500 (extract shipping containers from tote) using the case extraction operation of 3500a as shown in FIGS. 35A-35D for shipping containers 509 of individual totes 108.

Figure 39A:
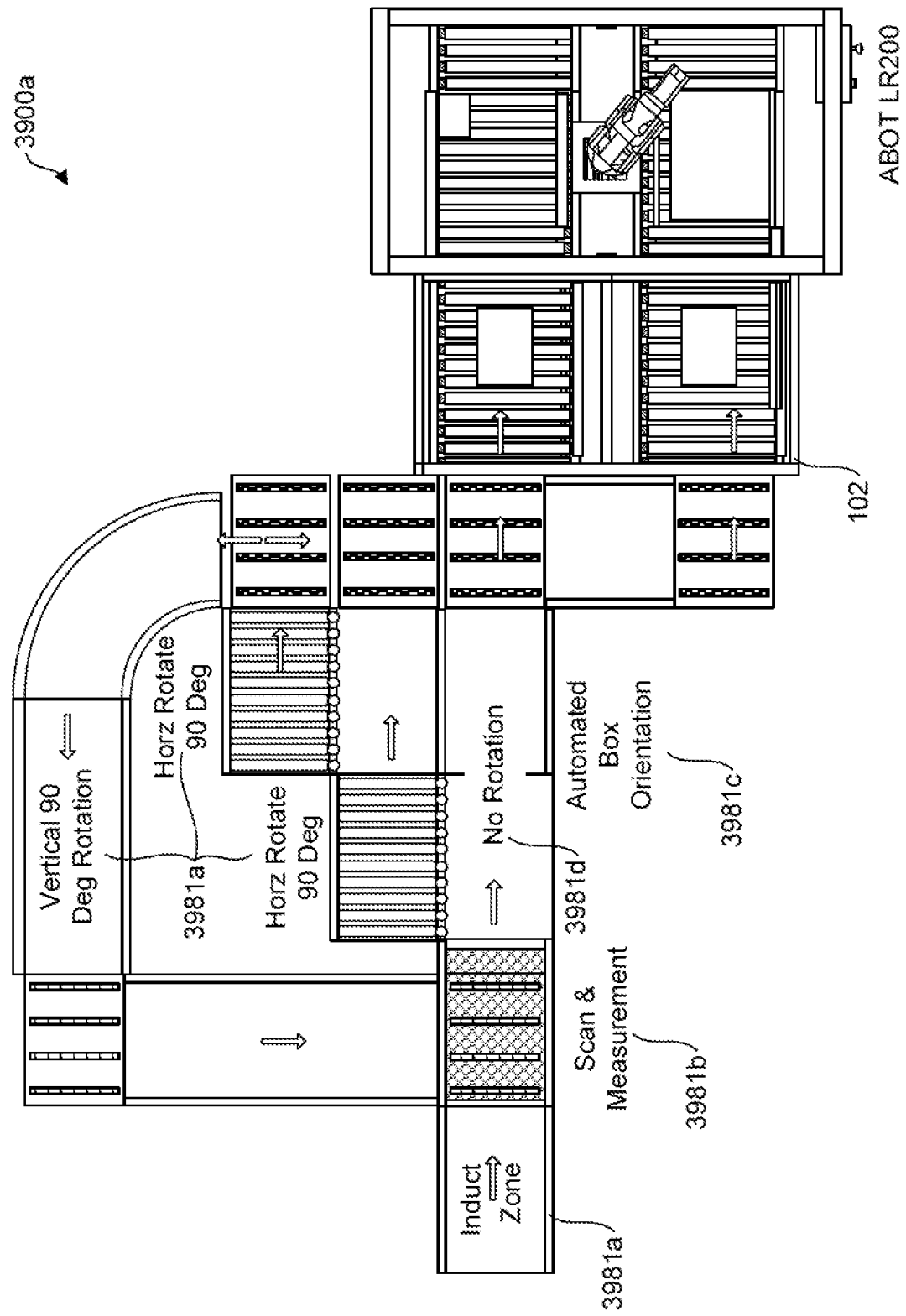
FIGS. 39A-39B are schematic diagrams of an example layouts of the tote handling system.
Figure 39B:
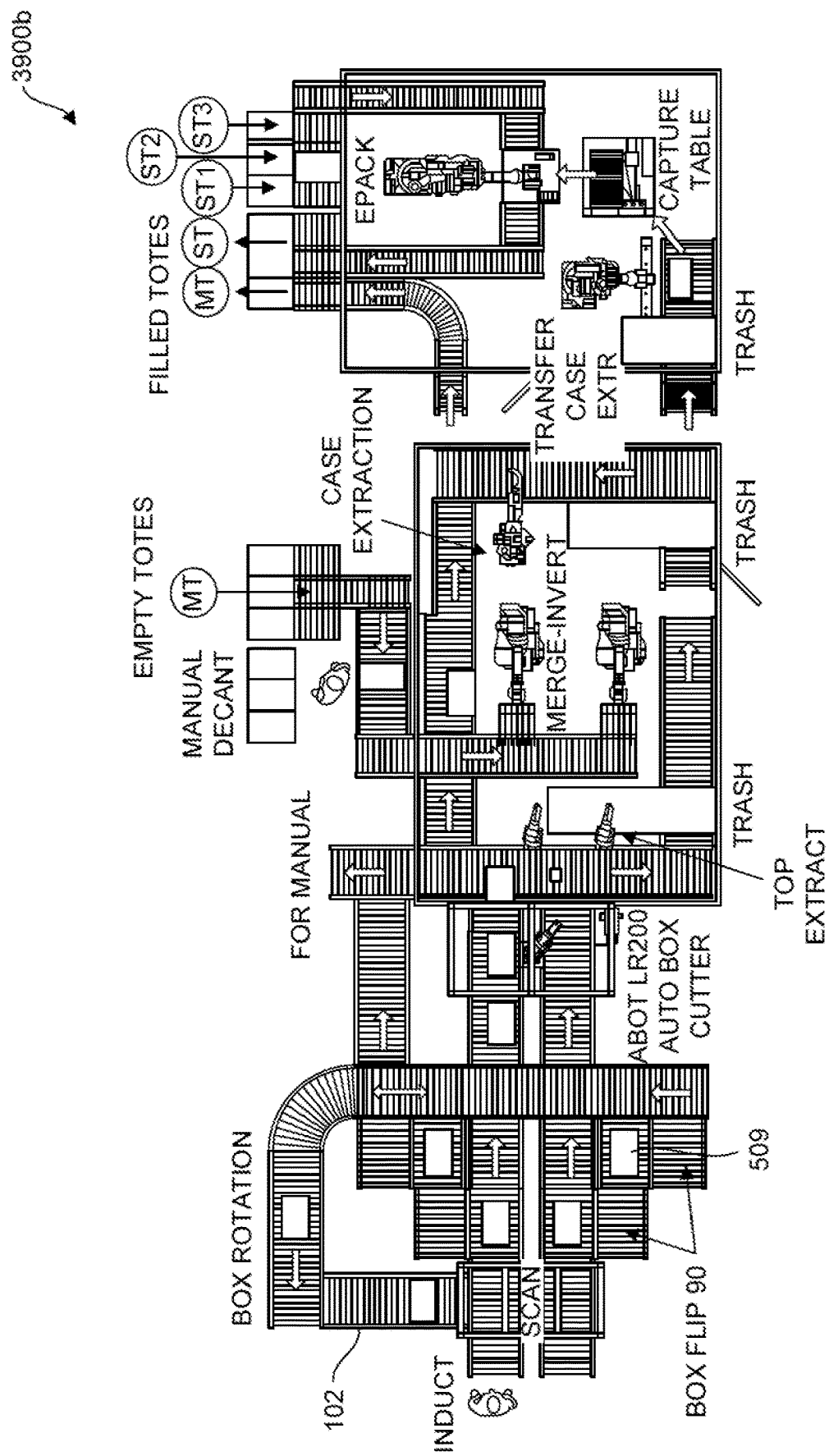

FIGS. 39A-39B are schematic diagrams of an example layouts of the tote handling system 3900a, b. FIG. 39A shows an example layout of the handling system 3900a in a pack-decant configuration. This pack-decant handling system 3900a includes multiple tote conveyors 102 for advancing the shipping containers 509, the totes 108, and/or the items 111 between stations for performing operations. The tote conveyors 102 include linear, curved, and staggered portions with transfer devices therealong to selectively move the shipping containers 509, totes 108, and/or items 111 to desired stations. The stations include an induct zone 3981a, scan & measurement 3981b, automatic box opening tool (ABOT) 3981c, rotation 3981d, and no-rotation zones 3981e, as well as other zones.

The shipping container 509 is scanned at the scan & measurement station 398 lb and the correct orientation is determined. The orientation is achieved by selectively activating the rotation and no-rotation zones (e.g., turning on or off actions in the next three conveyor zones). Subsequent decant operations may be designed to function with the orientation of the shipping container as it arrives. Also based on the orientation, the ABOT 3981c cuts the new top and remove the top as oriented. The subsequent decant cells operate as described using the orientation as presented from the programmable induction.

FIG. 39B shows another layout of the pack-decant handling system 3900b. As shown by this example, various configurations of one or more of the conveyors, stations, pack-decanters, etc. may be provided. The pack-decant handling system 3900b may be used to design a flexible system for packing and/or decanting shipping containers 509 and the totes 108 with the items 111 that are stored, oriented, sorted, and packaged as desired. The layout of the pack-decant system may also be used in combination with the handling system, the decanter system, and/or the pack-decant system.

The orientation is controlled automatically by the decant system induct. A series of conveyor stations scan the dimensions of the loaded shipping containers 509 and uses a set of rules or logic to determine the best orientation for the decant. Based on this information, the tote conveyors 102 can be manipulated by varying roller rotation, thereby rotating the shipping containers 509 along a desired direction. For example, the items 111 can be rotated in the horizontal direction of 180 degrees, and the items in can be rotated 90 degrees on the horizontal axis.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain tote handling systems comprising various tote conveyors, tote handlers, and totes are provided herein, it will be appreciated that various forms of one or more tote conveyors (or conveyor portions), one or more tote handlers with various tote hands, and one or more totes may be provided. Additionally, various combinations of one or more of the features of the components of the tote handling system may be used. While the figures herein depict a specific configuration or orientation, these may vary. First and second are not intended to limit the number or order.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A tote handler for manipulating items for delivery, the tote handler comprising:
   a foot positioned on a surface;
   a support supported by the foot; and
   a merger grip hand supported by the support and movable thereabout, the merger grip hand comprising:
      a base;
      insert fingers secured to the base, each of the insert fingers comprising a polygonal body having a peripheral surface shaped for engaging receipt within an inner surface of a tote; and
      suction fingers movably connected to the base, each of the suction fingers comprising elongate members with suction cups thereon, the suction fingers movable between a closed position with the suction fingers urged towards the insert fingers and an open position with the suction fingers urged away from the insert fingers,
      wherein the merger grip hand is movably positionable about a conveyor with the insert fingers and the suction fingers extendable between rollers of the conveyor.

2. The tote handler of claim 1, wherein the insert fingers and the suction fingers are in a parallel and spaced apart arrangement shaped to pass between the rollers of the conveyor.

3. The tote handler of claim 1, wherein the foot comprises a horizontal support and the support comprises a vertical support.

4. The tote handler of claim 3, wherein the horizontal support comprises one of a conveyor and a frame.

5. The tote handler of claim 1, further comprising a linear actuator and a motor mounted on the base and operatively coupled to the suction fingers for movement thereof.

6. A method of handling unit items, the method comprising:
   positioning a tool handler about a conveyor, the tool handler comprising a grip hand with insert fingers and suction fingers;
   positioning a tote onto the conveyor;
   lifting the tote with the tool handler by passing the suction fingers from a first position under the tote through the conveyor and to a second position above the conveyor;
   inverting the tote by rotating the tool handler;
   positioning a shipping container having items therein onto the conveyor below the tote;
   merging the tote with the shipping container by moving the suction fingers towards the insert fingers;
   after the merging, inverting the tote and the shipping container by rotating the tool handler; and
   releasing the tote onto the conveyor by moving the suction fingers away from the insert fingers.

7. The method of claim 6, after the releasing the tote, removing the shipping container.

8. The method of claim 6, wherein the items are positioned in the shipping container in an arrangement, the items maintained in the arrangement during the merging, inverting, and releasing.

9. The method of claim 6 wherein each suction finger comprises at least one suction cup configured to temporarily attach to a surface of the tote.

10. A tote handler for manipulating items for delivery, comprising:
   a foot positioned on a surface;
   a support supported by the foot; and
   a merger grip hand supported by the support and movable thereabout, the merger grip hand comprising:
      a base;
      insert fingers secured to the base, each of the insert fingers comprising a polygonal body having a peripheral surface shaped for engaging receipt within an inner surface of a tote;
      suction fingers movably connected to the base, each of the suction fingers comprising elongate members with suction cups thereon, the suction fingers movable between a closed position with the suction fingers urged towards the insert fingers and an open position with the suction fingers urged away from the insert fingers; and
   wherein a wall recess is defined between the insert fingers and the base, the wall recess shaped to receive a wall of the tote therebetween.

* * * * *